United States Patent
Kerfoot et al.

(10) Patent No.: US 7,242,638 B2
(45) Date of Patent: *Jul. 10, 2007

(54) METHOD AND SYSTEM FOR SYNTHETIC APERTURE SONAR

(75) Inventors: Ian B. Kerfoot, Middletown, RI (US); James G. Kosalos, Kirkland, WA (US)

(73) Assignee: Raytheon Company, Waltham, MA (US)

( * ) Notice: Subject to any disclaimer, the term of this patent is extended or adjusted under 35 U.S.C. 154(b) by 321 days.

This patent is subject to a terminal disclaimer.

(21) Appl. No.: 10/997,281

(22) Filed: Nov. 24, 2004

(65) Prior Publication Data

US 2006/0109742 A1    May 25, 2006

(51) Int. Cl.
    *G01S 15/89* (2006.01)
(52) U.S. Cl. .......................... 367/88; 367/12
(58) Field of Classification Search ............. 367/88, 367/12
    See application file for complete search history.

(56) References Cited

U.S. PATENT DOCUMENTS

| | | | |
|---|---|---|---|
| 4,088,978 A | 5/1978 | Gilmour | |
| 4,119,940 A | 10/1978 | Keating et al. | |
| 4,244,036 A | 1/1981 | Raven | |
| 4,315,263 A | 2/1982 | Neidell | |
| 4,596,007 A | 6/1986 | Grall et al. | |
| 4,953,143 A | 8/1990 | Higgins et al. | |
| 4,958,330 A | 9/1990 | Higgins | |
| 5,029,144 A | 7/1991 | Griffin | |
| 5,295,118 A | 3/1994 | Gilmour | |
| 5,323,362 A | 6/1994 | Mitchell et al. | |
| 5,412,618 A | 5/1995 | Gilmour | |
| 5,802,012 A | 9/1998 | Yamaguchi | |
| 5,886,950 A | 3/1999 | Billon | |
| 6,037,892 A | 3/2000 | Nikias et al. | |
| 6,088,295 A | 7/2000 | Altes | |
| 6,215,730 B1 | 4/2001 | Pinto | |
| 6,304,513 B1 | 10/2001 | Billon | |
| 6,594,200 B2 | 7/2003 | Nakamura | |
| 7,046,582 B1 * | 5/2006 | Kosalos et al. | 367/88 |
| 7,133,326 B2 * | 11/2006 | Kerfoot et al. | 367/88 |
| 2002/0126577 A1 | 9/2002 | Borchardt | |

OTHER PUBLICATIONS

Bruce: "A Processing Requirement and Resolution Capability Comparison of Side-Scan and Synthetic-Aperture Sonars;" IEEE Journal of Oceanic Engineering, vol. 17, No. 1, Jan. 1992; pp. 106-117.

Gough et al.; "Displaced Ping Imaging Autofocus for a Multi-Hydrophone SAS:" IEEE Proc. Radar Sonar Navig., vol. 151, No. 3, Jun. 2004; pp. 163-170.

Tonard et al.; "Toward Development of Autofocusing Schemes for Phase Compensation of Synthetic Aperture Sonars;" IEEE 1997; #0-7803-4108-2/97; pp. 803-808.

(Continued)

*Primary Examiner*—Dan Pihulic
(74) *Attorney, Agent, or Firm*—Daly, Crowley, Mofford, Durkee, LLP

(57) ABSTRACT

A method and system for synthetic aperture sonar provide improved position estimates of a receive array as in moves through a body of water.

9 Claims, 27 Drawing Sheets

OTHER PUBLICATIONS

PCT Search Report of the ISA for PCT/US2005/035383 dated Jan. 2, 2006.

Written Opinion of the ISA for PCT/US2005/035383 dated Jan. 2, 2006.

Bruce; "A Processing Requirement and Resolution Capability Comparison of Side-scan and Synthetic-Aperture Sonars;" IEEE Journal of Oceanic Engineering; vol. 17, No. 1; Jan. 1992; pp. 106-127.

Garrood et al.; "Synthetic Aperture Sonar: An Evolving Technology;" Sea Technology; Jun. 1999, vol. 40, No. 6; cover, index and pp. 17-23.

Garrood et al.; "Synthetic Aperture Sonar: An Evolving Technology;" 1999; 6 sheets.

Kosalos et al.: "Multi-Look and SAS Processing;" Published by Office of Naval Research; Dec. 2003.

Kosalos et al.; "Multi-Look and SAS Processing 2003 Annual Report;" published by Office of Naval Research, Dec. 2003.

Neudorfer et al.; "Acoustic Detection and Classification of Buried UXO Synthetic Aperture Sonar;" Recent Advances in Marine Science and Technology, 96; PACON International 1997; pp. 19-33.

Neudorfer et al.: "Results of Synthetic Aperture Sonar Experiments;" Oceans 2000 MTS/IEEE Conference and Exhibition, vol. 1, 11-14; Sep. 2000; pp. 323-330a.

Kerfoot et al.; "Method and System for Synthetic Aperture Sonar;" U.S. Appl. No. 10/997,551; filed Nov. 24, 2004.

Kerfoot et al.; "Method and System for Synthetic Aperture Sonar;" U.S. Appl. No. 10/997,156; filed Nov. 24, 2004.

\* cited by examiner

METHOD AND SYSTEM FOR SYNTHETIC APERTURE SONAR

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to synthetic aperture sonar and, more particularly, to a method and system for synthetic aperture sonar that provide improved spatial position of a moving sonar array used in a synthetic aperture sonar.

BACKGROUND OF THE INVENTION

Active sonar transmits a signal into the water, and receives echoes from targets in the water. The targets can include, but are not limited to, submarines, torpedoes, tethered mines, bottom mines, cables, and bottom features such as hills, trenches, and the bottom surface.

Active sonar systems have a variety of configurations. Bistatic active sonar systems have an acoustic transmitter separate from an acoustic receiver. Monostatic active sonar systems have an acoustic transmitter co-located with an acoustic receiver.

The acoustic receiver portion of an active sonar system can have an array of receive elements arranged in a receive array formed as a line or a curve. The receive elements may be regularly or irregularly spaced in the receive array. With this arrangement, signals provided by the receive elements can be added to provide a receive beam having a beamwidth inversely proportional to a length of the receive array. Relative time delays or relative phase shifts can be introduced to the signals provided by the receive elements to steer the receive beams about the receive array.

Where the receive array is a horizontal receive array, an azimuth width of a receive beam is inversely proportional to the length of the array in wavelengths. Therefore, high spatial resolution can be achieved either by lengthening the receive array or by increasing the frequency of operation. However, physical array length is often limited by a size of a platform to which the receive array is attached. Furthermore, high acoustic frequencies attenuate rapidly in the water, preventing acoustic propagation to long ranges. As a result, conventional active sonar systems are limited in performance by receive array length constraints and by acoustic frequency constraints.

Synthetic aperture sonar (SAS) has characteristics similar to synthetic aperture radar (SAR). SAS improves the spatial resolution of an active sonar array by combining data coherently between pings (acoustic pulses) to synthesize a longer effective array. For SAS processing, Nyquist sampling constraints require that the receive array advance (move along its axis) by no more than half the physical length of the receive array between successive pings. It is known that more rapid movement of the receive array results in formation of grating lobes. A variety of SAS algorithms are also known.

SAS requires an exceptionally good estimate of a spatial track (i.e., position or motion estimate) of the receive array with time, in order to be able to accurately add signals from the receive array coherently over the entire synthetic aperture. It will be understood that a spatial track is associated with six degrees of freedom of motion of the receive array: three displacements and three rotations. Several methods are known for estimation of the track or portions of the track of the receive array in SAS processing.

For example, a high-quality inertial measurement unit (IMU) can be used along with a Doppler velocity sonar and other ancillary equipment to provide track estimates. However, the IMU and the other ancillary equipment are costly, and require space and power that are at a premium for undersea receive arrays.

Furthermore, correlation (or differential phase) between receive signals provided by the individual receive elements of the receive array can be used to estimate differential motion between consecutive pings. This technique typically looks over a narrow azimuth and range sector, to reduce the dimensionality of the required motion estimate. This technique does not obtain precise track estimates for motion in all six degrees of freedom.

Still further, an auto-focus technique can further adjust the track estimate based on an ability of the adjustment to improve the quality of a resulting SAS image. The auto-focus method can compensate for an accumulation of errors in differential motion over the duration (i.e., time and length) of the synthetic aperture.

SUMMARY OF THE INVENTION

The present invention provides a method and system for synthetic aperture sonar having an improved ability to provide position and orientation estimates of a moving sonar array as it moved through the water.

In accordance with the present invention, a method of synthetic aperture beamforming with a moving sonar array includes transmitting a plurality of transmit signals to impinge upon a reference surface, wherein ones of the plurality of transmit signals are transmitted at a different spatial positions of the moving sonar array. The method also includes receiving a plurality of return echoes from the reference surface with the moving sonar array, each of the plurality of return echoes associated with a respective one of the plurality of transmit signals, and beamforming selected ones of the plurality of return echoes to provide a plurality of beamformed signals. The method still further includes generating a plurality of coarse altitudes of the moving sonar array associated with selected ones of the plurality of beamformed signals, and generating a plurality of fine altitude differences and a plurality of fine horizontal displacements of the moving sonar array from correlations associated with selected ones of the plurality of beamformed signals.

In alternate arrangements, the method can also include one or more of: improving an accuracy of the plurality of fine altitude differences and the plurality of fine horizontal displacements to provide a respective plurality of high-precision altitude differences and a respective plurality of high-precision horizontal displacements; reducing a sway component of the plurality of high-precision altitude differences and the plurality of high-precision horizontal displacements to provide a respective plurality of sway-reduced altitude differences and a respective plurality of sway-reduced horizontal displacements; estimating spatially-continuous positions and spatially-continuous orientations of the moving sonar array in a first coordinate system in accordance with at least one of: the plurality of fine altitude differences and fine horizontal displacements, the plurality of high-precision altitude differences and high-precision horizontal displacements, and the plurality of sway-reduced altitude differences and the plurality of sway-reduced horizontal displacements; and resolving a heave error due to pitch in the estimated spatially-continuous positions and spatially-continuous orientations of the sonar array.

With these particular arrangements, the method provides improved knowledge of the position and orientation of the receive array as it moves through the water.

In accordance with another aspect of the present invention, a system for synthetic aperture beamforming with a moving sonar array comprises a beamforming module to transmit a plurality of transmit signals to impinge upon a reference surface, to receive a plurality of return echoes from the reference surface with the moving sonar array, and to beamform selected ones of the plurality of return echoes to provide a plurality of beamformed signals. The system also includes a coarse altitude module to generate a plurality of coarse altitudes of the moving sonar array, and a fine altitude difference/horizontal displacement module to generate a plurality of fine altitudes and a plurality of fine horizontal displacements of the moving sonar array from correlations associated with selected ones of the plurality of beamformed signals.

In alternate arrangements, the system can also include one or more of: a high-precision altitude difference/horizontal motion module to improve an accuracy of the plurality of fine altitude differences and the plurality of fine horizontal displacements and to provide a respective plurality of high-precision altitude differences and a respective plurality of high-precision horizontal displacements; a sway reduction module to reduce a sway component of the plurality of high-precision altitude differences and the plurality of high-precision horizontal displacements to provide a respective plurality of sway-reduced altitude differences and a respective plurality of sway-reduced horizontal displacements; a Phase Linearization module for estimating spatially-continuous positions and spatially-continuous orientations of the moving sonar array in a first coordinate system in accordance with at least one of: the plurality of fine altitude differences and fine horizontal displacements, the plurality of high-precision altitude differences and high-precision horizontal displacements, and the plurality of sway-reduced altitude differences and the plurality of sway-reduced horizontal displacements; and a heave-due-to-pitch resolution module to resolve a heave error due to pitch in the estimated spatially-continuous positions and spatially-continuous orientations of the sonar array.

With these particular arrangements, the system provides improved knowledge of the position and orientation of the receive array as it moves through the water.

In accordance with yet another aspect of the present invention, a method of synthetic aperture beamforming with a moving sonar array includes improving an accuracy of a plurality of fine altitude differences and a plurality of fine horizontal displacements of the moving sonar array to provide a respective plurality of high-precision altitude differences and a respective plurality of high-precision horizontal displacements of the moving sonar array.

In accordance with yet another aspect of the present invention, a method of synthetic aperture beamforming with a moving sonar array includes reducing a sway component of a plurality of high-precision altitude differences and a plurality of high-precision horizontal displacements of the moving sonar array to provide a respective plurality of sway-reduced altitude differences and a respective plurality of sway-reduced horizontal displacements of the moving sonar array.

In accordance with the yet another aspect of present invention, a method of synthetic aperture beamforming with a moving sonar array includes estimating spatially-continuous positions and spatially-continuous orientations of the moving sonar array in a first coordinate system in accordance with at least one of: a plurality of fine altitude differences and fine horizontal displacements, a plurality of high-precision altitude differences and high-precision horizontal displacements, and a plurality of sway-reduced altitude differences and the plurality of sway-reduced horizontal displacements.

In accordance with yet another aspect of the present invention, a method of synthetic aperture beamforming with a moving sonar array includes resolving a heave error due to pitch in estimated positions and orientations of the moving sonar array.

In accordance with the yet another aspect of present invention, a method of synthetic aperture beamforming with a moving sonar array includes resolving a cycle ambiguity in a received waveform.

In accordance with yet another aspect of the present invention, a method of synthetic aperture beamforming with a moving sonar array includes beamforming the moving sonar array to provide a plurality of beamformed signals, generating initial quantized estimates of motion of the moving sonar array associated with the beamformed signals; and generating spatially-continuous position estimates associated with the initial quantized estimates of motion of the moving sonar array.

With these particular arrangements, the methods provide improved knowledge of the position of the receive array as it moves through the water

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
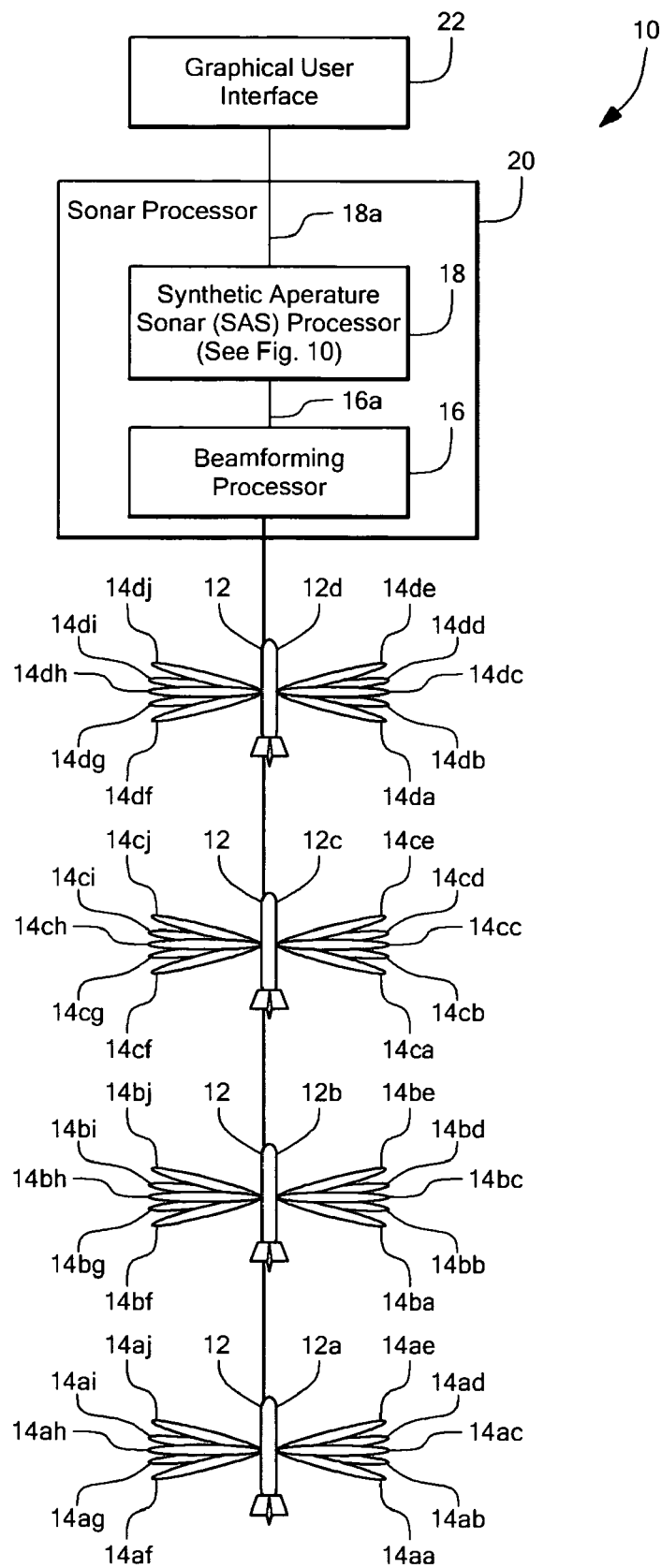
FIG. 1 is a top view pictorial of a synthetic aperture sonar (SAS) system.

Before describing the method and system for a synthetic aperture sonar as contemplated herein, some introductory concepts and terminology are explained. As used herein, the term "side-scan sonar" refers to a type of sonar system having a tow body upon which a receive array having receive elements is disposed. The receive array of the side-scan sonar is generally horizontally disposed, and is subject to movements of the tow body. The receive array of the side-scan sonar can be used to generate "receive beams." The tow body of the side-scan sonar can also include a transmit array to generate a "transmit beam" that can have the same beam shape or a different beam shape than the receive beams. The receive array and the transmit array can be the same physical array used in a receive mode or in a transmit mode. The side-scan sonar can operate in a monostatic arrangement.

As used herein, the term "towed array" is used to describe a receive array, which is towed through the water on a "tow line" by a ship, helicopter, or the like. The receive array of the towed array is generally horizontally disposed, and is subject to movements of the towline. The receive array of the towed array can be used to generate "receive beams." The receive array and receive elements can also be used as a transmit array to generate a "transmit beam" that can have the same beam shape or a different beam shape than the receive beams. However, most conventional towed arrays employ a separate acoustic transmitter separate from the receive array. The towed array can operate in a monostatic arrangement or in a bistatic arrangement.

As used herein, the term "hull-mounted array" is used to describe a sonar array, which is disposed on the hull of a ship, under the waterline. The receive array of the hull-mounted array is generally horizontally disposed, and is subject to movements of the ship. The receive array of the hull-mounted array can be used to generate "receive beams." The receive array and receive elements can also be used as a transmit array to generate a "transmit beam" that can have the same beam shape or a different beam shape than the receive beams. However, most conventional hull-mounted arrays employ a separate acoustic transmitter separate from the receive array in a bistatic arrangement. The hull-mounted sonar can operate in a monostatic arrangement or in a bistatic arrangement.

As used herein, the term "nadir" refers to a distance from a receive array to the bottom of a body of water, also called a "coarse" altitude herein.

As used herein, the term "ping" refers to a transmitted acoustic pulse, which can be a continuous wave (CW) pulse, a short pulse, or a CWFM (or otherwise encoded) pulse. A ping is associated with a physical location and position of a moving transmit and receive array, wherein the location and the position change between pings can be described with six degrees of motion. An echo associated with the ping is received with the receive array and beamformed providing "beamformed signals" associated with the ping.

As used herein, the term "beam aspect" is used to describe a direction substantially perpendicular to an axis of a line array.

As used herein, the terms "position, "orientation," and "location" are each used to describe a physical characteristic of an object, e.g., a sonar receive array, that can be described with six parameters according to six degrees of freedom.

As used herein, the term "reference surface" is used to describe a surface upon which transmitted acoustic energy impinges and from which an acoustic echo is received by a sonar system. It will become apparent from the discussion below that the reference surface is used as a surface related to which position of a receive array can be estimated as it moves though the water. In examples given below, the reference surface is described to be the ocean bottom. However, in other arrangements, the reference surface can be, but is not limited to, the upper ocean surface, and a ship hull.

It will be understood that the reference surface is not necessarily an acoustic "target" for which an image, a detection, and/or a localization are desired. For example, the reference surface can be the ocean bottom, and a target can be a submarine.

Referring to FIG. 1, a synthetic aperture sonar system 10 includes a side-scan sonar tow body 12, shown at a plurality of physical locations denoted 12a-12d as it is towed through the water. The tow body 12 has a port receive array (not shown) having port receive elements (not shown) and a starboard receive array (not shown) having starboard receive elements (not shown). At each physical location 12a-12d, the side-scan tow body 12 generates a sound pulse (not shown), which, at the location 12a is received by a plurality of receive beams 14aa-14aj, at the location 12b is received by a plurality of receive beams 14ba-14bj, at the location 12c is received by a plurality of receive beams 14ca-14cj, and at the location 12d is received by a plurality of receive beams 14da-14dj.

The plurality of receive beams 14aa-14dj is formed by a beamforming processor 16 to provide corresponding beamformed signals 16a. A synthetic aperture sonar (SAS) processor 18 operates upon the beamformed signals 16a. The SAS processor 18 is adapted to provide estimates of the motion of the receive array at each of the positions 12a-12d and to perform synthetic aperture beamforming associated with the motion estimates. In one particular embodiment, the motion estimates are in six degrees of freedom. The beamforming processor 16 and the SAS processor 18 form portions of a sonar processor 20. A graphical user interface 22 presents a display associated with the synthetic aperture beamforming.

As used herein, the term "ping pair" is associated with an adjacent two of the locations 12a-12d, for example, the positions 12a and 12b. It will be understood that a ping is generated at each of the locations 12a-12d and an echo from the bottom surface of a body of water (i.e., a reference surface) is received at each of the locations 12a-12d according to the associated receive beams.

As used herein, the term "beam index" refers to a beam from among a plurality of beams in azimuth at any one of the position 12a-12d. For example, beams 14aa, 14ba, 14ca, 14da can correspond to beam index zero, beams 14ab, 14bb, 14cb, 14db can correspond to beam index one, etc.

As used herein, the term "beam pair" refers to selected receive beams at an adjacent two of the locations 12a-12d, for example, the receive beams 14ac and 14bc. A beam pair need not be comprised of beams having the same beam index. Therefore, for example, another beam pair can include the beams 14ac and 14bb.

As used herein, the term "N-ping block" refers to a predetermined number, N, of positions of the receive array at which a ping is generated and a corresponding echo is received. For example, an exemplary N-ping block can correspond to four pings, to the four locations 12a-12d, and to the received beams 14aa-14dj as shown. However, it should be appreciated that the N-ping block can correspond to more than four or fewer than four pings. In one particular embodiment, for example, the N-ping block includes five hundred twelve pings, corresponding receive array locations, and corresponding receive array receive beams.

While a side-scan sonar tow body and receive beams are shown, it should be appreciated that the above terms and the following concepts apply also to a towed array, a hull-mounted array, or an array mounted on any other platform such as an unmanned, underwater vehicle (UUV). Also, while ten receive beams are shown at each of four locations 12a-12d, it should be appreciated that the receive array can be associated with more than ten or fewer than ten receive beams. While the locations 12a-12d are shown to be relatively widely spaced, it will become apparent in FIG. 1A below, that the locations at which pings and receive beams occur can be more closely spaced.

Figure 1A:
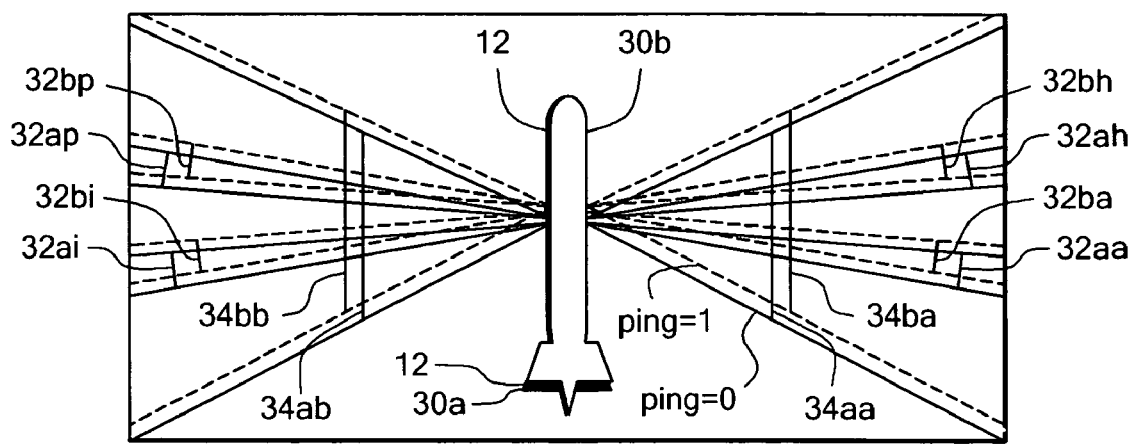
FIG. 1A is a top view pictorial of receive and transmit beams formed by a receive array and a transmit array used as part of the SAS system of FIG. 1.

Referring now to FIG. 1A, the side-scan sonar tow body 12 is shown at two locations 30a, 30b, which differ by only a small amount. For clarity, only some of a plurality of receive beams are shown. At the location 30a, receive beams 32aa, 32ah, 32ai, and 32ap are shown. At the location 30b, receive beams 32ba, 32bh, 32bi, and 32bp are shown. The location 30a and the receive beams 32aa, 32ah, 32ai, and 32ap are associated with a first ping=0, which corresponds to transmit beampatterns 34aa, 34ab. The location 30b and the receive beams 32ba, 32bh, 32bi, and 32 bp are associated with a second ping=1, which corresponds to transmit beampatterns 34ba, 34bb.

It will be appreciated that the transmit beampatterns 34aa, 34ab, 34ba, 34bb can have beamwidths substantially larger than the receive beampatterns 32aa, 32ah, 32ai, 32ap, 32ba, 32bh, 32bi, 32bp. Also, in one particular embodiment, there are only two transmit beampatterns as shown.

As described above, there can be any number of pings. However, unlike the receive beams 14aa-14dj of FIG. 1, the receive beams 32aa, 32ah, 32ai, and 32ap at the first location 30a overlap with ones of the receive beams 32ba, 32bh, 32bi, and 32bp at the second location 30b. This arrangement corresponds to a slower tow speed and/or a faster ping rate than shown above in FIG. 1.

Figure 1B:
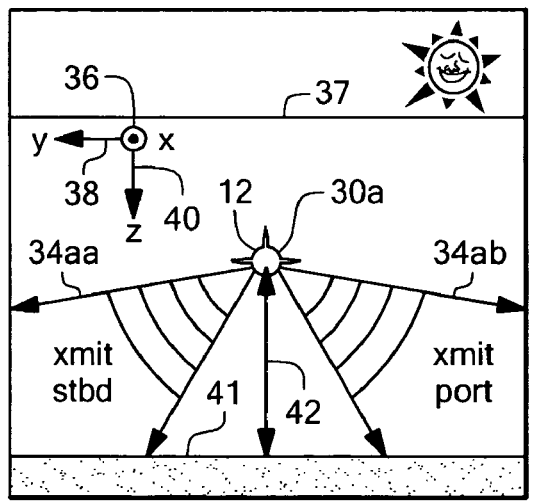
FIG. 1B is a forward view pictorial of transmit beams formed by a transmit array used as part of the SAS system of FIG. 1.

Referring now to FIG. 1B, in which like elements of FIG. 1 are shown having like reference designations, a front view of the tow body 12 at position 30a shows the two transmit beams 34aa and 34ab. Port and starboard direction are indicated relative to a local x, y, z coordinate system 36, 38, 40, respectively, having an x-axis 36 aligned with the tow body 12 at position 30a. The local coordinate system and the port and starboard designation are used below in mathematical relationships.

The tow body 12 is towed at an altitude 42 above a bottom surface 41 of the ocean or other body of water. The bottom surface 41 is used as a reference surface.

The transmit beams 34aa, 34ab, as shown do not appear to project sound vertically (or directly in a shortest path) to the bottom surface 41. However, one of ordinary skill in the art will understand that acoustic beampatterns are not bounded exactly as shown, and they do emit and/or receive energy at other angles as well, including but not limited to, a vertical angle directed toward the bottom surface 41.

Figure 1C:
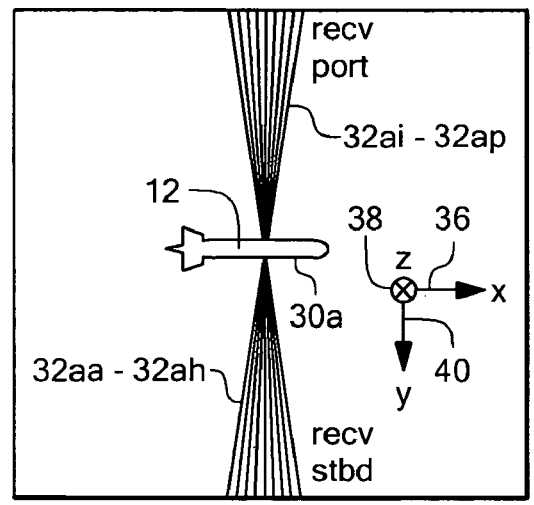
FIG. 1C is another top view pictorial of receive beams formed by a receive array used as part of the SAS system of FIG. 1.

Referring now to FIG. 1C, in which like elements of FIGS. 1A-1B are shown having like reference designations, the tow body 12 at position 30a has receive beams 32aa-32ah to starboard, and receive beams 32ai-32ap to port. While sixteen receive beams are shown, there can be more than sixteen or fewer than sixteen receive beams.

It should be appreciated that FIGS. 2-4, 4B, 5, 6, 7, 8, 8A, 9, and 10 show flowcharts corresponding to the below contemplated technique which would be implemented in computer system 20 (FIG. 1). The rectangular elements (typified by element 102 in FIG. 3), herein denoted "processing blocks," represent computer software instructions or groups of instructions. The diamond shaped elements (typified by element 116 in FIG. 3), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular system. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Figure 2:
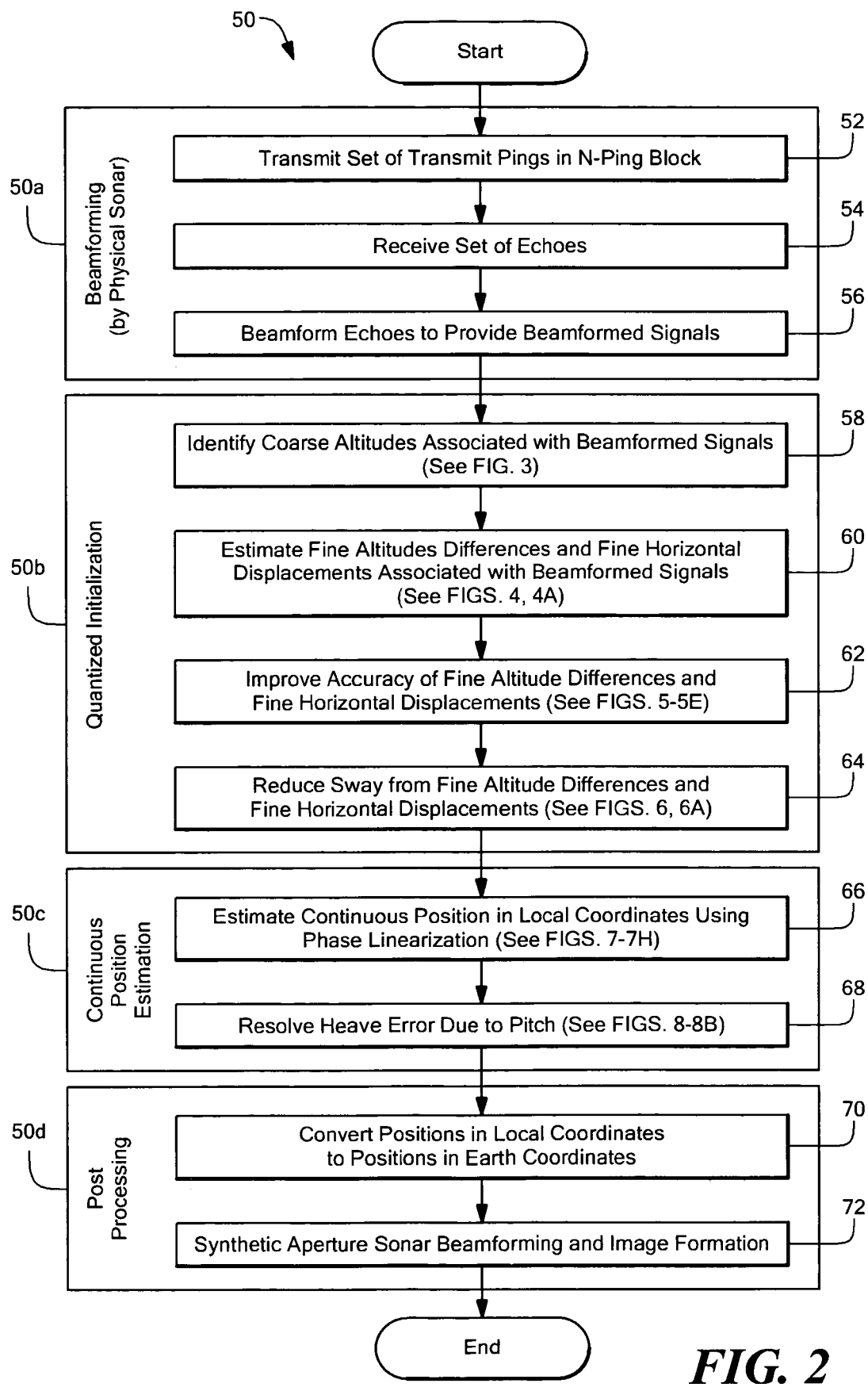
FIG. 2 is a flow chart showing a method of SAS motion prediction and image formation.

Referring now to FIG. 2, a process 50 can be implemented, for example, in the sonar processor 20 of FIG. 1. The process 50 begins at beamforming group of blocks 50a, where a physical sonar system transmits and receives an N-ping block, and beamforms the received echo signals.

Figure 7:
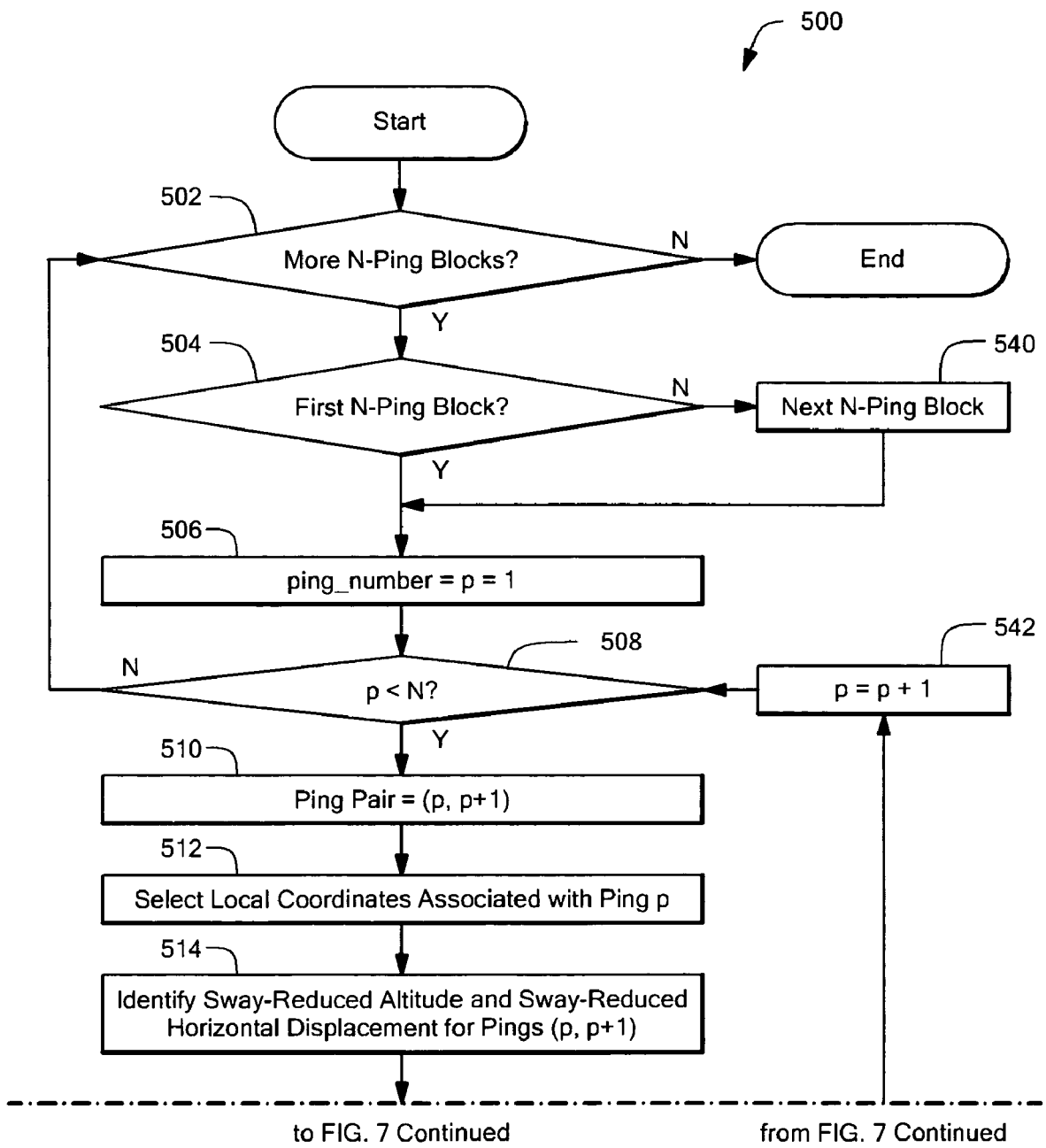
FIG. 7 is a flow chart showing yet further details of the method of FIG. 2.
Figure 7:
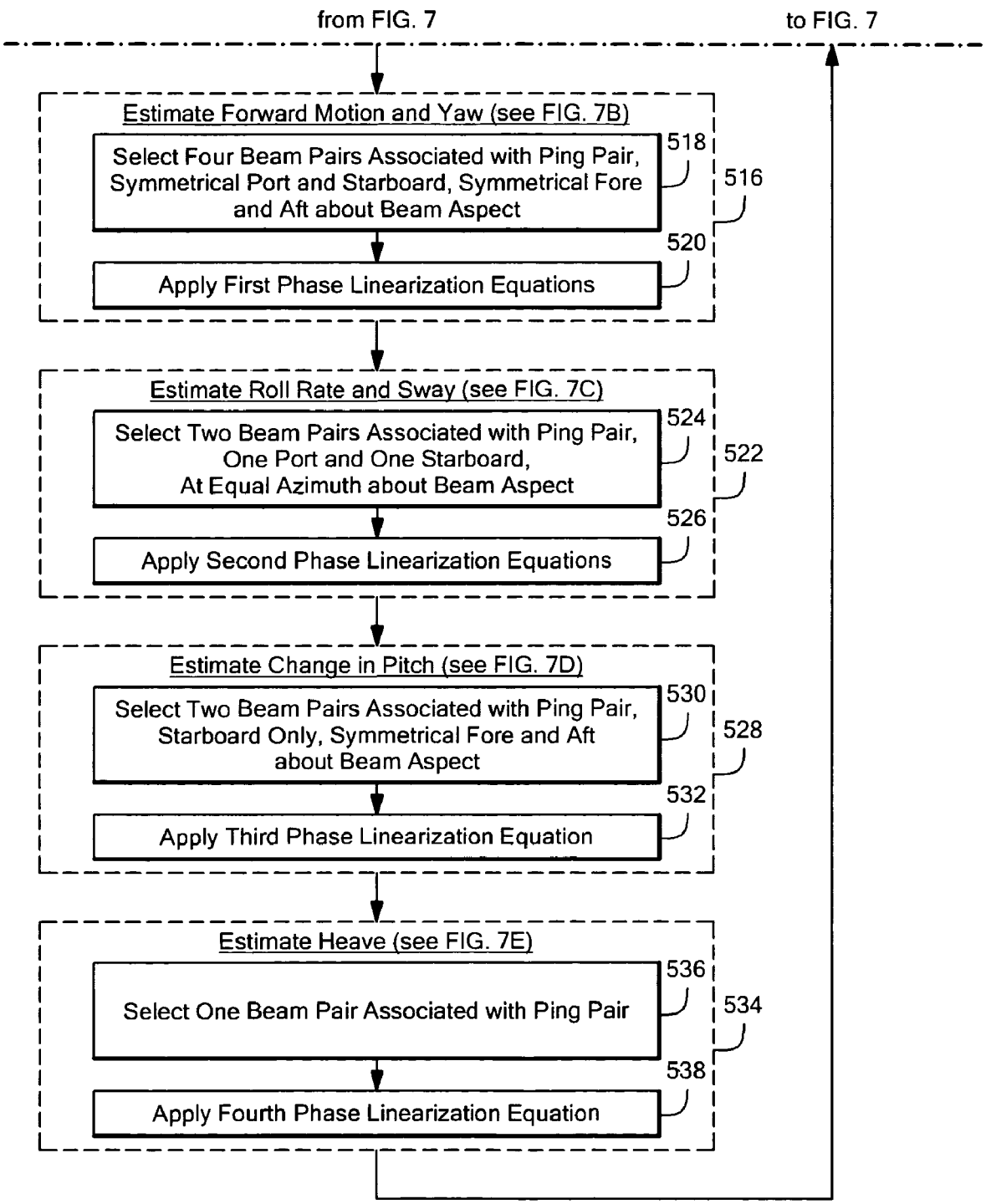

A general motion estimation method would result in motion estimates of the receive array in a continuous spatial domain. However, this cannot be directly achieved with discrete-time (i.e., digitally sampled) data. Therefore, motion estimation is performed in two stages. First, a quantized initialization group of blocks 50b provides a spatially quantized estimate of several types of motion of the receive array as it progresses through the water. Next, a continuous position estimation group of blocks 50c generates a spatially-continuous estimate of motion (location and/or position) of the receive array as it moves through the water using "Phase Linearization" criteria. The Phase Linearization criteria, further described below in conjunction with FIG. 7, provides a linearization of small perturbations in continuous spatial position of the receive array. The motion estimate from the quantized initialization group of blocks 50b is used as a linearization point in the continuous position estimation group of blocks 50c. The Phase Linearization criteria allows accurate, spatially continuous, motion estimation of the receive array as it progresses through the water. A post-processing group of blocks 50d provides synthetic aperture processing including, for example, coordinate transformations and image formation.

The beamforming group of blocks 50a begins at block 52, where a sonar system, for example a side-scan sonar system, transmits a set of transmit pings, in transmit beams and in an N-Ping block. The N-ping block is described above to include pings at plurality of locations of a receive array. Each ping can include one or more transmit beampatterns, for example, two transmit beampatterns as shown in FIG. 1B, where one is to port and the other to starboard of a direction of travel.

At block 54, a set of echoes are received from the bottom surface of water (i.e., a reference surface), each echo corresponding to one of the transmit pings. At block 56, a receive array provides receive beampatterns resulting in beamformed signals. The beamformed signals can correspond for example, to the beamformed signals 16a of FIG. 1. The receive beampatterns can correspond, for example, to the receive beampatterns 14aa-14dj of FIG. 1.

The quantized initialization group of blocks 50b begins at block 58 where, in conjunction with the beamformed signals, the sonar processor identifies "coarse" altitudes associated with positions of the receive array substantially concurrent with one or more of the pings in the N-ping block. Identification of the coarse altitudes is described more fully in conjunction with FIG. 3. However, let it suffice here to say that the coarse altitudes are identified by way of a time delay associated with a sound propagation vertically to and from the bottom surface of the body of water.

At block 60, in conjunction with the beamformed signals, the sonar processor identifies "fine" altitude differences and "fine" horizontal displacements associated with positions of the receive array substantially concurrent with one or more of the pings in the N-ping block. Identification of the fine altitude differences and fine horizontal displacements is described more fully in conjunction with FIG. 4 and FIG. 4A. However, let it suffice here to say that the fine altitude differences are identified by way of a correlation of a beamformed signal at a location of each ping with a beamformed signal at a prior location. In one particular embodiment, the correlations are clipped correlations, as described, for example, in conjunction with FIGS. 11-11C.

At block 62, the fine altitude differences and fine horizontal displacements generated at block 60 are improved to provide greater accuracy and resolution, providing "high-precision" altitude differences and "high-precision" horizontal displacements. Identification of the high-precision altitude differences and high-precision horizontal displacements is described more fully in conjunction with FIGS. 5-5E. However, let it suffice here to say that the high-precision altitude differences and high-precision horizontal displacements are identified by way of an interpolation process performed upon the correlations of block 60.

At block 64, a correction for random sway (random horizontal displacements) is made, providing "sway-reduced" altitudes and "sway-reduced" horizontal displacements. Sway reduction is described more fully below in FIGS. 6 and 6A. However, let is suffice here to say that random horizontal displacements are identified and removed from the high-precision altitude differences and high-precision horizontal displacements.

Figure 7A:
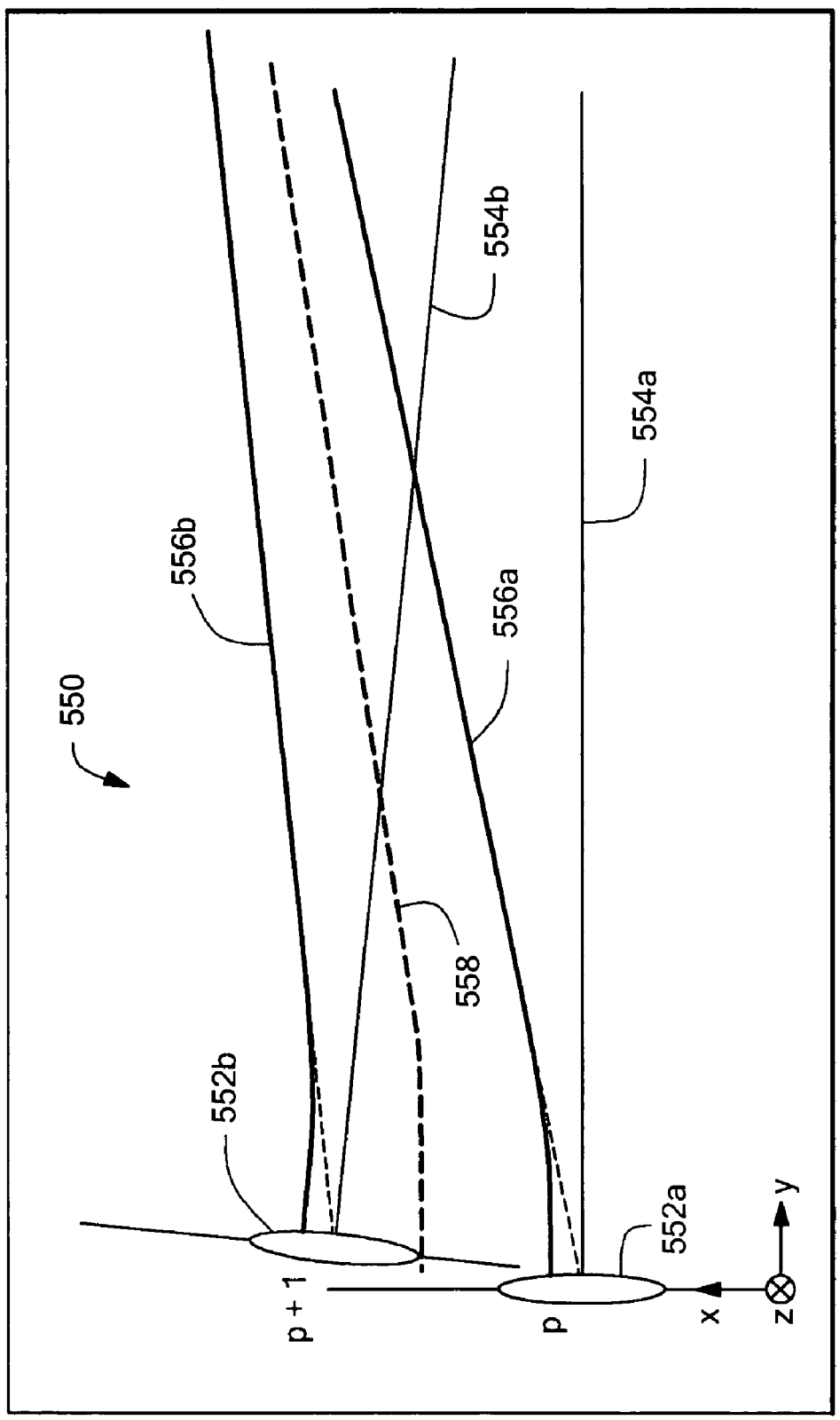
FIG. 7A is a pictorial showing beam intersections with the ocean bottom used to discuss the method of FIG. 7.
Figure 7B:
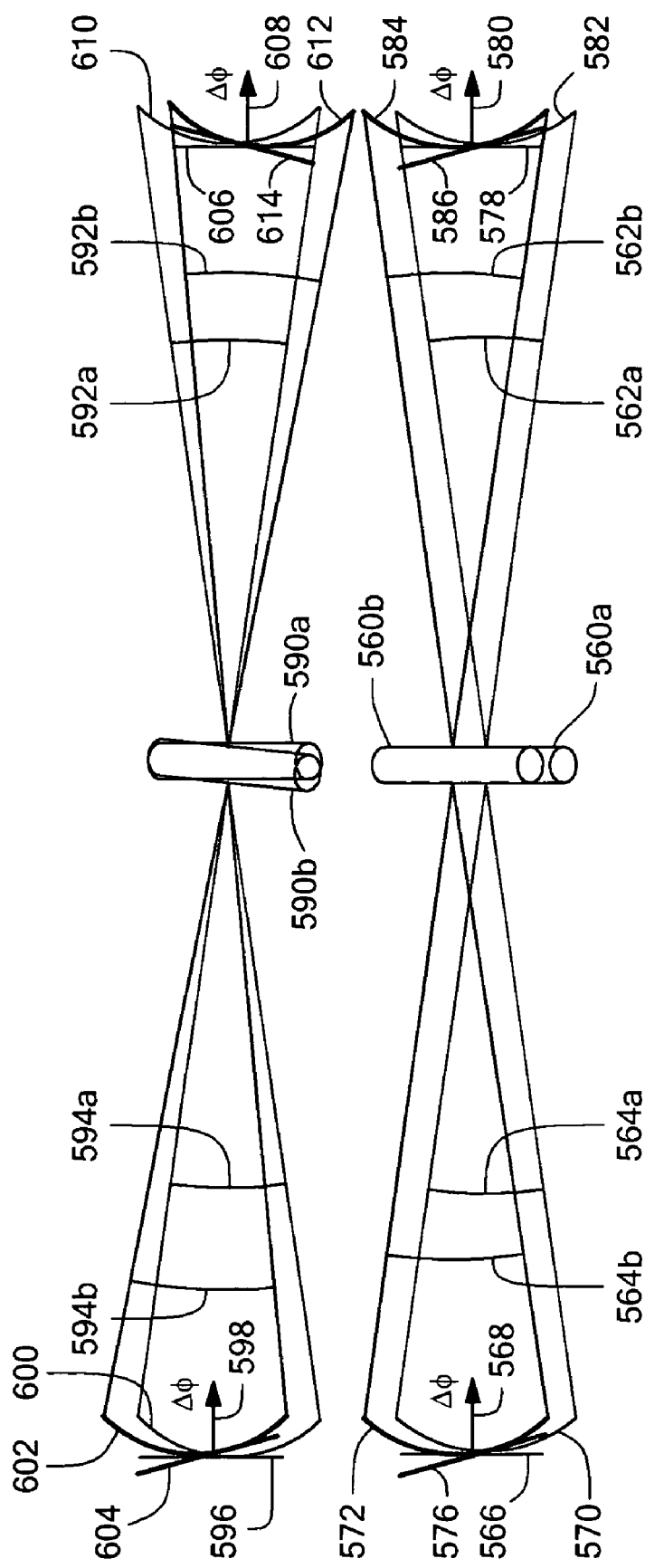
FIG. 7B is a pictorial showing forward motion and rotation (yaw) of a receive array identified in conjunction with the method of FIG. 7.
Figure 7C:
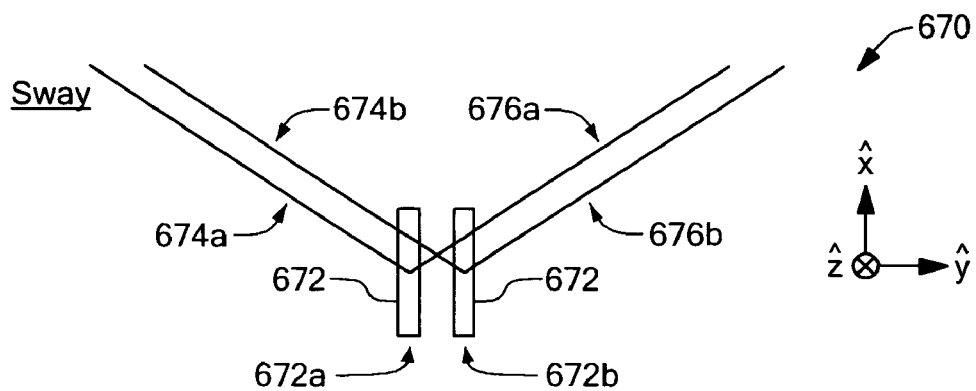
FIGS. 7C-7E taken together are pictorials showing roll rate and horizontal motion (sway) of a receive array identified in conjunction with the method of FIG. 7.
Figure 7D:
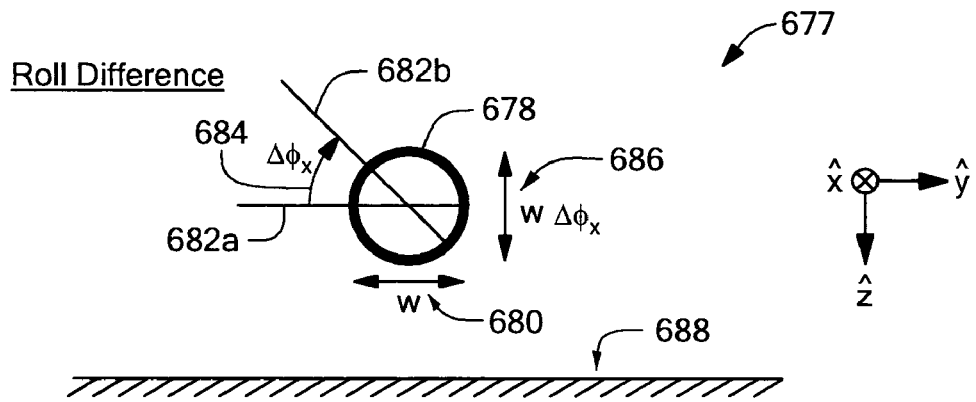
Figure 7E:
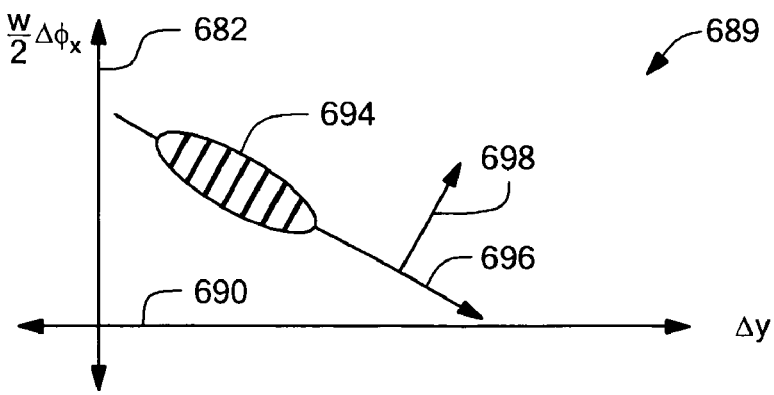
Figure 7F:
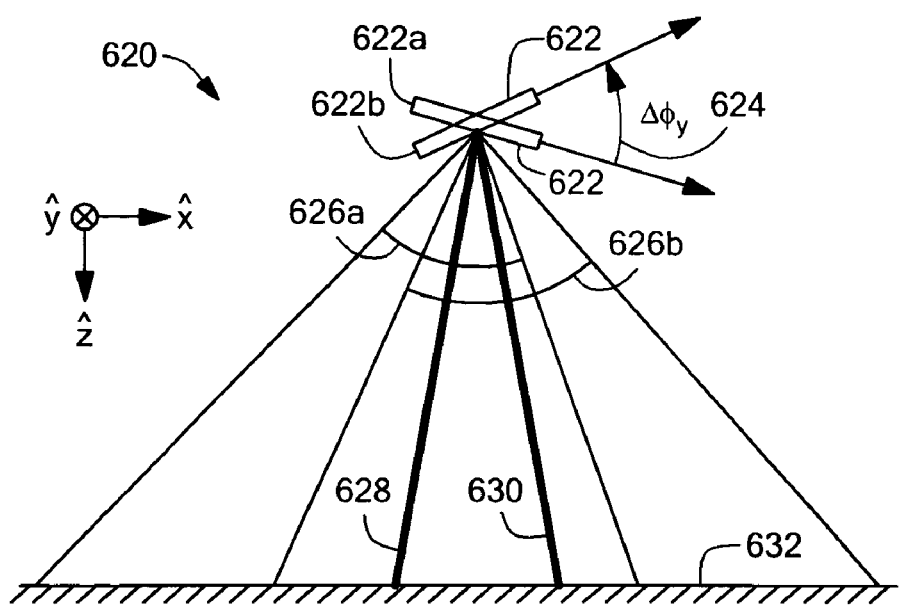
FIGS. 7F and 7G taken together are pictorials showing change in pitch of a receive array identified in conjunction with the method of FIG. 7.
Figure 7G:
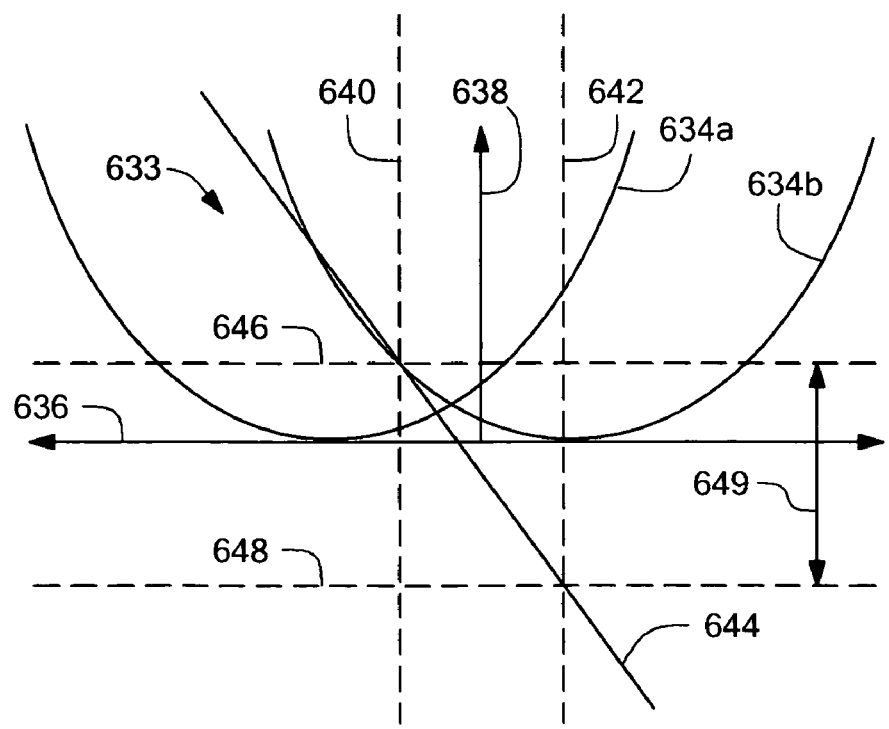
Figure 7H:
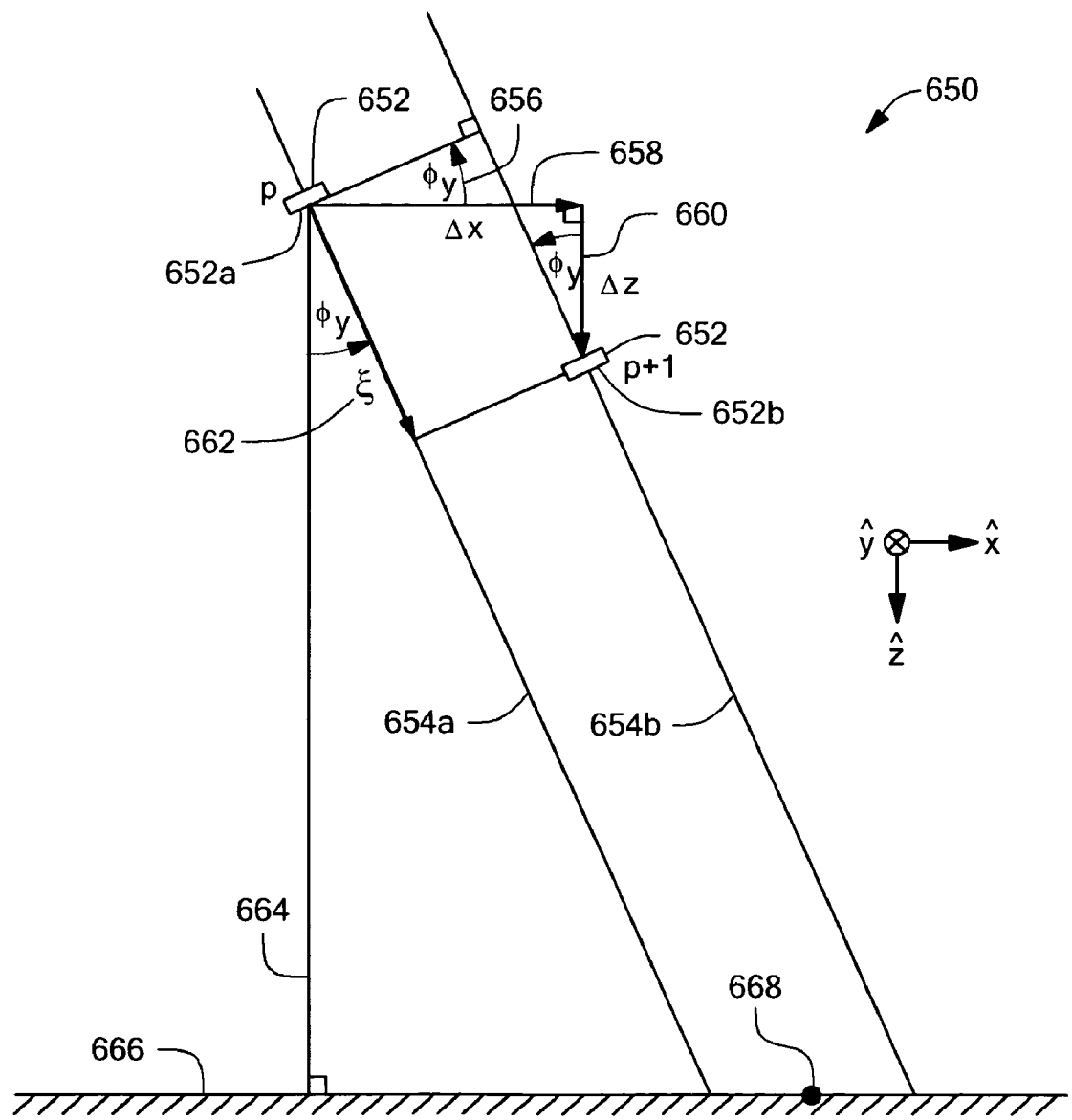
FIG. 7H is a pictorial showing vertical motion (heave) of a receive array identified in conjunction with the method of FIG. 7.

The continuous position estimation group of blocks 50c begins at block 66, where continuous positions of the receive array are calculated by applying the sway-reduced altitude differences and the sway-reduced horizontal displacements to "phase linearity equations." The phase linearity equations are described more fully in conjunction with FIGS. 7-7H. However, let it suffice here to say that the phase linearity equations make use of receive array symmetries in order to geometrically calculate motion in several degrees of freedom. In one particular embodiment, the phase linearity equations can provide estimates of motion of the receive array in six degrees of freedom. As will be described below, the resulting heave (vertical motion) position estimates may be contaminated by errors resulting from a DC pitch of the receive array. At block 68, heave errors due to DC pitch are resolved and reduced as described in more detail with FIGS. 8-8B. The post processing group of blocks 50d begins at block 70, where if the above calculations were done in a coordinate system local to the receive array, then the position estimates are converted to earth coordinates, for example, north-east-down (NED) coordinates. At block 72, the position estimates are used to perform synthetic aperture sonar beamforming and image formation.

It should be apparent from the above discussion that blocks 58-64 provide increasingly accurate estimates of altitude and horizontal displacement. Coarse altitudes and coarse horizontal displacements are provided at block 58, fine altitude differences and fine horizontal displacements are provided at block 60, high-precision altitude differences and high-precision horizontal displacements are provided at block 62, and sway-reduced altitude differences and sway-reduced horizontal displacements are provided at block 64. Block 66 provides even more accurate positions with up to six unquantized degrees of freedom, and block 68 removes a pitch contamination of heave (altitude) calculations.

Figure 3:
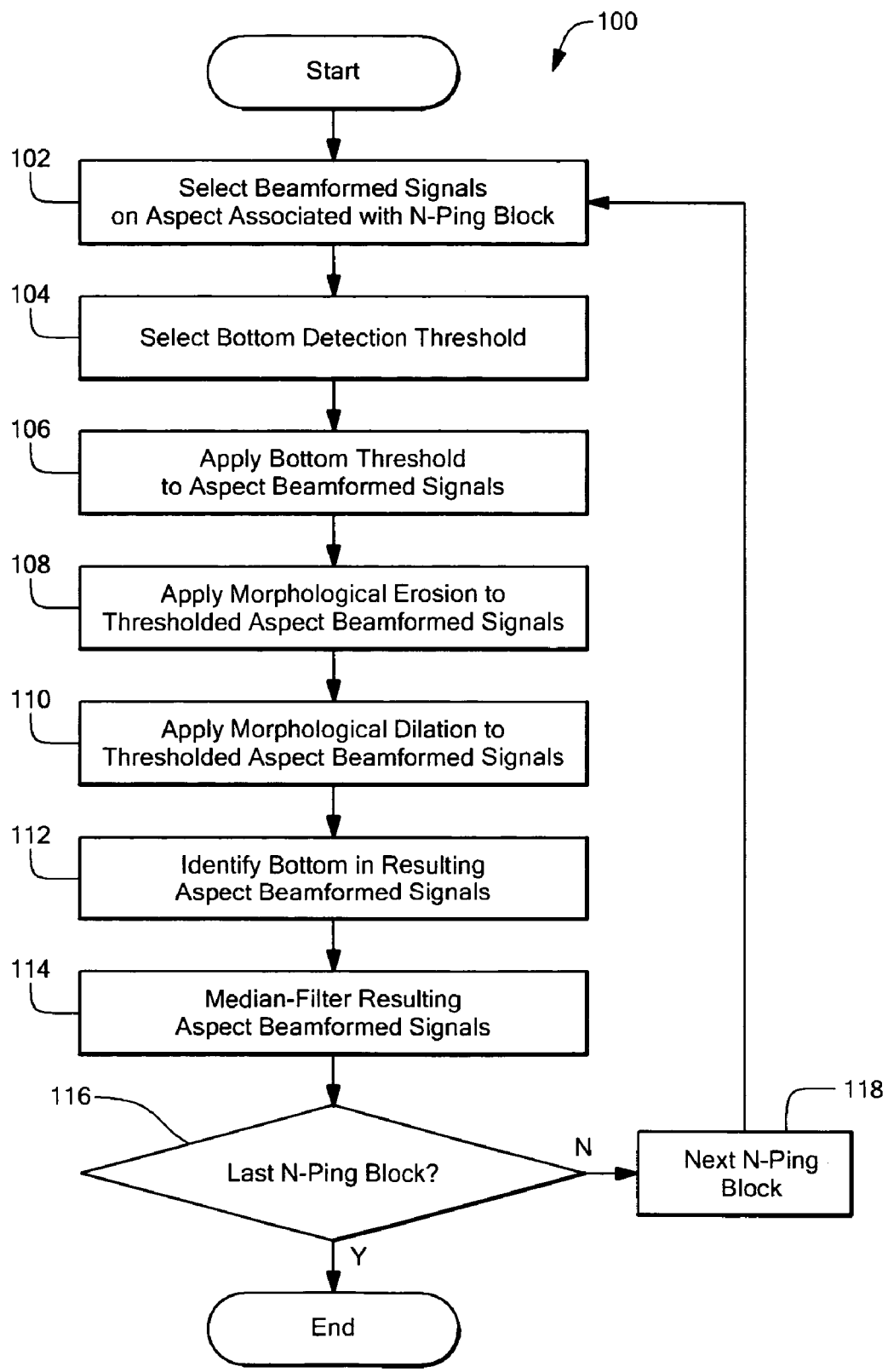
FIG. 3 is a flow chart showing further details of the method of FIG. 2.

Referring now to FIG. 3, a process 100, which provides the coarse altitudes described above in conjunction with block 58 of FIG. 2, begins at block 102, where a plurality of beamformed signals are selected associated with an N-ping block, each beamformed signal associated with an aspect beam (essentially perpendicular to a direction of travel). At block 104, a bottom detection threshold is selected and at block 106, the selected beamformed signals are compared to the bottom detection threshold. Resulting signals are processed at block 108 using morphological erosion and at block 110 using morphological dilation.

Morphological erosion is a known technique that can be applied to thresholded data, to eliminate small sets of foreground (sea floor) samples that are spatially surrounded by background (water column) samples. This removes clutter such as fish in the water column, but also shifts the nadir return to longer range. Morphological dilation is a known technique that can be applied to the eroded data to restore the remaining nadir return to almost its original position, without bringing back the clutter removed by erosion. The net result is a more accurate detection of the bottom surface in block 112.

At block 114, two or more detections of the bottom surface associated with a respective two or more pings can be median filtered. For example, for each ping, the detection of the bottom surface associated with that ping and also bottom detections associated with pings before and after, for example three pings before and three pings after, can be used to provide a median coarse altitude associated with that ping.

At block 114, having completed coarse altitude determinations for all pings of an N-ping block, if it is the last N-ping block as shown by decision block 116, the process ends. If there is another N-ping block, the process moves to the next N-ping block accordingly at block 118, the process returns to step 102, and the process 102 through 114 repeats for another N-ping block.

Figure 4:
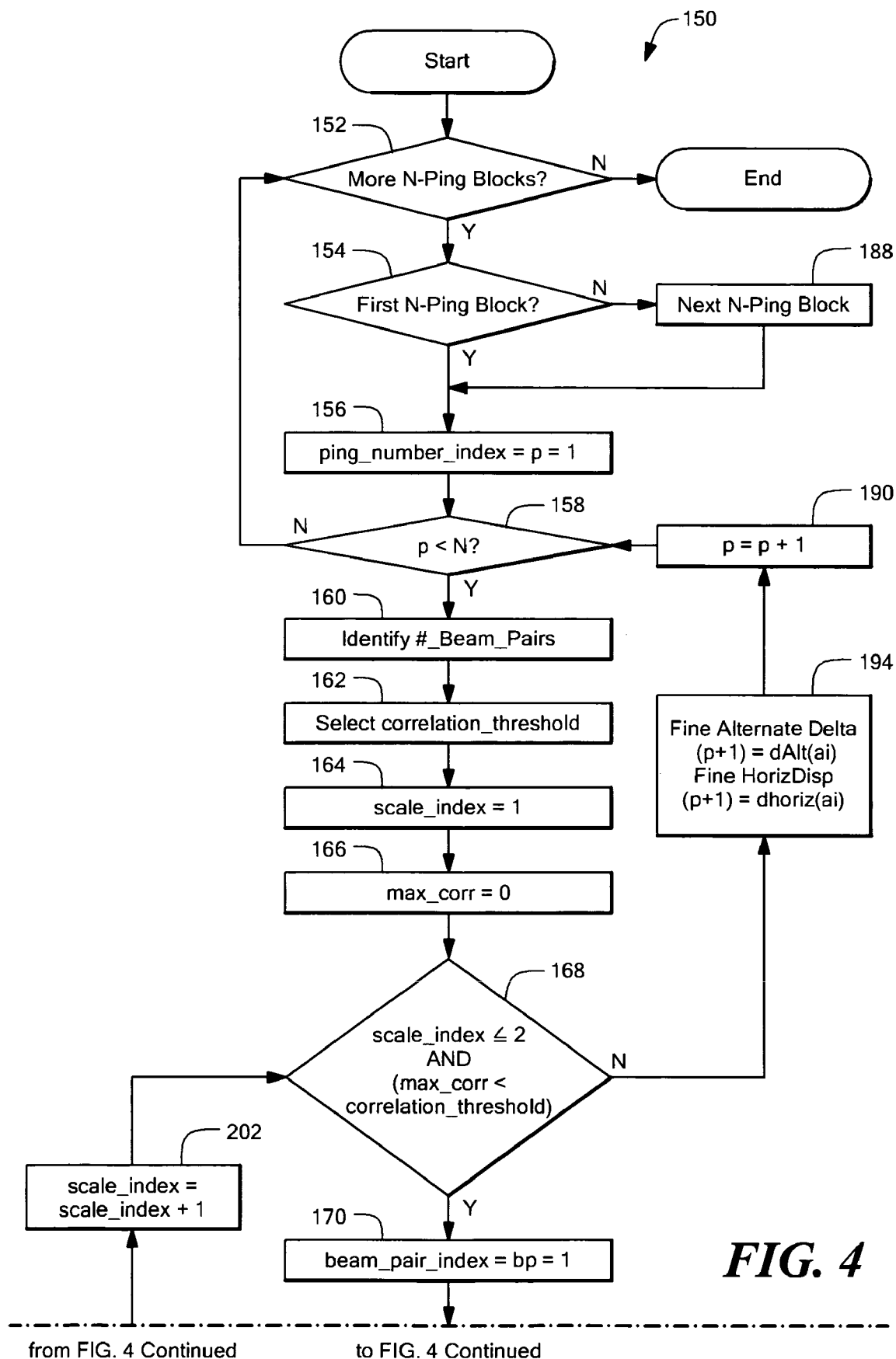
FIG. 4 is a flow chart showing further details of the method of FIG. 2.
Figure 4:
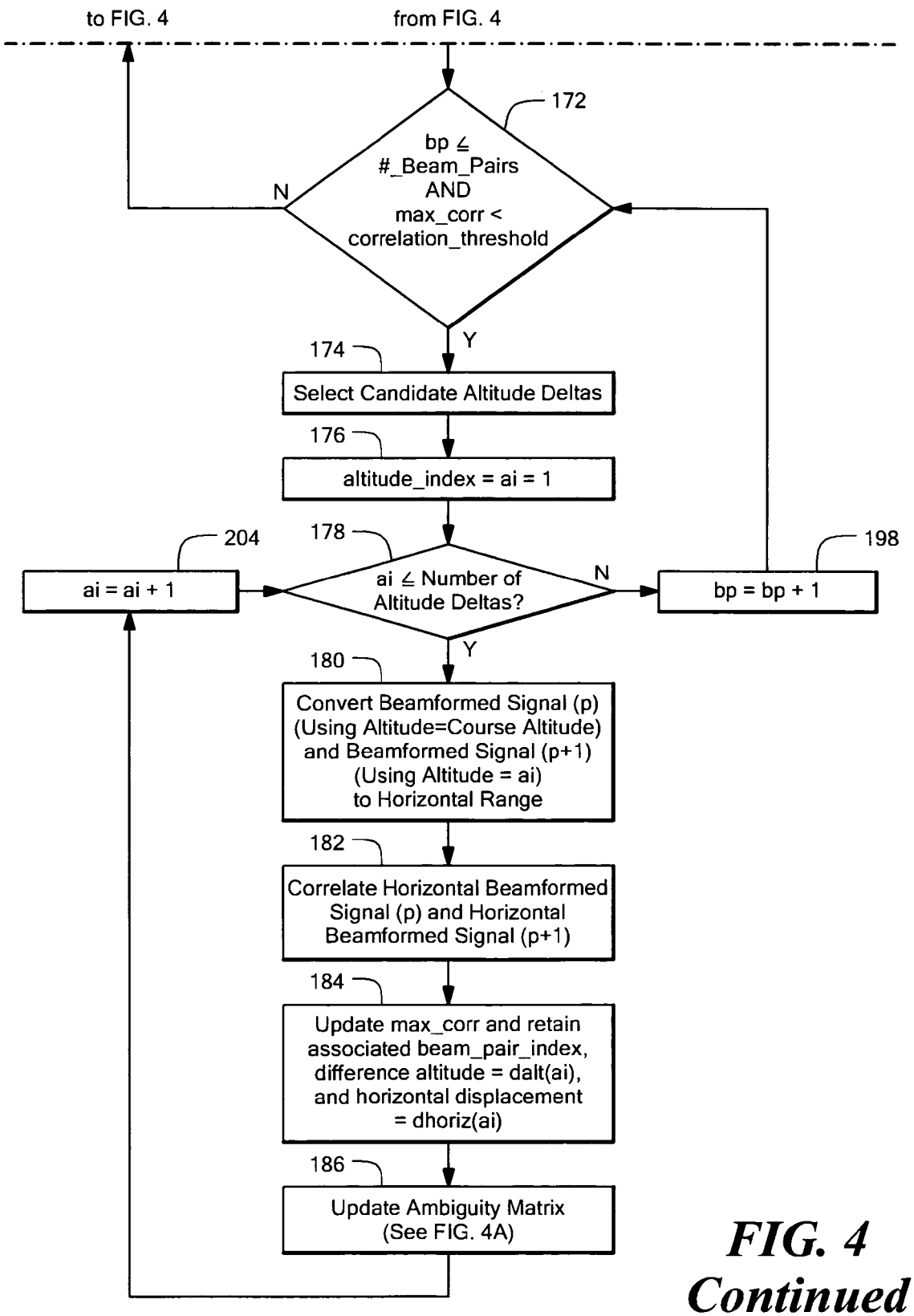

Referring now to FIG. 4, a process 150 is used to generate fine altitude differences and fine horizontal displacements in accordance with block 60 of FIG. 2. The process 150 is an adaptive process that, in association with block 202 described below, uses a multi-scale search to estimate altitude differences (changes). A set of candidate beam pairs is used since there is no prior knowledge of which beam pairs will spatially overlap best for unknown motion. In a particular embodiment, the multi-scale search first tries each of a small set of relatively small candidate altitude differences, i.e., a first "scale," associated with common physical motions. If processing with the first scale fails to yield an acceptable solution, then processing is repeated with a second scale, i.e., a larger set of candidate altitude differences including more extreme altitude differences. Typically, the processing at the second scale will only be needed for a small percentage of the ping pairs.

The process 150 begins at decision block 152, where, for the first N-ping block, the process continues to decision block 154. If at decision block 154, it is the first N-ping block, the process continues to block 156, where a ping number index, p, is initialized to one.

At decision block 158, if the ping number index, p, is less than N, the number of pings in the N-ping block, the process continues to block 160, where a set of beam pairs associated with each ping is identified. Beam pairs are described above. In one particular embodiment, there are two beam pairs associated with each ping. For example, one beam pair can include a beam-aspect receive beam at the first location of the receive array and a beam-aspect receive beam at the second location of the receive array. In this example, another beam pair can include a beam-aspect receive beam at the first location of the receive array and a beam pointed slightly to the rear at the second location of the receive array. With this particular embodiment, it should be recognized that the receive beams at the first and second locations of the receive array can point to the same region of the bottom surface of the water body, even though they have different beam indices, because the receive array has moved forward in the interval between the associated pings.

At block 162, a correlation threshold, correlation_threshold, is identified, which is applied to correlation vectors described below. At block 164, a scale index, scale_index, is initialized to one. As discussed above, motion of many types of sonar platforms usually has only small altitude changes from ping to ping, but occasionally has larger changes. As used herein, the term "scale" refers to a set of candidate altitude differences spanning an altitude difference range. Different scales having progressively larger altitude difference ranges can be processed to facilitate rapid searching over the more likely scales, which have smaller altitude difference ranges. In a particular implementation, the set of candidate altitude differences are equally spaced, to uniformly search over altitude. However, in other implementations, the altitude differences are non-uniformly spaced. The scale index, scale_index, is indicative of a particular set of candidate altitude differences.

At block 166, a maximum correlation vector variable, max_corr, is initialized to zero. The maximum correlation vector variable is used to retain a maximum value of an envelope of the coherent correlation vector value associated with correlations below. It will become apparent from discussion below that max_corr is associated with a fine altitude difference and a fine horizontal displacement of the receive array.

The process proceeds to decision block 168, where, if scale_index is less than or equal to the number of scales (e.g., two) and max_corr is less than correlation_threshold (i.e., no acceptable altitude difference has been found, but untried candidate altitude differences remain), then the process proceeds to block 170 where a beam pair index, beam_pair_index=bp, is initialized to one. As described above, the beam pair index is a number than identifies one of one or more beam pairs. Each member of a beam pair is associated with a different adjacent location of the receive array and a corresponding different ping. Any of a plurality of receive beams at each of the two locations can be in the beam pair.

The process proceeds to decision block 172, where, if bp is less than or equal to the number of beam pairs and if max_corr is less than the correlation threshold, then the process proceeds to block 174, where a group of candidate altitude differences associated with the scale is selected.

At block 176, an altitude index, altitude_index=ai, is initialized to one. The altitude index is an index number that identifies which one of the candidate altitude differences is used in subsequent processing. At decision block 178, if altitude_index is less than or equal to the number of candidate altitude differences selected at block 174, then the corresponding candidate altitude difference is evaluated starting at block 180.

At block 180, beamformed signals for each of the beamformed signals in the beam pair (e.g., associated with pings p and p+1) are converted to horizontal aspect (i.e., horizontal-range). The beam in the beam pair at ping=p is converted using the coarse altitude identified in FIG. 3 and the beam in the beam pair at ping=p+1 is converted using a candidate altitude equaling the ping=p coarse altitude plus the candidate altitude difference identified by altitude_index=ai. One of ordinary skill in the art will understand how to perform the slant-range to horizontal-range conversion.

At block 182, the resulting horizontal-range beamformed signals are correlated, resulting in a correlation vector having correlation values. Within the correlation vector, it is anticipated that one of the vector values may be higher than the other vector values, and may be indicative that the selected candidate altitude difference associated with altitude_index=ai is the actual altitude difference between the altitudes of the receive array at pings p and p+1. Also, a horizontal-range shift used in the correlation to achieve the high correlation value may be associated with a horizontal displacement of the receive array between pings p and p+1. However, a still higher correlation value may be achieved in a correlation vector for another candidate altitude. In one particular embodiment, the correlations are clipped correlations, as described, for example, in conjunction with FIGS. 11-11C.

At block 184, the max_corr, previously initialized to zero at block 166, is updated to equal the maximum of either max_corr or the maximum correlation vector value of the correlation vector generated at block 182. The maximum correlation vector value is retained along with the associated beam_pair_index, the associated difference altitude=dalt(ai) corresponding to the candidate altitude_index=ai, and a potential horizontal displacement=dhoriz(ai) associated with the maximum vector value.

At block 186, an ambiguity matrix is updated. The ambiguity matrix will be understood from discussion in conjunction with FIG. 4A. However, let it suffice here to say that the ambiguity matrix is a numerical matrix for which each row corresponds to a correlation having correlation values computed in block 182 and each different row corresponds to a correlation generated at a different candidate altitude difference.

The process proceeds to block 204, where the candidate altitude difference is updated by incrementing altitude_index=ai to ai+1. The process loops though blocks 178-186 and 204 until each candidate altitude difference has been evaluated. At each loop, the maximum correlation value, max_corr, is retained along with the associated beam_pair_index, the associated difference altitude=dalt(ai), and a potential horizontal displacement=dhoriz(ai) associated with the maximum vector value. With this arrangement, a maximum vector value from among a plurality of correlation vectors is identified along with associated information.

The ambiguity matrix updated at block 186 is iteratively constructed as the process loops though blocks 178-186 and 204. The ambiguity matrix is further described below in conjunction with FIG. 4A. However, as described above, the ambiguity matrix is a matrix of vector values, each different row corresponding to a correlation vector generated in block 182 at a different candidate altitude difference indexed at block 204. At least one of the vector values in the matrix is a largest value equal to max_corr.

Subsequent processing beginning at block 198 provides exception processing, for the case where a suitable max_corr value was not obtained in blocks 178-186 and 204. At block 198, beam_pair_index is incremented by one and the process proceeds again to decision block 172. If at decision block 172, the processing of blocks 178-186 and 204 did not provide a suitable max_corr valued, i.e., if max_corr is less than the correlation threshold selected at block 162 and if the new beam pair is not beyond the last beam pair, i.e., if the beam_pair_index is less than or equal to the number of beam pairs, then the process of blocks 174-186, 198, and 204 is repeated using the new beam pair. If, however, the above conditions are not met, then the process proceeds to block 202, where the scale index is incremented.

As described above, a greater scale index corresponds to a set of less commonly occurring altitude differences used in the horizontal range conversions of block 180. The process proceeds to decision block 168, where, if the processing of blocks 178-186, 198, and 204 did not provide a suitable max_corr value, i.e., if max_corr is less than the correlation threshold selected at block 162 and if the new scale is not beyond the final scale, then the process of blocks 170-186, 198 and 204 is repeated for the candidate altitude differences at the new scale index. If, however, the above conditions are not met, then the current altitude difference and horizontal range shift corresponding to max_corr are accepted at block 194 even if the maximum correlation was beneath the correlation threshold. Then, the process proceeds to block 190.

The process proceeds to block 190 where the ping pair is incremented by incrementing p=p+1 and the process proceeds to decision block 158. If at decision block 158, all of the pings in the ping block have not been used in the processing, then the process of blocks 160-186, 204, and 202 repeats with the new ping pair. If however, at decision block 158, all of the pings in the ping block have been processed, then the processing proceeds to decision block 152. At decision block 152, if there are no more N-Ping blocks, the process ends. However if there is another N-ping block, the process repeats, incrementing to the next N-ping block at block 188.

From the above discussion, and in summary, it should be apparent that for each ping pair, the corresponding beam-formed signals associated with a beam pair are first converted to horizontal range. The first one of the beams in the beam pair is converted using a coarse altitude as identified by the process 100 of FIG. 3. The second one of the beams in the beam pair is converted using a variety of candidate altitude differences. A correlation of the two horizontal range beamformed signals yields not only a fine altitude difference, but also a fine horizontal displacement between locations of a receive array corresponding to the two pings in the ping pair.

Figure 4A:
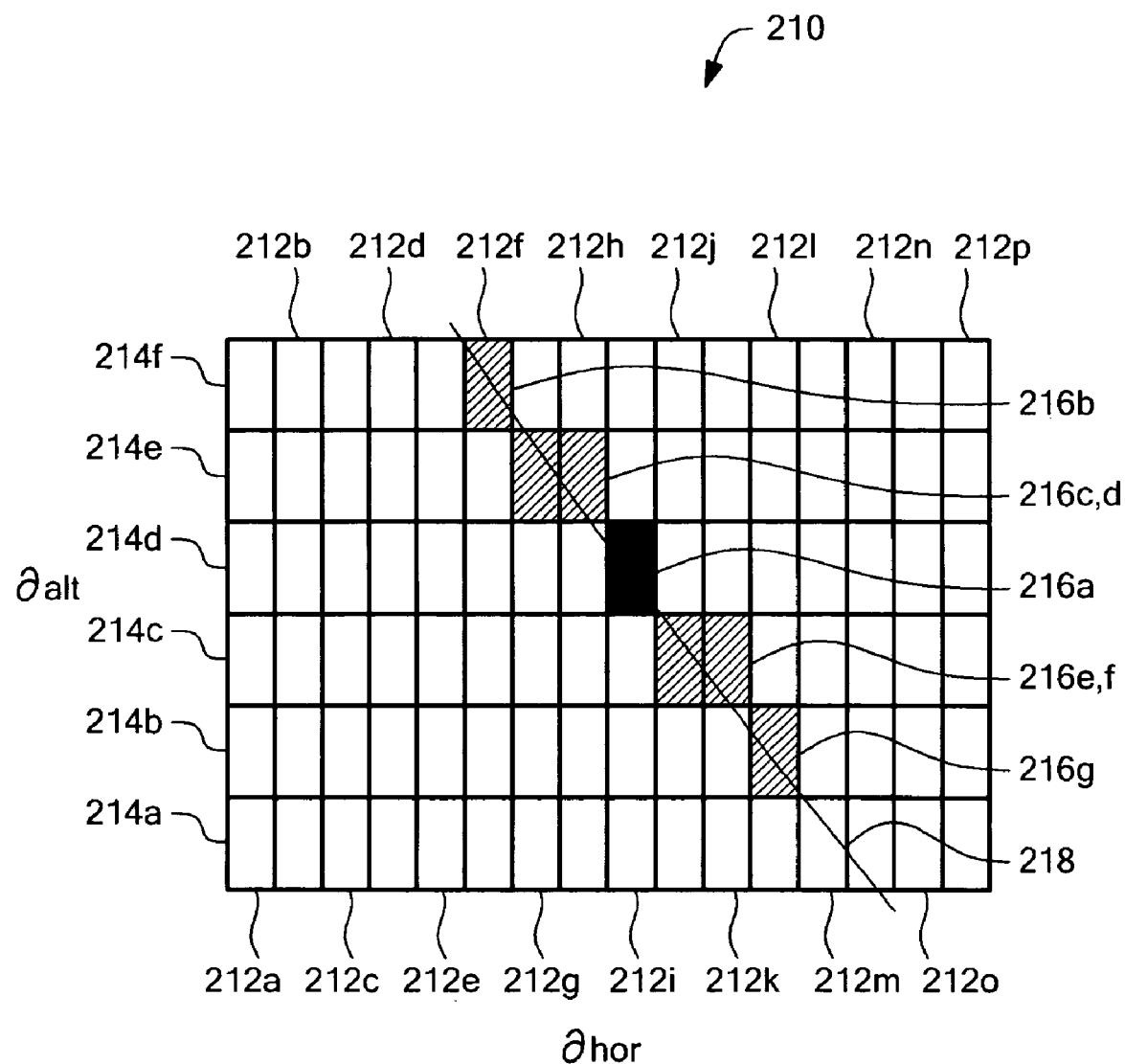
FIG. 4A is a pictorial showing an ambiguity matrix generated in conjunction with the method of FIG. 4.

Referring now to FIG. 4A, an ambiguity matrix 210, such as that generated at block 200 of FIG. 4 includes columns 212a-212p associated with time delays, which are equivalent to horizontal displacements. The ambiguity matrix also includes rows 214a-214f corresponding to correlations using the candidate altitude differences indexed by the altitude_index=ai.

Each row of the ambiguity matrix is generated as a correlation having correlation values represented by boxes along each row. The correlation vectors can be those associated with block 182 of FIG. 4. The correlation values of the ambiguity matrix are shown, where the darkest box 216a has the highest correlation, the many white boxes have nearly zero correlation, and the crosshatched boxes have intermediate correlation values. The crosshatched boxes 216b-216g have fairly high correlation and might be mistaken for a peak (e.g., box 216a) in the presence of noise. As used herein, an ellipse-like set of boxes 216a-216g is referred to as an "ambiguity surface." A "major axis of ambiguity" 218 can be generated passing through the fairly high-correlation boxes 216a-216g of the ambiguity surface.

Figure 5:
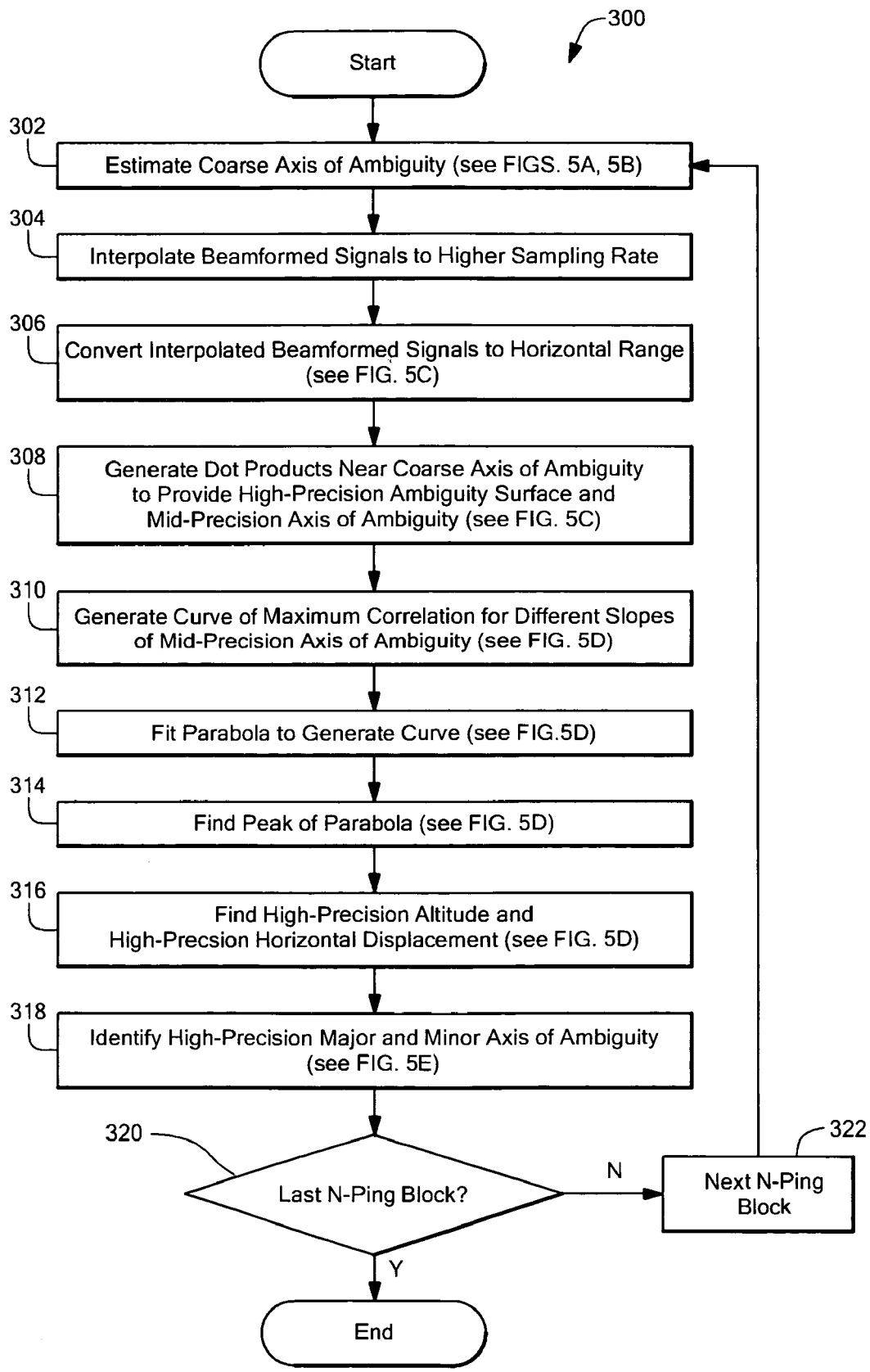
FIG. 5 is a flow chart showing yet further details of the method of FIG. 2.

Referring now to FIG. 5, a process 300 associated with the block 62 of FIG. 2 begins at block 302 where a coarse major axis of ambiguity is drawn through the maximum vector values of correlation vectors. A coarse major axis of ambiguity 218 is shown, for example, in FIG. 4A.

The ambiguity matrix thus far described, for example, the ambiguity matrix 210 of FIG. 4A has a particular resolution and precision in horizontal range and in altitude. The resolution is the size of the ambiguity surface, which is controlled primarily by the transmit signal and the width of the depression angle swath used in correlation. It is independent of quantization effects. In contrast, the precision with which the peak of the ambiguity surface can be measured is directly linked to the spatial sampling rate. The precision in altitude is determined by a granularity of the candidate altitude differences selected at block 174 of FIG. 4. The horizontal range precision is determined by the spatial sampling rate used in the conversion to horizontal range in block 180 of FIG. 4. The coarsest allowable precision is controlled by Nyquist rate issues in the time-domain transmit signal, etc., which is in turn linked to the ambiguity surface resolution.

In order to improve the precision of the major axis of ambiguity, it would be desirable to have a finer horizontal spacing of the boxes, for a more precise estimate of the horizontal-range shift of peak correlation for a given altitude difference. Therefore, at block 304, the beamformed signals are interpolated to a higher sampling rate, which is used at block 306 to convert interpolated beamformed signals to horizontal range at a higher spatial sampling rate. The ambiguity matrix is regenerated with correspondingly smaller horizontal boxes in block 308.

In one particular embodiment, the higher density ambiguity matrix is only populated in the vicinity of the known coarse axis of ambiguity, since it is highly likely that an altitude and a horizontal displacement identified in the coarse ambiguity matrix is close to that identified by the maximum vector value in the higher density ambiguity matrix. One of ordinary skill in the art will understand that each entry in the ambiguity matrix is generated during the correlations by a dot product of the two-beamformed signals. Therefore, individual cells of the ambiguity surface can be populated (calculated) with dot products. The use of dot products results in a rapid population of the ambiguity surface in the vicinity of the coarse axis of ambiguity.

In an alternate arrangement, however, the full correlations described in conjunction with FIG. 4 can be regenerated using a finer spacing of time delays to populate the entire higher density ambiguity surface. Using full correlations would likely take more processing time than calculating only dot products in the vicinity of the known coarse axis of ambiguity.

With either arrangement, a mid-precision major axis of ambiguity can be established from the high-precision ambiguity surface.

The mid-precision major axis of ambiguity corresponds to the slope of the high-amplitude portion of the ambiguity matrix, i.e., the ambiguity surface. In order to estimate the slope precisely, block 310 postulates a set of candidate slopes, $\partial alt/\partial hor$, and plots the maximum over all horizontal shifts of the sum over all altitudes of the correlation along a line of slope $\partial alt/\partial hor$ on the ambiguity surface. The curve is further described below in conjunction with FIG. 5D.

At block 312, a parabola or other mathematical function is fit to the curve generated at block 310. The mathematical function is also further described below in conjunction with FIG. 5D.

At block 314, a peak of the parabola or other mathematical function is identified. The peak of the parabola is associated with a high-precision altitude difference and a high-precision horizontal displacement.

At block 316, the high-precision altitude difference and high-precision horizontal displacement are identified in accordance with the peak of the mathematical function.

At block 318, high-precision major and minor axes of ambiguity are determined. The high-precision major axis of ambiguity passes through the high-precision altitude difference and high-precision horizontal displacement on the high-precision ambiguity surface identified at block 316. The high-precision minor axis of ambiguity is perpendicular to the major axis of ambiguity.

If the last N-ping block has been processed, then at decision block 320, the process ends. If the last N-ping block has not been processed, then as shown in block 322 the next N-ping block is selected and the process 302-320 is repeated.

Figure 5A:
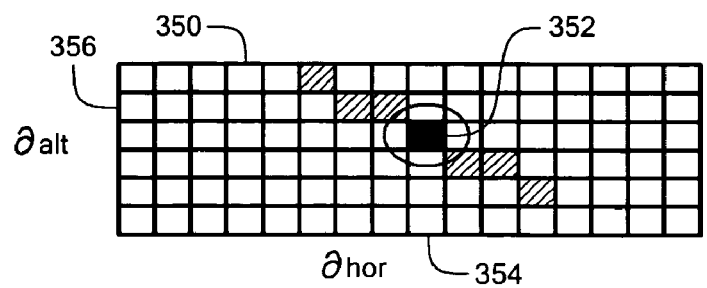
FIGS. 5A-5E are pictorials showing ambiguity matrices and axes of ambiguity generated in conjunction with the method of FIG. 5.

Referring now to FIG. 5A, the maximum correlation value may occur in either a single box 352 or it may occur in a plurality of boxes. In a particular embodiment, an arbitrary one of the plurality of boxes with maximum correlation is chosen as the peak. The box 352 of maximum correlation is associated with a fine horizontal displacement 354 and with a fine altitude difference 356, which are identified by a column and a row, respectively, of the box 352.

Figure 5B:
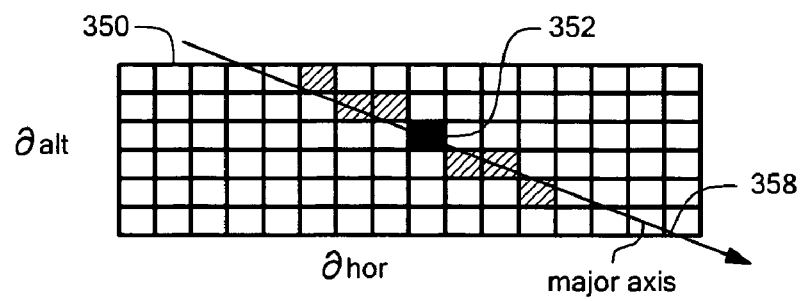

Referring now to FIG. 5B, in which like elements of FIG. 5A are shown having like reference designations, a coarse major axis of ambiguity 358 is estimated to pass through the maximum vector value 352 and other maximums in other rows of the ambiguity surface 350. The coarse major axis of ambiguity is estimated, for example, in block 302 of FIG. 5.

Figure 5C:
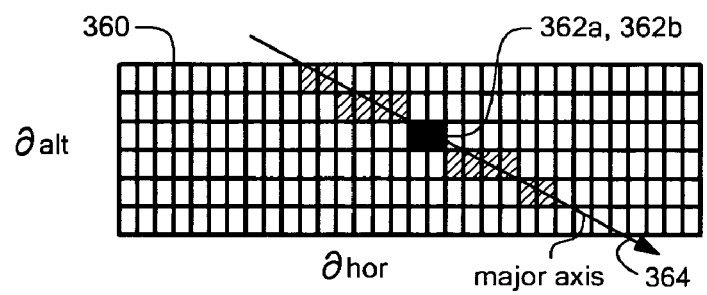

Referring now to FIG. 5C, in which like elements of FIGS. 5A and 5B are shown having like reference designations, a high-precision ambiguity surface 360 is constructed by interpolating the beamformed signals and providing smaller time delay increments and associated horizontal displacements for each row of the surface. However, contrary to the full high-precision ambiguity surface 360 shown, only some of the dot products in the vicinity of the coarse axis of ambiguity 358 are calculated to provide new dot product maxima (shown as crosshatched boxes) and a corresponding mid-precision axis of ambiguity 364 as described above in conjunction with block 308 of FIG. 5.

Figure 5D:
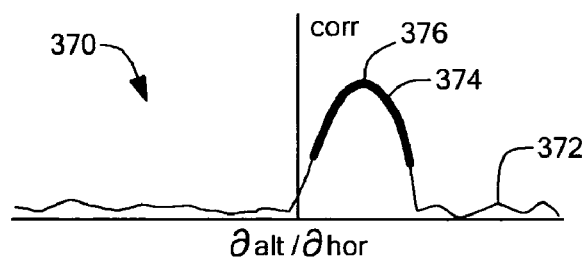

Referring now to FIG. 5D, a graph includes a horizontal axis corresponding to a slope, $\partial alt/\partial hor$, of the major axis of the ambiguity surface, and a vertical axis indicating the optimality of the candidate slope. An optimality metric plotted in curve 372 is a maximum correlation vector value over all horizontal shifts of the sum over all altitudes of the correlation along a line having a slope $\partial alt/\partial hor$ on the ambiguity surface. A mathematical function 374 is used to fit to the curve 372. In one particular embodiment, the mathematical function is a parabolic function. However, in other embodiments other functions can be used, for example, a polynomial function. A peak 376 is identified and the corresponding slope, $\partial alt/\partial hor$, is used in computing the high-precision major and minor axes of ambiguity.

Figure 5E:
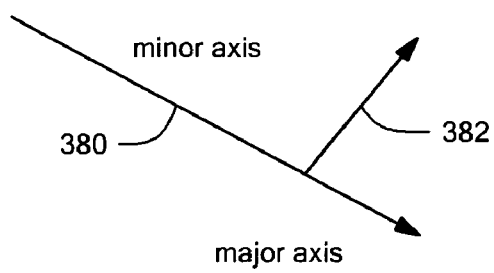

Referring now to FIG. 5E, a high-precision major axis of ambiguity 380 is defined to have a slope equal to that for the peak 376 in FIG. 5D. The high-precision minor axis of ambiguity 382 is defined to be orthogonal to the major axis 380.

Figure 6:
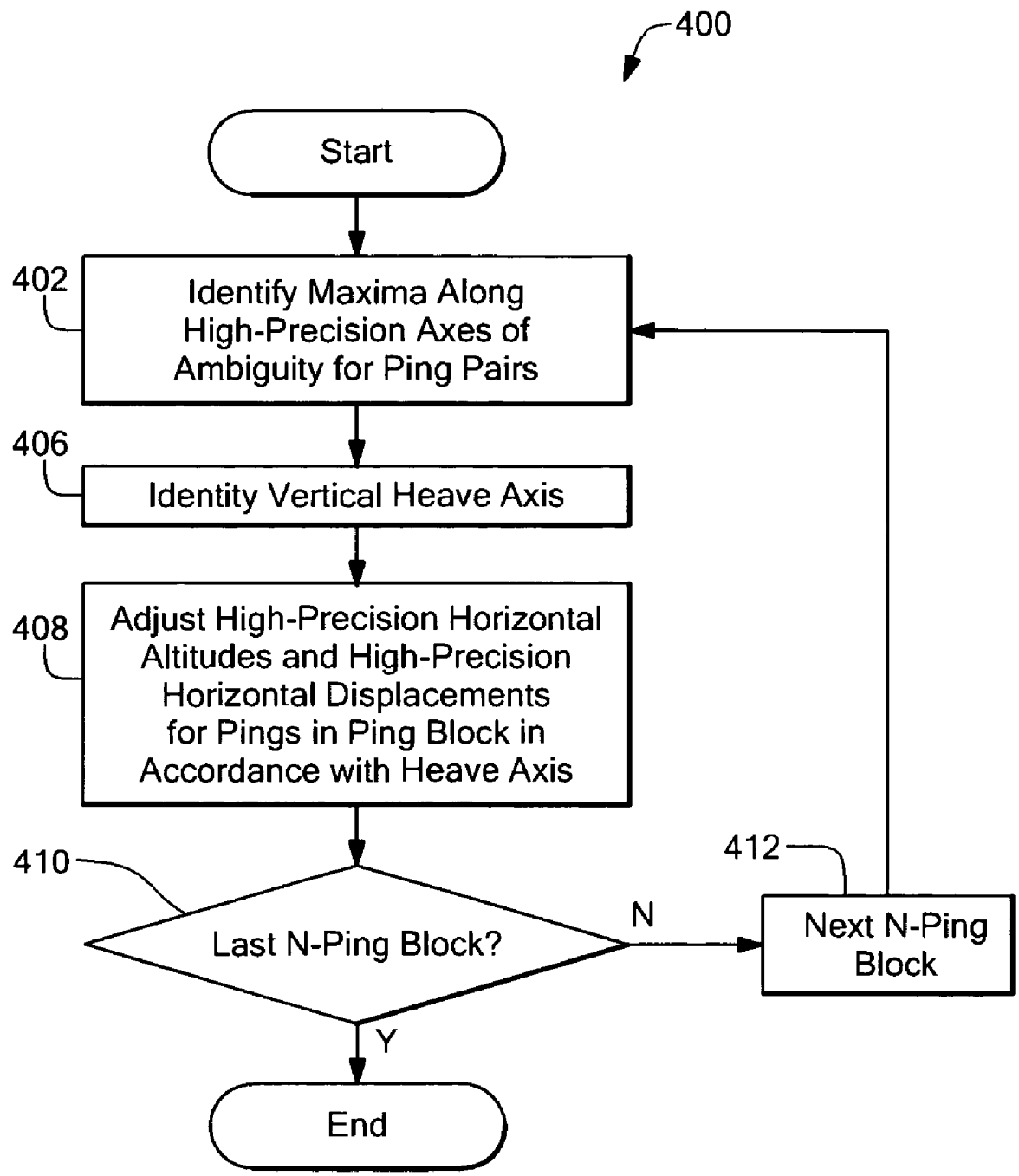
FIG. 6 is a flow chart showing yet further details of the method of FIG. 2.

Referring now to FIG. 6, a process 400 provides sway reduction as described at block 64 of FIG. 2. The process begins at block 402, where correlation vector value maxima are identified along a plurality of axes of ambiguity for an N-ping block, each associated with a respective ping pair.

At block 406, a vertical heave axis is identified in association with the plurality of axes of ambiguity. At block 408, the maxima on the plurality of axes of ambiguity are adjusted along the axes of ambiguity to intersect the vertical heave axis by adjusting the high-precision altitude differences and high-precision horizontal displacements for pings in the ping block in accordance with the vertical heave axis. At decision block 410, if the N-ping block is the last N-ping block, the process ends. However, if there is another N-ping block, the process continues to block 412, where another N-ping block is selected and the process repeats.

Figure 6A:
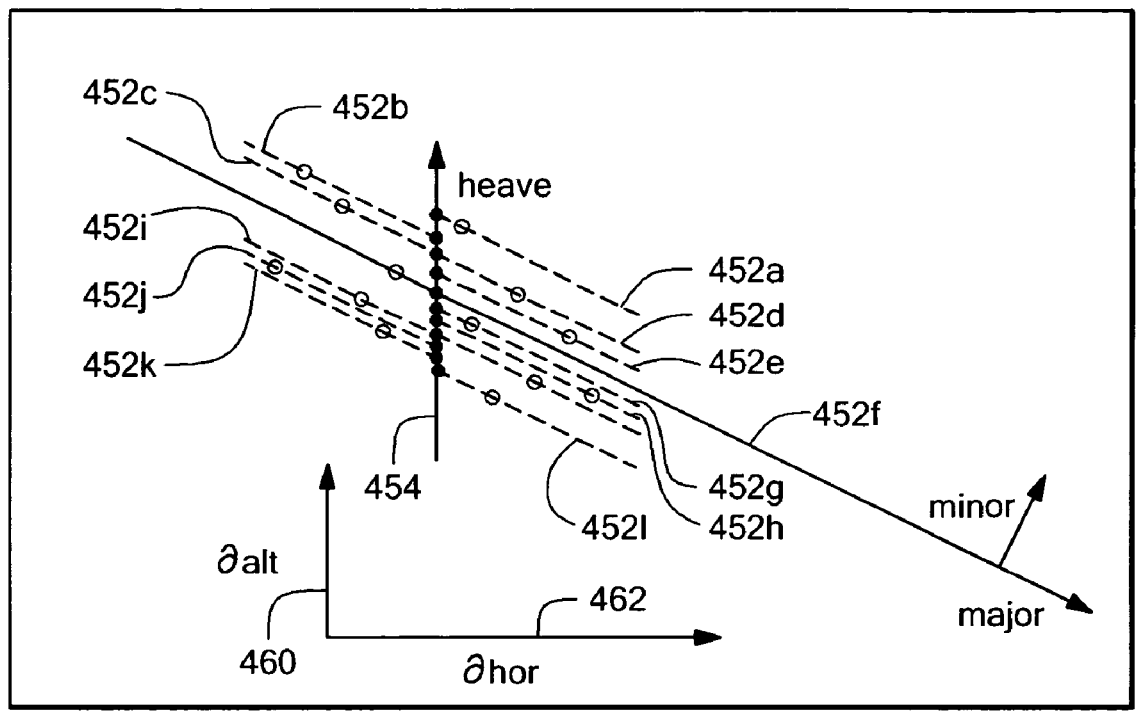
FIG. 6A is a pictorial showing axes of ambiguity and a heave axis generated in conjunction with the method of FIG. 6.

Referring now to FIG. 6A, the process 400 of FIG. 6 is shown in graphical form. A vertical axis 460 corresponds to a high-precision altitude difference and a horizontal axis 462 corresponds to a high-precision horizontal displacement, for example, as identified in conjunction with the process of FIG. 5. A plurality of high-precision axes of ambiguity 452a-452l is determined in accordance with the processes of FIGS. 4-5E, each high-precision axis of ambiguity corresponding to a high-precision ambiguity surface constructed in association with a ping pair. The high-precision axes of ambiguity have similar slope. An open point shown on each high-precision axis of ambiguity corresponds to a high-precision altitude difference and a high-precision horizontal displacement, each of which are described above in conjunction with FIG. 5.

For many sonar platforms, such as towed bodies, kinematics of the towed body are known a-priori to have fairly steady sway (crabbing) and highly variable heave. The heave is often nearly sinusoidal, and is physically caused by the ocean waves. However, it can be seen that the open points in FIG. 6A have greater horizontal displacement variation than vertical. This is not physically valid, and arises due to imprecise selection of the peak of the ambiguity surface. In order to help reduce this problem, a sway-reduction algorithm shifts each open point along its major axis of ambiguity (the domain where the imprecision arose) such that every open point has the same horizontal shift.

A vertical heave axis 454 can be generated, for example, at a position corresponding to a median of the horizontal displacements indicated by the open points. In another embodiment, the vertical heave axis 454 can be placed at an average of the horizontal displacements indicated by the open points.

Having the vertical heave axis 454, each open point can be moved along its respective major axis of ambiguity 452a-452l to arrive at the vertical heave axis 454. Once moved, the open points become the solid points on the vertical line, each corresponding to a sway-reduced altitude difference and a sway-reduced horizontal displacement.

Referring now to FIG. 7, a process 500 corresponds to block 66 of FIG. 2, which is the beginning of the continuous position estimation set of blocks 50c. Synthetic aperture sonar performs a coherent sum of beamformed signals over a plurality of pings. It requires alignment (provided by position estimation) to significantly sub-wavelength precision, which the initialization blocks 50b of FIG. 2 might not achieve unless the sampling rate is orders of magnitude above a Nyquist rate. The Phase Linearization technique is used to achieve sub-wavelength precision. A Phase Linearization criterion corresponding to correlation is expressed in terms of a continuous spatial domain, and then it is linearized with respect to small perturbations in the continuous spatial domain from the estimates obtained by the initialization blocks 50b of FIG. 2. Several symmetry properties are used to approximately decouple the Phase Linearization between the various degrees of freedom, therefore simplifying computation.

The process 500 begins at decision block 502, where for a first N-ping block, the process proceeds to decision block 504 and then to block 506. At block 506 a ping number, p, is initialized to one.

The process proceeds to decision block 508, where, if the ping number is less than N, the process proceeds to block 510. At block 510, a ping pair is selected to include ping p and ping p+1. At block 512, local coordinates are selected in accordance with a position of the receive array at ping p. Local coordinates are described in conjunction with FIGS. 1B and 1C. At block 514, the sway-reduced altitude difference and the sway-reduced horizontal displacement are identified for both ping p and ping p+1. The sway-reduced altitude difference and sway-reduced horizontal displacement are described above in conjunction with FIGS. 6 and 6A. In alternate arrangements, the fine altitude differences and fine horizontal displacements or the high-precision altitude differences and high-precision horizontal displacements can be used instead.

At block 516, forward motion and yaw of the receive array are estimated between pings p and p+1. To this end, at block 518, four beam pairs are selected associated with the ping pair, symmetrical port and starboard about the receive array, and symmetrical fore and aft about beam aspect. At block 520, first Phase Linearization equations are used to calculate the forward motion and yaw estimates. The first Phase Linearization equations are described below in conjunction with FIG. 7A.

At block 522, roll rate (not roll) and sway of the receive array are estimated between pings p and p+1. To this end, at block 524, two beam pairs are selected associated with the ping pair, one port and one starboard, and at equal azimuth about beam aspect. At block 526, second Phase Linearization equations are used to calculate the roll rate and sway estimates.

At block 528, change in the pitch of the receive array is estimated between pings p and p+1. To this end, at block 530, two beam pairs are selected associated with the ping pair, starboard (or port) only, and symmetrical fore and aft about beam aspects. At block 532, third Phase Linearization equations are used to calculate the change in pitch estimate.

At block 534, heave of the receive array is estimated between pings p and p+1. To this end, at block 536, one beam pair is selected associated with the ping pair. The beam pair can be any beam pair. At block 538, fourth Phase Linearization equations are used to calculate the heave estimate.

It will be understood that some input parameters used in specific Phase Linearization equations correspond to terms estimated in preceding Phase Linearization equations. The sway-reduced altitude difference and sway-reduced horizontal displacement are also used in the Phase Linearization equations. Specific details are presented below.

The process proceeds to block 542, where the ping number, p, is incremented. At decision block 508, if the ping number, p, is less than N, the process above is repeated for a new ping pair. If at decision block 508, the ping number, p, is not less than N, then the process proceeds to decision block 502, where a decision is made as to whether more N-ping blocks remain. If no more N-ping blocks remain, then the process ends. If more N-ping blocks remain, the process proceeds to block 540, where the N-ping block is incremented to the next N-ping block and the remaining process blocks described above repeat.

Referring now to FIG. 7A, a pictorial 550 shows a tow body 552 at each of two positions 552a, 552b corresponding to locations of pings p and p+1, respectively. A receive array (not shown) is disposed on the tow body 552.

A first line 554a corresponds to beam aspect of the receive array when the tow body 552 is at the position 552a. A second line 554b corresponds to beam aspect of the receive array when the tow body 552 is at the position 552b. A first curve 556a corresponds to an intersection of a receive beam maximum response angle (MRA) with the bottom surface of the water body when the tow body 552 is at the position 552a. A second curve 556b corresponds to an intersection of a receive beam MRA with the bottom surface of the water body when the tow body 552 is at the position 552b. A dashed line 558 corresponds to mid-line between the curves 556a, 556b. The curves 556a, 556b, 558 are hyperbolas.

A beamformed signal can be modeled as the linear superposition of a set of echoes from a large field of small scatterers lying in the ensonified region of the sea floor. The ensonified region changes between pings and beams. If the beams are substantially overlapping, then the intersection of their ensonified fields of small scatterers can be crudely approximated as a large field of small scatterers distributed along the average 558 of the two hyperbolas 556a, 556b. Therefore, the beam pair is correlated and the optimum altitude difference and horizontal displacement are indicative of tow-body motion.

The slant-to-horizontal range conversion described in conjunction with block 180 of FIG. 4 must be based on a "beam-altitude" that equals the true altitude divided by the cosine of the MRA (relative to beam aspect) and a "beam-horizontal displacement" corresponding to the beam aspect horizontal displacement divided by the cosine of the MRA. Thus, the altitude difference and horizontal displacement obtained above are really beam-altitude and beam-horizontal range, i.e., they are dependent on beam angle away from aspect.

By modeling the time response in each beam as a linear superposition of echoes from each scatterer, expressions are derived for how correlation varies with platform motion. Small perturbations in position are approximated as having no impact on envelope of a sample of the beamformed signals. A Taylor series expansion of the phase shift is performed to obtain the following Phase Linearization criterion:

$$L_u = \sum_{v \in \Gamma} L_{v,u}$$

$$L_{v,u} \approx G_{p,u}(\tilde{z}_u + \varepsilon_{z,p,u}, \gamma_{v,u} + \varepsilon_{\gamma,p,u}) G^*_{p+1,u}(\tilde{z}_u + \varepsilon_{z,p+1,u}, \gamma_{v,u} + \varepsilon_{\gamma,p+1,u}) e^{j\Omega_{v,u}}$$

$$\Omega_{v,u} = \frac{4\pi}{\lambda} \Delta\rho_{v,u} + \Delta\zeta_{v,u}$$

$$\Delta\rho_{v,u} = \frac{\tilde{z}_u}{\sqrt{\tilde{z}_u^2 + \gamma_{v,u}^2}} \cdot \left\{ \Delta\varepsilon_{z,u} + \cos(\varphi_u)\left[\Delta z \pm \frac{w}{2}\Delta\phi_x\right] + \frac{\phi_y}{\cos(\varphi_u)} \cdot \Delta x \right\} \ldots +$$

$$\frac{\gamma_{v,u}}{\sqrt{\tilde{z}_u^2 + \gamma_{v,u}^2}} \cdot \left\{ \Delta\varepsilon_{\gamma,u} \pm \cos(\varphi_u)\Delta y \mp \frac{\phi_z}{\cos(\varphi_u)} \cdot \Delta x \right\} \ldots + \sin(\varphi_u)\Delta x$$

$$\Delta\zeta_{v,u} = \zeta'(\sin(\varphi_u)) \cdot$$

$$\left[\cos(\varphi_u) \cdot \left\{ \frac{\tilde{z}_u}{\sqrt{\tilde{z}_u^2 + \gamma_{v,u}^2}} \cdot \Delta\phi_y \mp \frac{\gamma_{v,u}}{\sqrt{\tilde{z}_u^2 + \gamma_{v,u}^2}} \cdot \Delta\phi_z \right\} - \frac{\Delta x}{\sqrt{\tilde{z}_u^2 + \gamma_{v,u}^2}} \right]$$

$$\pm = \begin{cases} + & \text{starboard} \\ - & \text{port} \end{cases}$$

$$\mp = \begin{cases} - & \text{starboard} \\ + & \text{port} \end{cases}$$

where:
u=beam_pair_index;
p=ping_number index;
v=horizontal sample index, after conversion to horizontal range;
w=lateral separation of port and starboard arrays;
λ=acoustic wavelength of carrier frequency;

$L_u$=Phase Linearization criterion for beam pair u. Typically, there will be a plurality of beam pairs considered, each with its own $L_u$;
$L_{v,u}$=portion of $L_u$ arising from horizontal-range sample v;
$G_{p,u}(\alpha,\beta)$=beamformed signal for ping p, beam pair u, at time 2 sqrt($\alpha^2+\beta^2$)/c, for dummy variables α, β roughly corresponding to altitude and horizontal range;
$G^*_{p+1,u}(\alpha,\beta)$=complex conjugate of beamformed signal for ping p+1, beam pair u, at time 2 sqrt($\alpha^2+\beta^2$)/c, for dummy variables α, β roughly corresponding to altitude and horizontal range;
c=speed of sound in water;
$\tilde{z}_u$=initial altitude for beam pair u;
$\Delta\varepsilon_{z,u}=\varepsilon_{z,p+1,u}-\varepsilon_{z,p,u}$=comparable to sway-reduced altitude difference;
$\Delta\varepsilon_{\gamma,u}=\varepsilon_{\gamma,p+1,u}-\varepsilon_{\gamma,p,u}$=comparable to sway-reduced horizontal displacement;
$\varepsilon_{z,p,u}$=difference of vertical linearization point in ping p, beam pair u, from the nominal $\tilde{z}_u$;
$\varepsilon_{z,p+1,u}$=difference of vertical linearization point in ping p+1, beam pair u, from the nominal $\tilde{z}_u$;
$\varepsilon_{\gamma,p,u}$=difference of horizontal-range sample v linearization point in ping p, beam pair u, from the nominal $\gamma_{v,u}$. Note that this is the same for all horizontal-range samples;
$\varepsilon_{\gamma,p+1,u}$=difference of horizontal-range sample v linearization point in ping p+1, beam pair u, from the nominal $\gamma_{v,u}$. Note that this is the same for all horizontal-range samples;
$\gamma_{v,u}$=nominal horizontal offset to horizontal-range sample u for beam pair u, for both pings p and p+1. Note that this will not be exact offset since it differs between pings;
$\Omega_{v,u}$=phase introduced in $L_u$ by perturbation of linearization point from true position, and by phase encoding of transmit azimuth;
$\Delta\rho_{v,u}$=intermediate dummy variable roughly corresponding to difference in slant range shifts for pings p and p+1 for sample v, beam pair u;

$$\varphi_u = \frac{1}{2}(\varphi_{p+1,u} + \varphi_{p,u});$$

$\phi_{p+1,u}$=MRA of beam corresponding to beam pair u for ping p+1 relative to beam aspect (i.e., relative body coordinates, not fixed Earth coordinates);
$\phi_{p,u}$=MRA of beam corresponding to beam pair u for ping p relative to beam aspect (i.e., relative body coordinates, not fixed Earth coordinates);
Δx=displacement along the x-axis, forward (see FIGS. 1B, 1C for axes);
Δy=displacement along the y-axis, starboard;
Δz=displacement along the z-axis, down;
$\phi_x$=angle about the x-axis (roll);
$\phi_y$=angle about the y-axis (pitch);
$\phi_z$=angle about the z-axis (yaw);
ζ(φ)=transmit phase for azimuth φ relative to beam aspect;
$\Delta\zeta_{v,u}$=differential phase arising from phase encoding azimuth into the transmit beam, at sample v, beam pair u;
ζ'=∂ζ/∂φ, partial derivative of transmit phase with respect to azimuth; and
Γ=the set of all horizontal-range samples v.

The above criterion, $L_u$, is optimized when motion estimates are perturbed so $L_u$ reaches its real-valued maximum for all beam pairs simultaneously.

Phase Linearization is based on the premise that time delays can be approximated by phase shifts. This is suitable only for narrow band signals with a broad depression angle swath (so destructive interference of phase occurs before the envelope substantially shifts). If this were not satisfied, then an analogous time linearization would be needed.

The Phase Linearization equations are a function of six variables, and they are non-convex. Therefore, it would be difficult to apply most standard optimization algorithms to solve the Phase Linearization equations. However, symmetries can be used to make various terms in the Phase Linearization equations cancel, to decouple the optimization. The procedure is as follows.

In conjunction with blocks 52-64 of FIG. 2, a sway-reduced altitude difference and a sway-reduced horizontal displacement are estimated. An initial beam-altitude (discussed above in conjunction with FIG. 7A) is generated as:

$$\tilde{z}_u = \frac{\frac{1}{2}\{a_p + a_{p+1}\}}{\cos(\varphi_u)}$$

where $a_p$ and $a_{p+1}$ are altitude estimates of coarse precision obtained from the nadir return for ping p and p+1. It is important to use the coarse altitudes here because they are accurate (no drift due to DC biases like altitude difference in the presence of pitch), albeit imprecise (coarse resolution in time). The $\Delta\epsilon_{z,u}$ and $\Delta\epsilon_{\gamma,u}$ differences are comparable to sway-reduced altitude difference and sway-reduced horizontal displacement, respectively. Slight variations from these values may be beneficial in certain embodiments. Correlation can be applied to the two beams in horizontal range for several candidate altitudes to find the $\epsilon_{z,p,u}$, $\epsilon_{\gamma,p,u}$, $\epsilon_{z,p+1,u}$, and $\epsilon_{\gamma,p+1,u}$ that maximize the envelope of correlation. It must be emphasized that these terms only loosely correspond to any particular physical quantity, and are merely an expedient point at which to linearize the above-identified criterion.

Next, we define an inner product that combines the $L_u$ between and two beam pairs $u=\alpha$ and $u=\beta$: $\tilde{L}_{v,u}$ $$\tilde{L}_{\alpha,\beta} = \langle L_\alpha, L_\beta \rangle = \sum_{v \in \Gamma} L_{v,\alpha} L^*_{v,\beta}$$

where:
$\tilde{L}_{\alpha,\beta}$=joint Phase Linearization criterion for beam pairs $\alpha$ and $\beta$;
$L_{\alpha,v}$=Phase Linearization criterion $L_u$ for beam pair $u=\alpha$, at horizontal-range sample v; and
$L^*_{\beta,v}$=complex conjugate of Phase Linearization criterion $L_u$ for beam pair $u=\beta$, at horizontal-range sample v.

If certain approximations of the motion parameters are available, a first approximation can be made to approximate the inner product terms:

$$\hat{L}_{v,u} = G_{p,u}(\tilde{z}_u + \varepsilon_{z,p,u}, \gamma_{v,u} + \varepsilon_{\gamma,p,u})$$

$$G^*_{p+1,u}(\tilde{z}_u + \varepsilon_{z,p+1,u}, \gamma_{v,u} + \varepsilon_{\gamma,p+1,u})e^{j\hat{\Omega}_{v,u}}$$

$$\approx [G_{p,u}(\tilde{z}_u + \varepsilon_{z,p,u}, \gamma_{v,u} + \varepsilon_{\gamma,p,u})$$

$$G^*_{p+1,u}(\tilde{z}_u + \varepsilon_{z,p+1,u}, \gamma_{v,u} + \varepsilon_{\gamma,p+1,u})e^{j\Omega_{v,u}}]e^{j[\hat{\Omega}_{v,u}-\Omega_{v,u}]}$$

$$\approx e^{j[\hat{\Omega}_{v,u}-\Omega_{v,u}]}$$

The carrot symbol, $\hat{0}$, denotes an estimate for both L and $\Omega$, while the non-carrot $\Omega$ is the corresponding true value.

A second approximation is based on the quantity in square brackets being real-valued and non-negative for a true $\Omega_{v,u}$. With this approximation, only the amplitude of $G_{p,u}G^*_{p+1,u}$ is disregarded, which should be unimportant since amplitude is generally uniform. The phase error remains.

The above-identified criterion will first consider only long-range samples, where slant and horizontal range are substantially equivalent. Four beam pairs: port and starboard, symmetric fore (+) and aft (−) of beam aspect (i.e., $\phi_-=-\phi_+$) are used. The phase of the inner products is:

$$\pi(m+n) = \angle\langle\hat{L}_{Stbd+}, \hat{L}_{Stbd-}\rangle$$

$$= \frac{8\pi}{\lambda} \cdot \sin(\varphi_{Stbd+})\Delta\hat{x} - 2\zeta'(\sin(\varphi_{Stbd+})) \cdot \cos(\varphi_{Stbd+})$$

$$\Delta\hat{\phi}_z + \angle g_{Stbd}$$

$$\pi(m-n) = \angle\langle\hat{L}_{Port+}, \hat{L}_{Port-}\rangle$$

$$= \frac{8\pi}{\lambda} \cdot \sin(\varphi_{Port+})\Delta\hat{x} - 2\zeta'(\sin(\varphi_{Port+})) \cdot \cos(\varphi_{Port+})$$

$$\Delta\hat{\phi}_z + \angle g_{Port}$$

These equations represent the solution to a set of two $\tilde{L}$ equations, with their peak at zero phase, or any multiple of $2\pi$. (The $\pi(m+n)$ and $\pi(m-n)$ are arbitrary integer multiples of $2\pi$ defined in this apparently clumsy manner because they yield convenient solutions below.) The remaining variables and operators are defined to be:

$\Delta\hat{x}$=estimate of displacement along the x-axis, forward (see FIGS. 1B, 1C for axes)
$\hat{\phi}_z$=estimate of rotation about the z-axis (yaw);
$\hat{L}_{Stbd+}$=estimate of $L_u$ for beam pair u being starboard, fore of beam aspect;
$\hat{L}_{Stbd-}$=estimate of $L_u$ for beam pair u being starboard, aft of beam aspect;
$\phi_{Stbd+}=\phi_u$ for beam pair u being starboard, fore of beam aspect;

$$\angle g_{Stbd} = \angle\left\{\sum_{v \in LongRange} G_{p,Stbd+} G^*_{p+1,Stbd+} G^*_{p,Stbd-} G_{p+1,Stbd-}\right\};$$

$\zeta'$=same as defined for $L_u$;
$\hat{L}_{Port+}$=estimate of $L_u$ for beam pair u being port, fore of beam aspect;
$\hat{L}_{Port-}$=estimate of $L_u$ for beam pair u being port, aft of beam aspect;
$\phi_{Port+}=\phi_u$ for beam pair u being port, fore of beam aspect; and $$\angle g_{Port} = \angle\left\{\sum_{v \in LongRange} G_{p,Port+} G^*_{p+1,Port+} G^*_{p,Port-} G_{p+1,Port-}\right\}.$$

The above yields first Phase Linearization equations including two linear equations with two unknowns, which are solved to generate along track and yaw estimates:

$$\Delta \hat{x} = \frac{-Lg_{Stbd} - Lg_{Port} + 2\pi m}{\frac{16\pi}{\lambda} \cdot \sin(\varphi_{Stbd+})}$$

$$\Delta \hat{\phi}_z = \frac{Lg_{Stbd} - Lg_{Port} + 2\pi n}{4\zeta'(\sin(\varphi_{Stbd+})) \cdot \cos(\varphi_{Stbd+})}$$

In certain embodiments, it is trivial to select the true m and n values. Merely identifying which beam pairs are capable of correlation is sufficient to resolve this issue, based on whether the m and n values yield a spatially overlapping beam pair.

Next, second Phase Linearization equations are generated and solved to provide roll rate and sway estimates, which are based on a port/starboard pair of beam pairs at equal azimuth via the inner product:

$$\langle \hat{L}_{Stbd+}, \hat{L}_{Port+} \rangle = \sum_{v \in All} \tilde{G}_v \cdot \exp\left( j \frac{8\pi}{\lambda} \cdot \cos(\varphi_{Stbd+}) \cdot \right.$$

$$\left. \left\{ \frac{\tilde{z}_{Stbd+}}{\sqrt{\tilde{z}_{Stbd+}^2 + \gamma_{v,Stbd+}^2}} \cdot \left[ \frac{w}{2} \cdot \Delta \phi_x \right] + \frac{\gamma_{v,Stbd+}}{\sqrt{\tilde{z}_{Stbd+}^2 + \gamma_{v,Stbd+}^2}} \cdot \Delta y \right\} \right)$$

$$\tilde{G}_v = G_{p,Stbd+}(\tilde{z}_{Stbd+} + \varepsilon_{z,p,Stbd+}, \gamma_{v,Stbd+} + \varepsilon_{\gamma,p,Stbd+}) \cdot$$
$$G^*_{p+1,Stbd+}(\tilde{z}_{Stbd+} + \varepsilon_{z,p+1,Stbd+}, \gamma_{v,Stbd+} + \varepsilon_{\gamma,p+1,Stbd+}) \cdot \ldots$$
$$G^*_{p,Port+}(\tilde{z}_{Port+} + \varepsilon_{z,p,Port+}, \gamma_{v,Port+} + \varepsilon_{\gamma,p,Port+}) \cdot$$
$$G_{p+1,Port+}(\tilde{z}_{Port+} + \varepsilon_{z,p+1,Port+}, \gamma_{v,Port+} + \varepsilon_{\gamma,p+1,Port+}) \cdot \ldots$$

$$\exp\left( -j \cdot \frac{\gamma_{v,Stbd+}}{\sqrt{\tilde{z}_{Stbd+}^2 + \gamma_{v,Stbd+}^2}} \cdot \right.$$

$$\left. \left\{ \frac{8\pi}{\lambda} \cdot \frac{\hat{\phi}_z \Delta \hat{x}}{\cos(\varphi_{Stbd+})} + 2\zeta'(\sin(\varphi_{Stbd+})) \cdot \cos(\varphi_{Stbd+}) \Delta \hat{\phi}_z \right\} \right)$$

$$\hat{\phi}_z = \frac{1}{2} \Delta \hat{\phi}_z$$

All parameters appearing at $\tilde{G}_v$ are known or have been estimated, so plug them in and tabulate the $\tilde{G}_v$. Specifically, use the estimates $\Delta \hat{x}$ and $\Delta \hat{\phi}_z$ computed above. The identity on $\phi_z$ is because $\phi_z=0$ for ping p, and the average over pings p and p+1 is computed. A real-valued peak of the above expression is found with a three-step process.

Assign a reasonable initial estimate to $\Delta \phi_x$. If the lateral separation of port and starboard arrays is zero (w=0), then this term drops out. For w≠0, a certain embodiment uses a low-grade gyro to obtain this estimate. It must be emphasized that such a low-grade gyro would be vastly less expensive than the extremely high-grade inertial motion unit (IMU) that would be required for motion estimation directly from inertial data. Other embodiments will simply try reasonable values such as $\Delta \phi_x=0$, to avoid using a gyro.

Do a line search in $\Delta y$ to find the envelope peak.

Do a coherent line search along the major axis of ambiguity to find the closest real-valued peak, which shall be taken as the optimum $\Delta \phi_x$ and $\Delta_y$.

Third Phase Linearization equations that provide an estimate of a change in pitch are based on two starboard beam pairs, equidistant fore and aft of beam aspect.

$$\langle \hat{L}_{Stbd+}, \hat{L}_{Stbd-} \rangle =$$

$$\sum_{v \in All} \tilde{G}_v \cdot \exp\left( j2\zeta'(\sin(\varphi_{Stbd+})) \cdot \cos(\varphi_{Stbd+}) \cdot \frac{\tilde{z}_{Stbd+}}{\sqrt{\tilde{z}_{Stbd+}^2 + \gamma_{v,Stbd+}^2}} \cdot \Delta \phi_y \right)$$

$$\tilde{G}_v = G_{p,Stbd+}(\tilde{z}_{Stbd+} + \varepsilon_{z,p,Stbd+}, \gamma_{v,Stbd+} + \varepsilon_{\gamma,p,Stbd+}) \cdot$$
$$G^*_{p+1,Stbd+}(\tilde{z}_{Stbd+} + \varepsilon_{z,p+1,Stbd+}, \gamma_{v,Stbd+} + \varepsilon_{\gamma,p+1,Stbd+}) \cdot \ldots$$
$$G^*_{p,Stbd-}(\tilde{z}_{Stbd-} + \varepsilon_{z,p,Stbd-}, \gamma_{v,Stbd-} + \varepsilon_{\gamma,p,Stbd-}) \cdot$$
$$G_{p+1,Stbd-}(\tilde{z}_{Stbd-} + \varepsilon_{z,p+1,Stbd-}, \gamma_{v,Stbd-} + \varepsilon_{\gamma,p+1,Stbd-}) \cdot \ldots$$

$$\exp\left( j \cdot \left\{ \frac{8\pi}{\lambda} \cdot \sin(\varphi_{Stbd+}) \cdot \Delta \hat{x} - 2\zeta'(\sin(\varphi_{Stbd+})) \cdot \left[ \frac{\Delta \hat{x}}{\sqrt{\tilde{z}_{Stbd+}^2 + \gamma_{v,Stbd+}^2}} + \right. \right. \right.$$

$$\left. \left. \left. \cos(\varphi_{Stbd+}) \cdot \frac{\gamma_{v,Stbd+}}{\sqrt{\tilde{z}_{Stbd+}^2 + \gamma_{v,Stbd+}^2}} \cdot \Delta \hat{\phi}_z \right] \right\} \right)$$

The above equations can be solved by a 1-D line search over $\Delta \phi_y$ as follows.

Evaluate the inner product at $\Delta \phi_y=0$ and $\epsilon$ for some $|\epsilon|<<1$, and compute partial derivative of inner product phase with respect to $\Delta \phi_y$.

Use the derivative to compute several reasonable $\Delta \phi_y$ values with zero phase.

Evaluate the inner product at each of these values, and chose that with the maximum amplitude to be the true $\Delta \phi_y$.

The line being searched is not aligned with the major axis of ambiguity, so there should not be much trouble with multiple cycles having peaks with amplitudes comparable to the maximum. The use of two starboard beam pairs is arbitrary. In an alternate embodiment, two port beam pairs could be used instead with slightly different equations that could readily be derived by one of ordinary skill in the art.

With all of the proceeding motion terms available, fourth Phase Linearization equations are generated to compute the heave using a single beam pair.

$$\hat{L}_{Stbd+} \sum_{v \in All} \tilde{G}_v \cdot \exp\left( j \cdot \frac{4\pi}{\lambda} \cdot \cos(\varphi_{Stbd+}) \cdot \frac{\tilde{z}_{Stbd+}}{\sqrt{\tilde{z}_{Stbd+}^2 + \gamma_{v,Stbd+}^2}} \cdot \hat{\xi} \right)$$

$$\hat{\xi} =$$

$$\Delta \hat{z} + \frac{\hat{\phi}_y \Delta \hat{x}}{\cos^2(\varphi_{Stbd+})} \tilde{G}_v = G_{p,Stbd+}(\tilde{z}_{Stbd+} + \varepsilon_{z,p,Stbd+}, \gamma_{v,Stbd+} + \varepsilon_{\gamma,p,Stbd+}) \cdot \ldots$$

$$G^*_{p+1,Stbd+}(\tilde{z}_{Stbd+} + \varepsilon_{z,p+1,Stbd+}, \gamma_{v,Stbd+} + \varepsilon_{\gamma,p+1,Stbd+}) \cdot \ldots$$

$$\exp\left( j \cdot \left\{ \frac{4\pi}{\lambda} \cdot \left[ \frac{\tilde{z}_{Stbd+}}{\sqrt{\tilde{z}_{Stbd+}^2 + \gamma_{v,Stbd+}^2}} \cdot \left\{ \Delta \varepsilon_{z,Stbd+} + \cos(\varphi_{Stbd+}) \cdot \frac{w}{2} \cdot \Delta \hat{\phi}_x \right\} + \right. \right. \right.$$

$$\ldots \frac{\gamma_{v,Stbd+}}{\sqrt{\tilde{z}_{Stbd+}^2 + \gamma_{v,Stbd+}^2}} \cdot \left\{ \Delta \varepsilon_{\gamma,Stbd+} + \cos(\varphi_{Stbd+}) \cdot \Delta \hat{y} - \right.$$

$$\left. \left. \left. \frac{\Delta \hat{\phi}_z}{\cos(\varphi_{Stbd+})} \cdot \Delta \hat{x} \right\} + \ldots \sin(\varphi_{Stbd+}) \cdot \Delta \hat{x} \right] + \Delta \zeta_{v,Stbd+} \right\} \right)$$

The optimum value of $\hat{\xi}$ is computed by a line search comparable to that for $\Delta\phi_y$ in the third Phase Linearization. The choice of a starboard beam pointing fore of beam aspect was arbitrary. Alternate embodiments could use a different beam, with slightly different equations readily derived by one of ordinary skill in the art.

The above-computed heave may be contaminated by a term involving the pitch (not change in pitch). It is not obvious how to decouple the heave and pitch terms on the basis of a single ping pair. In one embodiment, the entire preceding Phase Linearization process for a long series of pings is performed, and then the heave and pitch terms are decoupled based on long-term drift in the integrated differential heave, relative to the series of coarse altitudes (nadir returns). The pitch compensation is described in FIGS. 8-8B below. However, a mathematical derivation is also presented below.

The differential pitch has been estimated above. An integration of the differential pitch over pings provides a DC offset. The integral is:

$$\sum_{p=1}^{P-1} \hat{\xi}_p = \sum_{p=1}^{P-1} \left\{ [z_{p+1} - z_p] + \frac{\frac{1}{2} \cdot [\phi_{y,p+1} + \phi_{y,p}] \cdot [\hat{x}_{p+1} - \hat{x}_p]}{\cos^2(\varphi_{Stbd+})} \right\}$$

where:

$\hat{\xi}_p$=fourth Phase Linearization estimate of altitude difference between pings p and p+1, with pitch contamination;
$z_{p+1}$=true altitude for ping p+1;
$z_p$=true altitude for ping p;
$\phi_{y,p+1}$=true pitch for ping p+1;
$\phi_{y,p}$=true pitch for ping p;
$\hat{x}_{p+1}$=estimated forward position at ping p+1; and
$\hat{x}_p$=estimated forward position at ping p.
Replacing true altitudes with nadir returns, and solving for pitch:

$$\sum_{p=1}^{P-1} \hat{\xi}_p = \sum_{p=1}^{P-1} \left\{ [\hat{a}_{p+1} - \hat{a}_p] + \frac{\frac{1}{2} \cdot [\phi_{y,p+1} + \phi_{y,p}] \cdot [\hat{x}_{p+1} - \hat{x}_p]}{\cos^2(\varphi_{Stbd+})} \right\}$$

$$\hat{\phi}_{y,1} = \frac{\left\{ \left[ \sum_{p=1}^{P-1} \hat{\xi}_p \right] - [\hat{a}_P - \hat{a}_1] \right\} \cdot \cos^2(\varphi_{Stbd+}) - \left\{ \sum_{p=1}^{P-1} \frac{1}{2} \cdot [\hat{\phi}_{\Delta,p+1} + \hat{\phi}_{\Delta,p}] \cdot \Delta\hat{x}_p \right\}}{\sum_{p=1}^{P-1} \Delta\hat{x}_p}$$

$$\hat{\phi}_{y,p} = \hat{\phi}_{y,1} + \hat{\phi}_{\Delta,p}$$

$$\hat{\phi}_{\Delta,p} = \sum_{k=1}^{p-1} \Delta\hat{\phi}_{y,k}$$

Now that the pitch has been estimated, the altitude is solved through integrating the differential altitude, and giving it a DC value equal to that of the coarse altitudes described above in conjunction with FIG. 3:

$$\Delta\hat{z}_p = \hat{\xi}_p - \frac{\hat{\phi}_{y,p}\Delta\hat{x}_p}{\cos^2(\varphi_{Stbd+})}$$

$$\hat{z}_1 = \frac{1}{P}\sum_{p=1}^{P}\left\{a_p - \sum_{k=1}^{p-1}\Delta\hat{z}_k\right\}$$

$$\hat{z}_p = \hat{z}_1 + \sum_{k=1}^{p-1}\Delta\hat{z}_k$$

Next, change the coordinates of the series of motion estimates from the local reference frames to a consistent reference frame, for example, an earth reference frame, north-east-and down (NED). Coordinate conversions can be performed with a conventional rotation matrix.

The optimization presented above is but one example of how to maximize the Phase Linearization criterion. Other techniques can also be used.

In alternate embodiments, different combinations of beams associated with each of the Phase Linearization equations can be used. Also, in alternate embodiments, a sum over multiple beam pairs can be used instead of the products used in the above-described inner product.

Referring now to FIG. 7B, azimuth phase encoding of the transmit beams is explained. A first tow body 560 is shown is positions 560a, 560b corresponding to a relative along-track displacement. Beams 562a, 564a correspond to starboard and port beams, respectively at the first tow body position 560a, and beams 562b, 564b correspond to starboard and port beams, respectively, at the second tow body position 560b.

The first Phase Linearization equations and methods described above allow estimates of forward displacement and rotation (yaw). To this end, a transmit beam pattern is provided having a phase shift that is roughly quadratic. With this arrangement, correlation between consecutive pings yields a phase shift that is generally linear in azimuth. The phase shift has even symmetry between port and starboard for forward motion and odd symmetry for rotations (yaw) changes and pitch changes in the near field). Rotation (yaw) by one physical beam width can result in a large amount of phase shift.

Creating a transmit array with quadratic phase shift in azimuth is possible. Certain transmitters intended for conventional single-ping beamforming have this property. Individual transducers can only transmit a moderate amount of power into the water. Therefore, it can be useful to have an array of such elements to increase the transmit power. If the elements were arranged in a straight line and transmitted the same signal simultaneously, then they would interfere coherently to form an objectionably narrow transmit beam. A common way to azimuthally broaden the transmit beam is to curve the array slightly, with the convex side pointing in the positive range direction, and transmit the same signal in all elements simultaneously. Alternately, a linear array can be used, with time delays on each element to simulate this effect.

A graph illustrating forward motion has a vertical axis 566 in units of azimuth angle about the tow body and a horizontal axis 568 in units of phase change in the receive beams 564a, 564b. As a result of the acoustic transmitter having a phase shift in azimuth, a curve 570 corresponds to a phase across the receive beam 564a and a curve 572 corresponds to a phase change across the receive beam 564b. A line 576 is representative of a slope of the average phase change corresponding to the beams 574a, 574b as the tow body moves from position 560a to position 560b.

Another graph has a vertical axis 578 in units of azimuth angle about the tow body and a horizontal axis 580 in units of phase change in the receive beams 562a, 562b. A curve 582 corresponds to a phase across the receive beam 562a and a curve 584 corresponds to a phase change across the beam 562b. A line 586 is representative of a slope of the average phase change corresponding to the beams 562a, 562b as the tow body moves forward from position 560a to position 560b.

It can be seen that the lines 576 and 586 have the same slope.

A second tow body 590 is shown at positions 590a, 590b corresponding to a relative heading rotation (yaw). Beams 592a, 594a correspond to starboard and port beams, respectively at the first tow body position 590a, and beams 592b, 594b correspond to starboard and port beams, respectively, at the second tow body position 590b.

A graph has a vertical axis 596 in units of azimuth angle about the tow body and a horizontal axis 598 in units of phase change in the receive beams 594a, 594b. A curve 600 corresponds to a phase across the receive beam 594a and a curve 602 corresponds to a phase change across the receive beam 594b. A line 604 is representative of the azimuth variation in differential phase between beams 594a, 594b when the tow body is in positions 590a and 590b, respectively.

Another graph has a vertical axis 606 in units of azimuth angle about the tow body and a horizontal axis 608 in units of phase change in the receive beams 592a, 592b. A curve 610 corresponds to a phase across the receive beam 592a and a curve 612 corresponds to a phase change across the beam 592b. A line 614 is representative of a slope of the average phase change corresponding to the beams 592a, 592b as the tow body moves from position 590a to position 590b.

It can be seen that the lines 604 and 614 have opposite slope. Therefore, the opposite change in phases in the port and starboard receive beams can be used to identify a rotation (yaw) distinct from a forward along track motion.

The phase change distinction is apparent in the first Phase Linearization equations, where forward motion depends on the sum of starboard and port phases ($\angle g_{Stbd} + \angle g_{Port}$), while yaw depends on the difference of starboard and port phases ($\angle g_{Stbd} - \angle g_{Port}$).

Referring now to FIGS. 7C-7E, pictorials 670, 677 and 689 are illustrative of properties of the above second Phase Linearity equation, which uses a difference in horizontal displacements (generated above) of port and starboard beam pairs to estimate roll difference and sway. The pictorial 670 shows a first position 672a and a second position 672b of a tow body 672 associated with pings p and p+1, respectively. A port beam pair 674a, 674b and a symmetric starboard beam pair 676a, 676b are associated with the pings p and p+1, respectively. If only sway were present, then a difference in horizontal displacements for port and starboard beams 674a, 674b, 676a, 676b would indicate sway.

A roll change associated with a tow body 678 is shown in the pictorial 677. The tow body 678 has lateral separation of width, w, 680 between port and starboard arrays (not shown). The roll of the tow body 678 changes from ping p to ping p+1 and corresponds to an angle change, $\Delta\phi_x$. The product of the change in roll, $\Delta\phi_x$, and the lateral separation, w, of port and starboard receive arrays is an effective altitude difference 686 between port and starboard arrays. When one side shifts up, the other goes down. This is an odd symmetry between port and starboard, similar to sway.

When both roll difference and sway are considered jointly, the second Phase Linearization equation could be displayed as an "ambiguity" surface 694, if it were evaluated for all possible roll difference and sway values. A horizontal axis 690 corresponds to sway, and a vertical axis 692 corresponds to roll difference (times half the lateral separation). A major axis 696 and a minor axis 698 of the ambiguity surface 694 are similar to those identified in FIG. 5E. In one particular embodiment, a series of line searches can be used to efficiently find a real-valued peak of the ambiguity surface 694, without need to evaluate the second Phase Linearization equation for all possible roll difference and phase values. In certain embodiments, the roll difference is estimated with a low-quality gyro as an initialization. However, in other embodiments, the line search is based exclusively on the acoustic data without use of a gyro.

Referring now to FIGS. 7F and 7G, pictorial 620 and graph 633 are illustrative of properties of the above third Phase Linearity equations with which a differential pitch estimate is obtained, based on azimuth phase encoding in the transmit beam. A starboard side-scan sonar array 622 is shown at position 622a and 622b for pings p and p+1, respectively. For simplicity, only a change in pitch 624, $\Delta\phi_y$, is shown. Transmit beams illuminates the swath 626a and 626b for pings p and p+1, respectively. A side view of an average MRA 628 of an aft receive beam pair (not shown) in the water column is shown. A side view of an average MRA 630 of a fore receive beam pair (not shown) in the water column is shown. Small scatterers on sea floor 632 for both of the average MRAs 628, 630 lie in hyperbolas largely orthogonal to an x-z plane of FIG. 7F, and are not shown.

A graph 633 has a horizontal axis 636 corresponding to along track position along the sea floor 632 and a vertical axis 638 corresponding to transmit beam phase. Curves 634a and 634b are indicative of phase of the transmit beams 626a and 626b, respectively, as a function of along track position on the sea floor 632 for pings p and p+1, respectively. In one particular embodiment, the along track transmit phase, i.e., the curves 634a, 634b are nearly quadratic and a phase difference between pings p and p+1 is nearly linear, as indicated by a line 644. The phase differences corresponding to the aft and fore receive beam pairs are indicated by lines 646 and 648, respectively, which pass through intersections of lines 640, 642 (which align with directions 630, 632) with the phase difference curve 644. A phase difference 649 between the fore and aft phase differences 646, 648 is nearly linear in pitch differences. This forms the basis of differential pitch estimation.

Referring now to FIG. 7H, a pictorial 650 is illustrative of properties of the above fourth Phase Linearity equation, with which heave is estimated. The resulting heave estimate can be contaminated by pitch. An arrangement having $\theta_{MRAs}=0$ (i.e., beam aspect) is shown for simplicity. A tow body 652 is shown at position 652a for ping p and at position 652b for ping p+1. A constant pitch 656, $\phi_y$, is shown. A forward displacement 658, $\Delta x$, and a vertical displacement 660, $\Delta z$, are shown. A pitch contaminated heave estimate 662, $\xi$, is shown. An MRA of the beam at beam aspect is orthogonal to the tow body 652, and therefore, is rotated by an angle, $\phi_y$, forward of vertical. A receive beam having MRA 654a is associated with ping p and a receive beam having MRA 654b is associated with ping p+1. A vertical reference 664 is vertical with respect to a sea floor 666. Correlation of the receive beam pair (having MRAs 654a, 654b) is based on echoes from a large field of small scatterers located midway between the two MRAs 654a, 654b, i.e., from a hyperbola largely orthogonal to an x-z plane of FIG. 7H, intersecting a point 668. If the altitude is much larger than the motion between pings, the difference in distance from the tow body 652 to the point 668 for pings p and p+1 is calculated by projection of the displacement vector onto the MRA vector 654a or, equivalently, onto the MRA vector 654b:

$$\xi = [\sin(\phi_y) \quad 0 \quad \cos(\phi_y)] \begin{bmatrix} \Delta x \\ 0 \\ \Delta z \end{bmatrix} \approx \Delta z + \phi_y \cdot \Delta x$$

The above is equivalent to $\xi$ in the fourth Phase Linearization equation at beam aspect, where the cosine of the MRA in the denominator degenerates to one.

Figure 8:
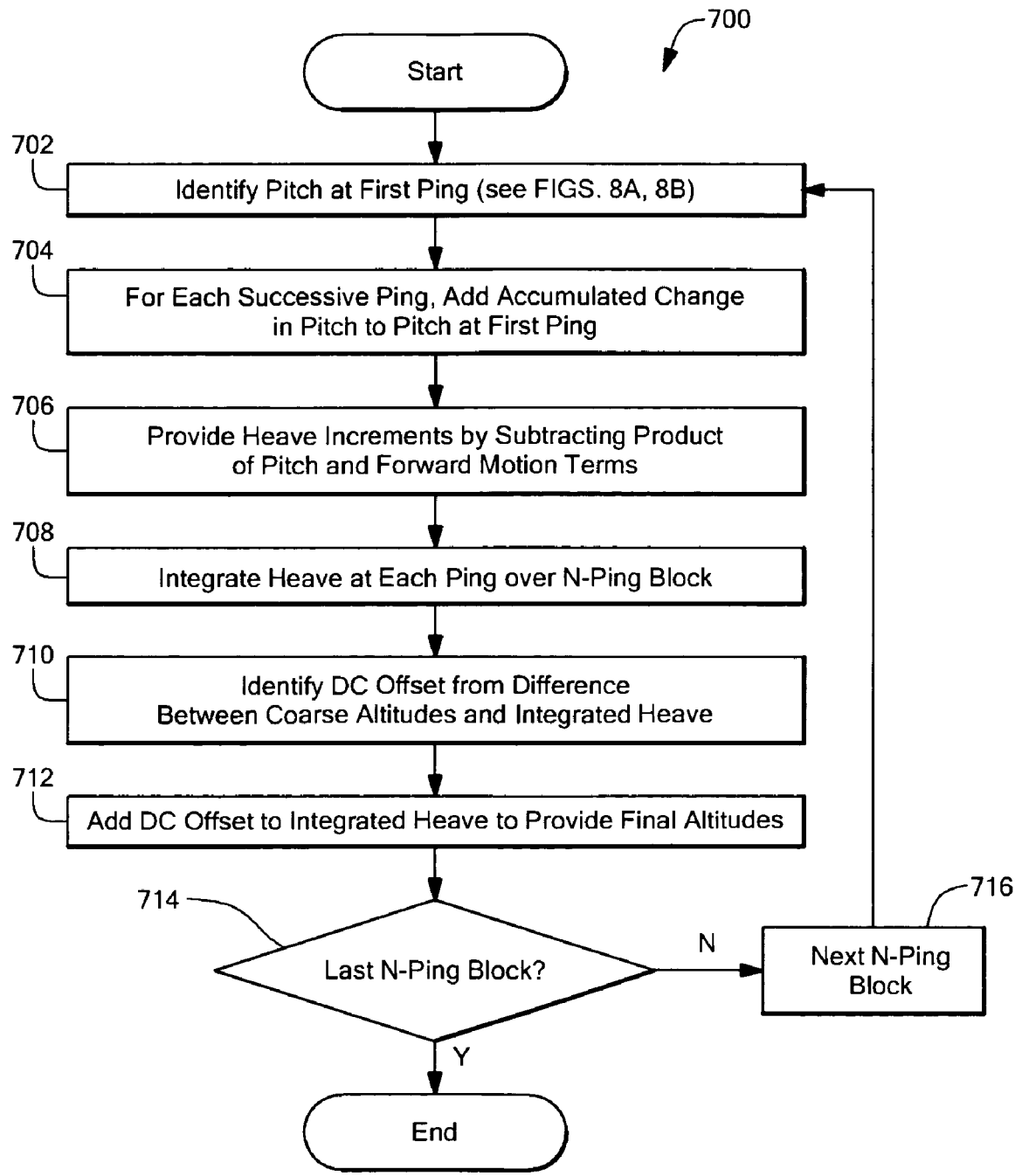
FIG. 8 is a flow chart showing yet further details of the method of FIG. 2.

Referring now to FIG. 8, a process 700 can be used to reduce or eliminate the affect of pitch on heave calculated above in conjunction with FIG. 7 in the four Phase Linearization equations. A mathematical derivation was given above.

The process 700 begins at step 702 where a pitch at the first ping of an N-ping block is calculated. A particular embodiment of this step is the $\hat{\phi}_{y,1}$ term in the heave correction equations, which indirectly absorbs estimation of DC pitch into the computation of $\hat{\phi}_{y,1}$. The calculation is described more fully in conjunction with FIGS. 8A and 8B below.

At block 704, for each successive ping in the N-ping block, estimate the pitch to equal the pitch at the first ping plus the sum over all preceding pings of the change in pitch determined in the Third Phase Linearization equations discussed in conjunction with FIG. 7. A particular embodiment of this step is the $\hat{\phi}_{y,p}$ term in the heave correction equations.

At block 706, valid heave increments are provided by subtracting a product of pitch and forward motion, divided by the square of the cosine of MRA, from the contaminated heave estimates. The forward motion is calculated above in conjunction with FIG. 7 in the first phase linearity equations. A particular embodiment of this step is the $\Delta \hat{z}_p$ term in the heave correction equations.

At block 708, the heave increments identified in block 706 are integrated over the N-ping block.

At block 710, the DC altitude offset is indirectly computed by finding the true altitude at ping 1. This is done by finding the least square error between the set of coarse altitudes and the sum of the integrated differential altitude estimates plus the altitude at ping 1. A particular embodiment of this step is the $\hat{z}_1$ term in the heave correction equations.

At block 712, the altitude of each ping after the first is computed by adding the altitude of the first ping, computed in block 710, to the sum of all preceding corrected differential altitudes, computed in block 706.

At decision block 714, if the N-ping block is the last N-ping block, the process ends. Otherwise, at block 716, a next N-Ping block is selected and the process 700 repeats for the new N-Ping block.

Figure 8A:
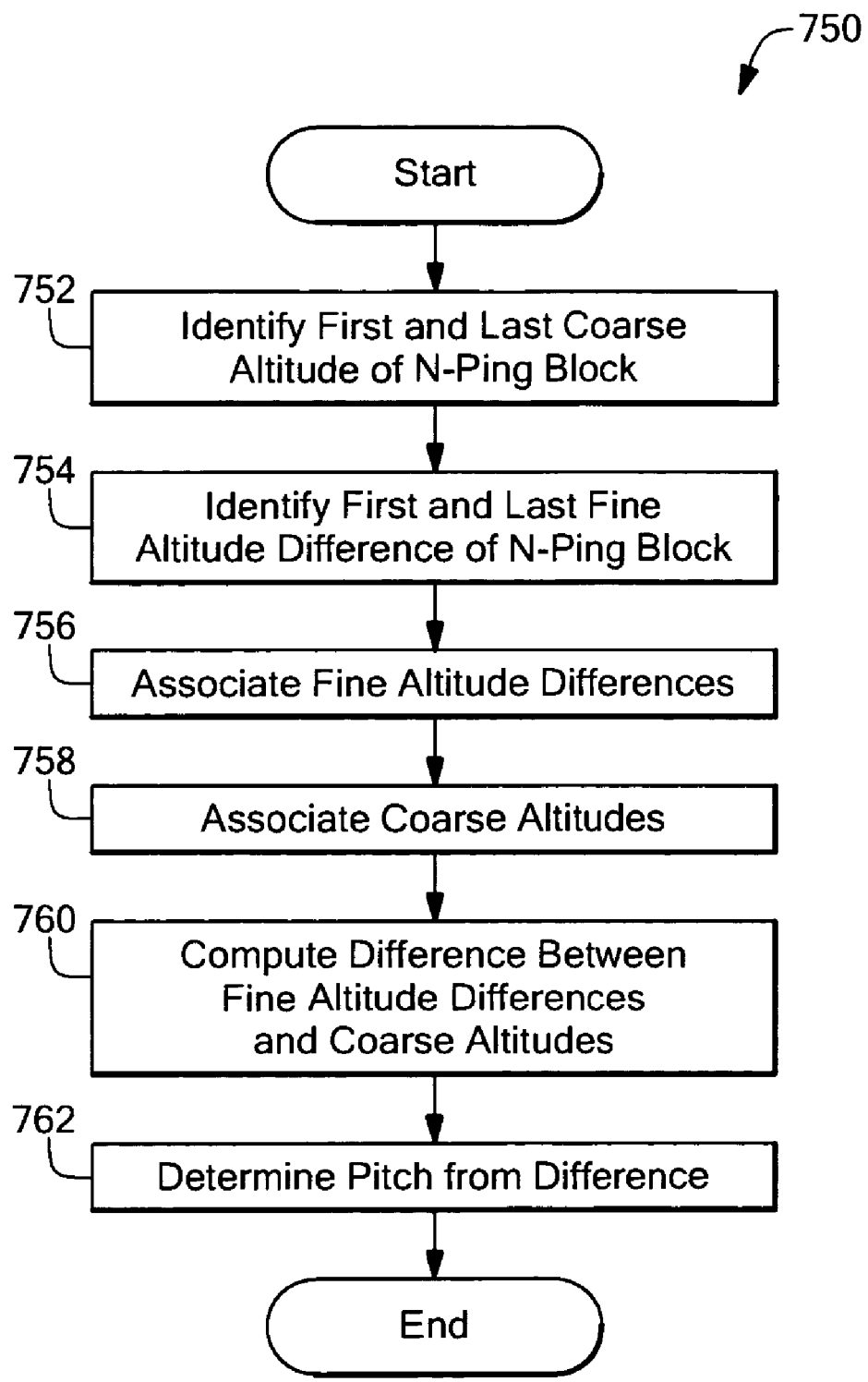
FIG. 8A is a flow chart showing further details of the method of FIG. 8.

Referring now to FIG. 8A, a process 750 identifies the pitch at the first ping of an N-ping block as described above in conjunction with FIG. 8, block 702. The process 750 begins at block 752 where a coarse altitude of the first ping and the last ping in an N-ping block are identified in accordance with block 58 of FIG. 2.

At block 754, the pitch-contaminated altitude differences $\hat{\xi}_p$, obtained in the Fourth Phase Linearization of FIG. 7 and FIG. 7E, are added over all pings to obtain a pitch-contaminated altitude difference between the first and last pings in the N-ping block.

At decision label 756, the two fine altitude differences, high-precision altitude differences, or sway-reduced altitude differences are associated and at block 758, the two coarse altitudes are associated. The association is further described in conjunction with FIG. 8B.

At block 760, a difference is computed between the fine, high-precision, or sway-reduced altitude difference association and the coarse altitude association provided in blocks 756 and 758.

At block 762, a pitch at the first ping is identified from a relationship involving the altitude difference generated at block 760. The process 750 is described graphically in FIG. 8B.

Figure 8B:
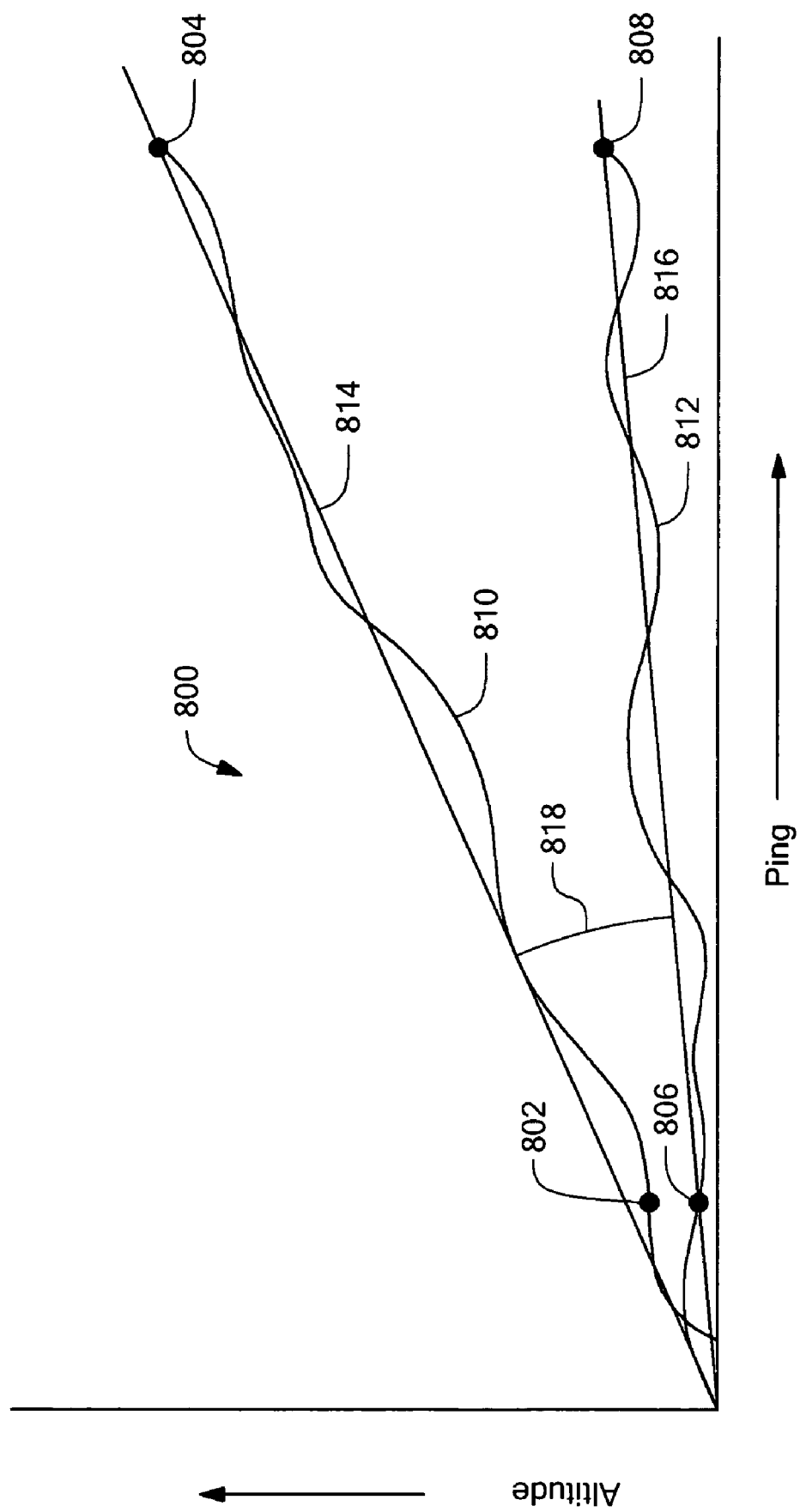
FIG. 8B is a pictorial showing altitude calculations forming a part of the method of FIG. 8A.

Referring now to FIG. 8B, a graph 800 illustrates the cumulative effect of pitch-contaminated differential altitudes, and shows the basic method with which the altitudes are corrected. A data point 802 corresponds to an arbitrary initial altitude assigned to the first ping's pitch-contaminated altitude. A data point 804 corresponds to the data point 802, plus the integral of pitch-contaminated differential altitude obtained from the fourth Phase Linearization equations of FIG. 7 and FIG. 7E.

A data point 806 corresponds to a coarse altitude of the first ping in the N-ping block determined in accordance with block 58 of FIG. 2. A data point 808 corresponds to a coarse altitude of the last ping in the N-ping block.

A divergence of the data points 802, 806 compared with the data points 804, 808 is indicative of a pitch of the receive array. Therefore a difference in altitude between the data points 802, 806 compared with (e.g., subtracted from) a difference in altitude between the data points 804, 808 is indicative of a pitch in the receive array. The pitch can be used to adjust the heave in the Fourth Phase Linearization equations.

Figure 9:
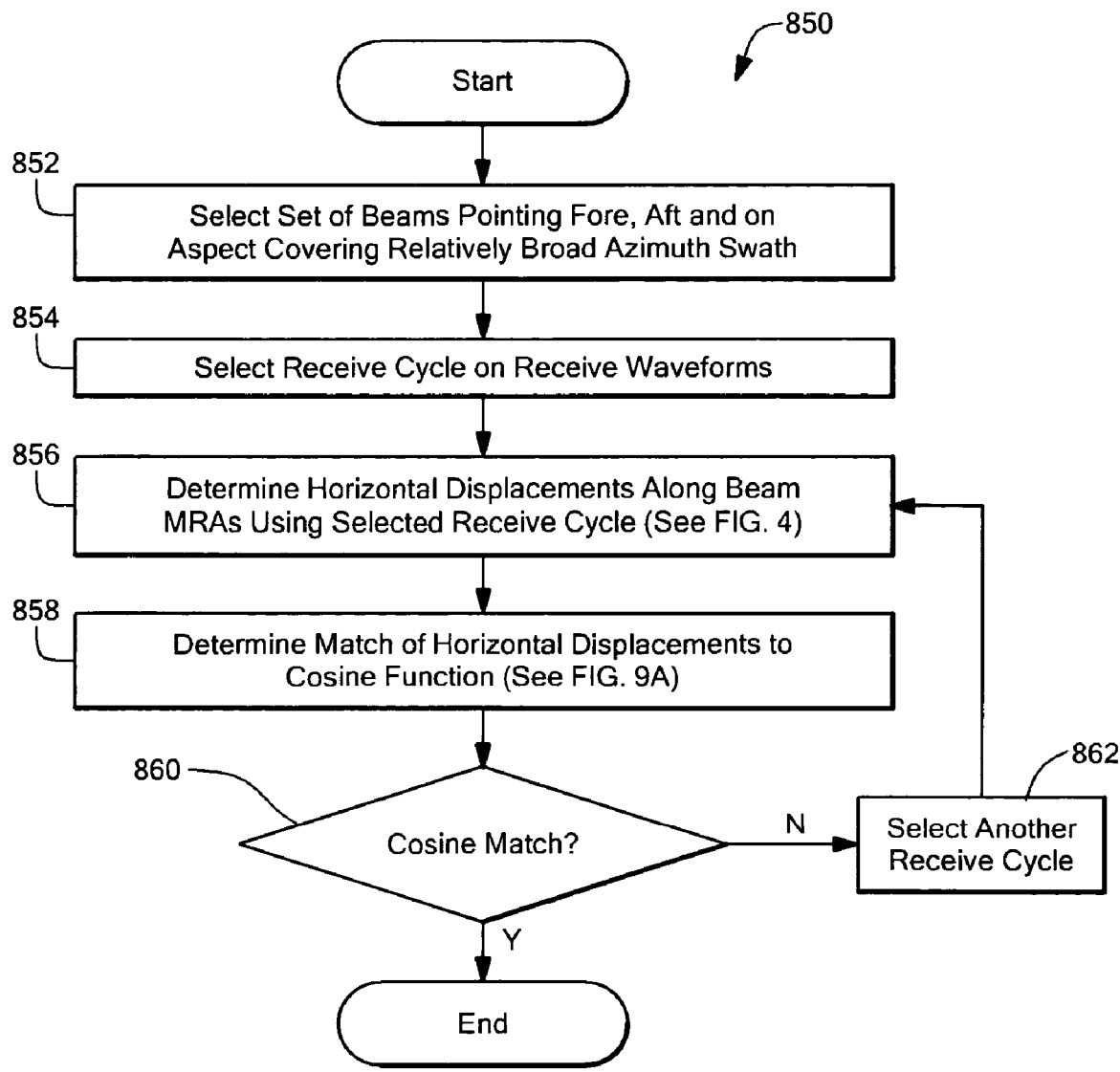
FIG. 9 is a flow chart showing a method of resolving a cycle ambiguity.

Referring now to FIG. 9, a method 850 provides a method for two-dimensional horizontal displacement estimation when altitude differences have been estimated by another method. At any MRA $\phi$, the horizontal-range displacement found from correlating a beam pair equals the projection of the horizontal displacement vector onto the MRA. If the wrong cycle is chosen as the zero-phase solution, then the horizontal-range displacement will have an additional erroneous displacement of an integer number of multiples of a distance similar to half the acoustic wavelength. A "Zero-Phase Curvature" method inspects the curvature of candidate zero-phase solutions on a series of closely spaced beams over a broad azimuth sector, to see if their curvature is proper. Only the true solution will have a horizontal displacement that is sinusoidal in azimuth.

Since the Zero-Phase Curvature method is based on the curvature of the correlation's zero-phase peak, it is best suited for receive arrays having a wide azimuth swath of receive beams, so the curvature of the zero-phase peak is significant. In one particular embodiment, for example, the receive array can form receive beams having an azimuth swath of at least 45°. As is known, many conventional side-scan sonars have only a relatively narrow azimuth swath, causing the zero-phase curvature to degenerate into a line. As is known, many conventional towed arrays, sphere arrays, and cylinder arrays have a relatively wide azimuth swath. Therefore, the method 850 is most applicable to towed arrays, sphere arrays, and cylinder arrays.

The method 850 begins at block 852, where a set of receive beams covering a wide azimuth swath is selected. At block 854, a receive cycle is selected in association with each of the receive beams.

At block 856, a horizontal displacement is determined in the selected receive beams in accordance with any of the altitudes previously discussed. For example, the coarse altitude methods discussed in conjunction with block 58 of FIG. 2, the fine altitude difference discussed in conjunction with block 60, the high-precision altitude differences discussed in conjunction with block 62, or the sway-reduced altitudes discussed in conjunction with block 64 can be used.

It should be apparent that a horizontal displacement in any of the selected beams is actually a displacement in a direction associated with a respective beam MRA of any of the selected beams. Therefore, the computed horizontal displacement across beams should be sinusoidally related.

At block 858, the horizontal displacements calculated at block 856 are compared with a cosine function.

At decision block 860, if the horizontal displacements calculated at block 856 substantially match the cosine function, then the process ends. However, if the horizontal displacements calculated at block 856 do not substantially match a cosine function, a new receive cycle is selected at block 862 and the process continues at block 856. The method 850 is described graphically in FIG. 9A.

Figure 9A:
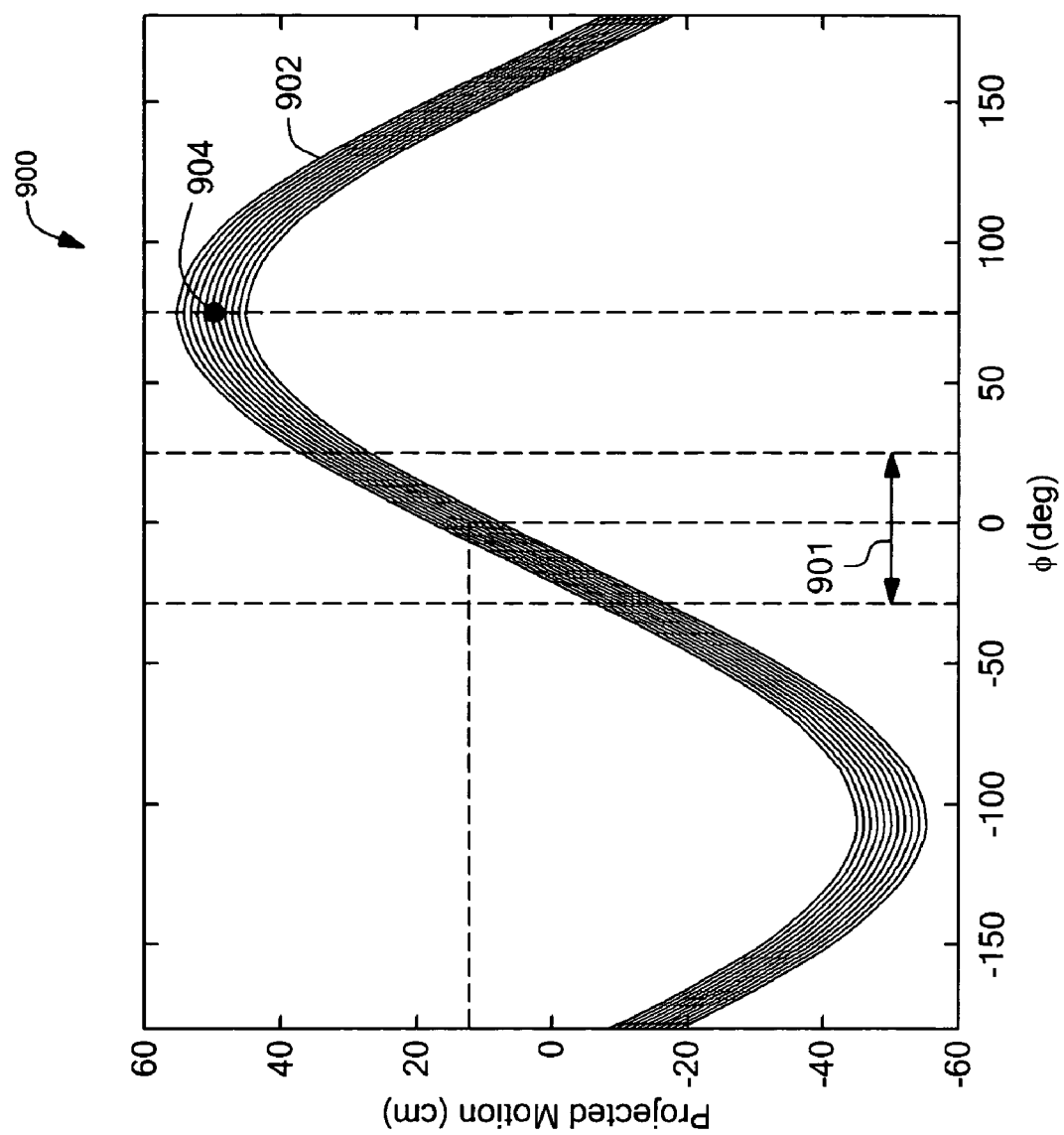
FIG. 9A is a graph showing curves associated with the method of FIG. 9.

Referring now to FIG. 9A, a graph 900 includes a horizontal scale having units of azimuth angle corresponding to selected receive beams about a receive array. A vertical scale corresponds to horizontal displacement determined in the selected beams in accordance with any of the altitudes previously discussed. For example, the coarse altitude methods discussed in conjunction with block 58 of FIG. 2, the fine altitude difference discussed in conjunction with block 60, the high-precision altitude differences discussed in conjunction with block 62, or the sway-reduced altitudes discussed in conjunction with block 64 can be used.

A series of curves 902 show computed horizontal displacements over a full 360° azimuth, using a variety of receive cycles. In a certain embodiment, only a subset 901 of the 360° azimuth is present in the actual azimuth sector. Only the one curve having the point 904 corresponds to a cosine function. Each of the other curves has an offset along the vertical scale. Therefore, it can be identified that only the one receive cycle corresponding to the curve having the point 904 is the correct receive cycle. The horizontal displacement vector is defined by the angle and displacement (horizontal and vertical axes, respectively) at which the cosine reaches its peak (or would if a full 360° swath existed).

One especially important aspect of the Zero-Phase Curvature algorithm is that it is capable of estimating horizontal motion to sub-wavelength precision in both forward and starboard directions, based exclusively on spatially quantized horizontal-range correlation. It does not require any approximations like Phase Linearization.

Figure 10:
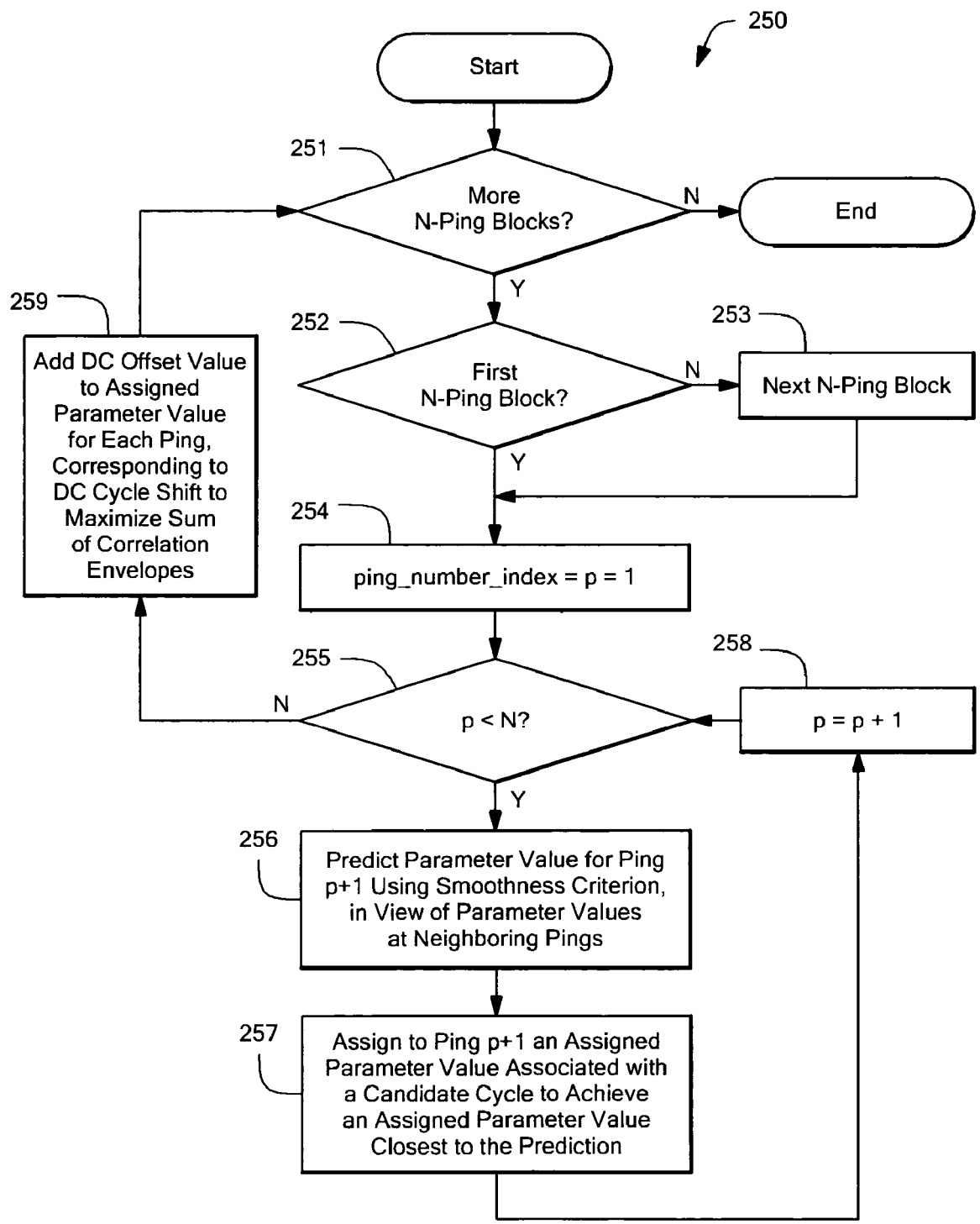
FIG. 10 is a is a flow chart showing another method of resolving a cycle ambiguity.

Referring now to FIG. 10, another process 250 can be used to resolve a cycle ambiguity. A motion parameter is estimated over a series of pings, and cycle ambiguities are resolved based on the belief that motion should be smoothly varying between pings. An example would be resolving errors in the cycle chosen along the major axis of the ambiguity surface in FIG. 7E for roll rate and sway computation. This technique is not based on detailed knowledge of platform kinematics in any specific coordinate, making it applicable to many different parameters.

The process 250 begins with the infrastructure for sequential operation over a series of N-ping blocks. The decision block 251 determines whether any more N-ping blocks exist. If none remain, the process 250 ends. Otherwise, decision block 252 determines whether this is the first N-ping block. If not, block 253 updates to the next N-ping block. Block 254 initializes the ping number index to ping_number_index=p=1. Decision block 255 determines whether any pings remain in the current N-ping block.

As used for FIG. 10, the term "parameter value" is used to describe, but is not limited to, an altitude difference value, an altitude value, or a horizontal displacement value.

At block 256 a smoothness criterion is used to predict a reasonable parameter value at ping p+1, given the parameter value at neighboring pings. In a certain embodiment, the smoothness criterion is a causal average over several preceding pings. Another embodiment uses causal linear extrapolation from several preceding pings. At block 257 an assigned parameter value is assigned to ping p+1 that is associated with a candidate receive cycle to achieve an assigned parameter value closest to the above predicted parameter value.

The process continues to block 258 where the ping is incremented to the next ping and the process continues to decision block 255. If, at decision block 255 more pings remain, the process of blocks 256, 257, 258, 255 repeats. If, at decision block 255 more pings do not remain, the process proceeds to block 259, where a common DC offset value is added to the assigned parameter values for all pings. The DC offset value corresponds to an integer number of cycles. The DC offset value is chosen to maximize the sum of the correlation envelopes. The process 250 now returns to decision block 251, and the process repeats until there are no more N-ping blocks.

Figure 10A:
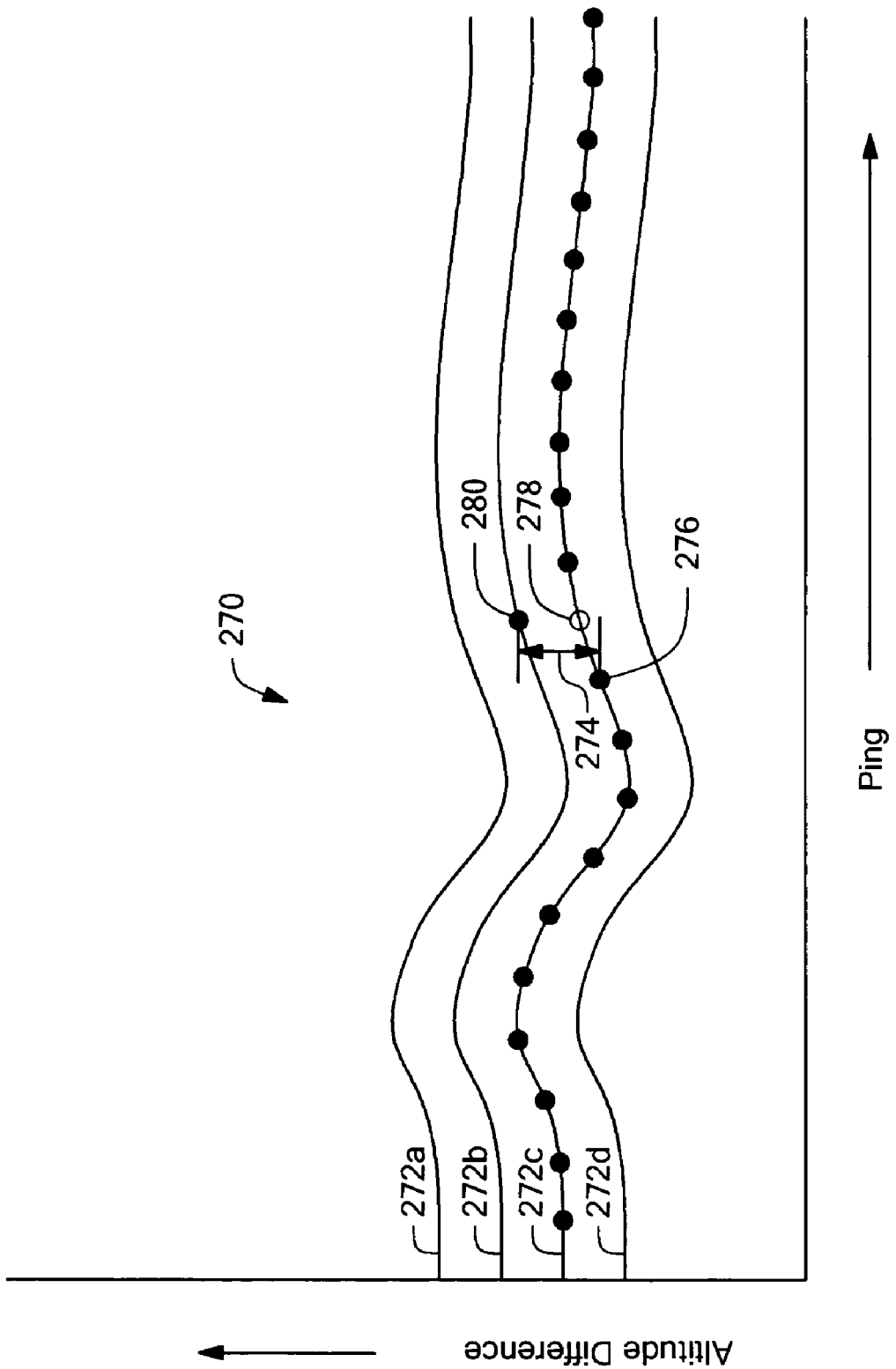
FIG. 10A is a graph showing curves associated with the method of FIG. 10.

Referring now to FIG. 10A, a graph 270 shows pictorially the method of FIG. 10. A horizontal scale corresponds to ping number and a vertical scale corresponds to altitude difference (i.e., a parameter value) associated with the correlation process 150 of FIG. 4. Dark data points are representative of calculated altitude differences. Curves 272a-272d correspond to altitude differences that would be calculated using different receive cycles of the beamformed waveforms. The curve 272c corresponds to the altitude calculation based upon a correct receive cycle. Suppose the altitude difference 280 were calculated, and that another candidate altitude difference 278 exists, corresponding to a different receive cycle. There is an a priori belief that motion should be smoothly varying between pings. The altitude difference 278 would produce a smoother motion estimate than the altitude difference 280 would, so altitude difference 280 is replaced by 278.

Figure 11:
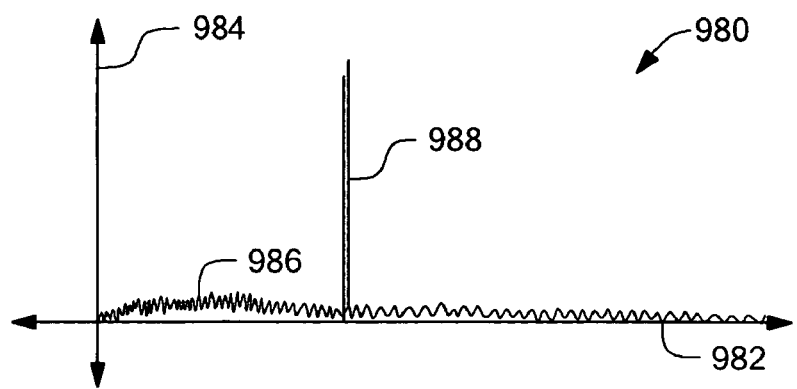
FIGS. 11-11C are graphs showing application of a clipping function to acoustic data.
Figure 11A:
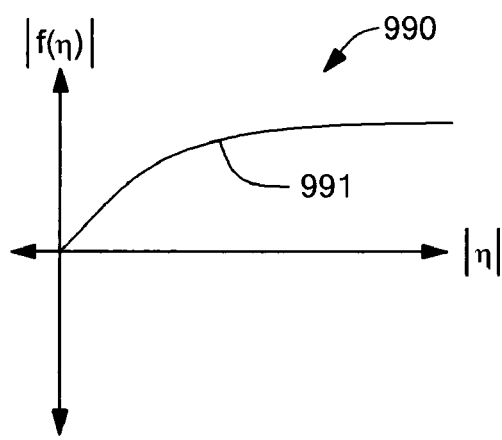
Figure 11B:
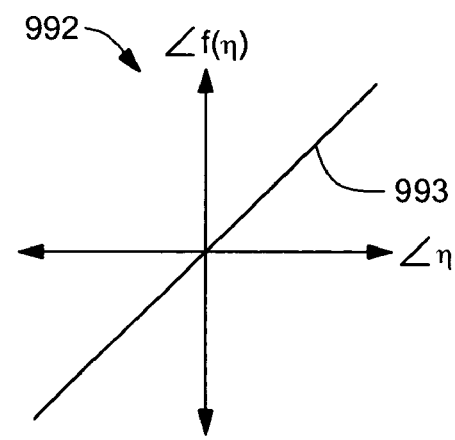

Referring now to FIG. 11, an objective of correlating beam pairs is to find the optimal displacement along the average of the two MRAs. This is valid when the scene corresponds to a large field of small scatterers. However, if the scene has a point target with an echo amplitude exceeding the background, then the point target may dominate a standard correlation. The correlation is effectively being done along a line pointing towards the point target, instead of along the average of the MRAs. Since there is no prior knowledge of the orientation of the point target, this effect is not easily compensated for after correlation. A comparable effect arises with spatially distributed non-point targets.

Clipped correlation is a signal processing technique used to limit the impact of heavy-tailed noise on linear correlation. Clipped correlation first clips the peak values in the data to not exceed a threshold, and then performs linear correlation on the clipped data. Many types of conventional clipping functions exist. One example is to apply an arctangent to an amplitude of the data, while leaving phase of the data unchanged. For one conventional technique, referred to as "Quantized Initialization and Continuous Estimation", all correlations, dot product equivalents of correlation, and Phase Linearization approximations of correlation use clipped data, making them equivalent to clipped correlation. Clipped correlation is also used in a method referred to as "Zero-Phase Curvature." Clipped correlation treats what may be the primary target of interest in a scene as if it were just heavy-tailed noise to be reduced or removed.

Figure 11C:
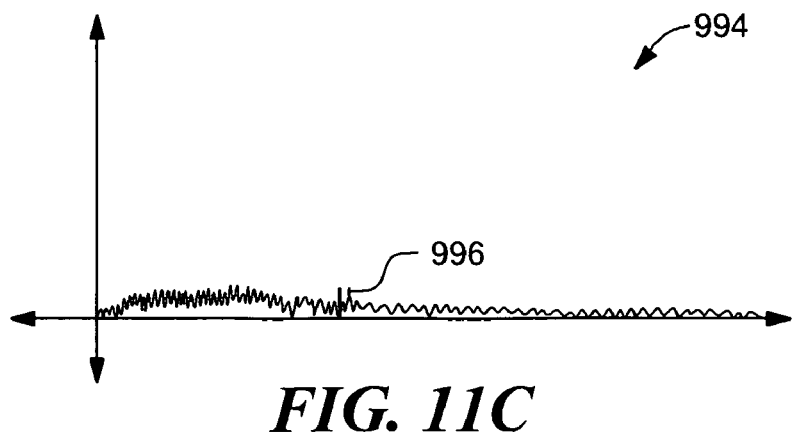

Referring now to FIGS. 11-11C, a graph 980 has a horizontal axis 982 corresponding to horizontal range and a vertical axis 984 corresponding to amplitude. A curve 986 having features 988 corresponds to acoustic data. The features 988 are indicative of a target at a range d1 having a strong echo. One of ordinary skill in the art will understand that if the acoustic data represented by the curve 986 having the features 988 were correlated with other acoustic data having comparable features, then the interaction between the features in the two data sets would dominate the correlation. The desired output of the correlation is based on the large amount of low-amplitude data, which may have a difference optimal displacement than the few high-amplitude features.

A graph 990 shows a curve 991 (e.g., an arctangent curve) indicative of an amplitude of a clipping function, $f(\eta)$, that can be applied to the acoustic data 986 in order to reduce the influence of the features 988 on correlations with other acoustic data. The dummy variable $\eta$ represents a single complex number, such as a sample of acoustic data. A graph 992 shows a curve 993 indicative of a phase of the clipping function, $f(\eta)$, that can be applied to the acoustic data 986. The clipping function, $f(\eta)$, therefore, applies the arctangent amplitude 991 to the envelope of the acoustic data 986, but leaves the phase of the acoustic data 986 unchanged. A graph 994 shows a curve 996 indicative of the clipping function, $f(\eta)$, applied to the acoustic data 986. The resulting clipped acoustic data curve 996 is similar to the curve 986, except that the features 988 have been greatly attenuated in the curve 996. Therefore, the features 988 will no longer dominate a correlation.

It should be apparent that, in one particular embodiment, the above-described clipping function could be applied to the beamformed signals before the correlation of block 182 of FIG. 4. With this arrangement, the correlations of block 182 are not dominated by strong acoustic targets.

Figure 12:
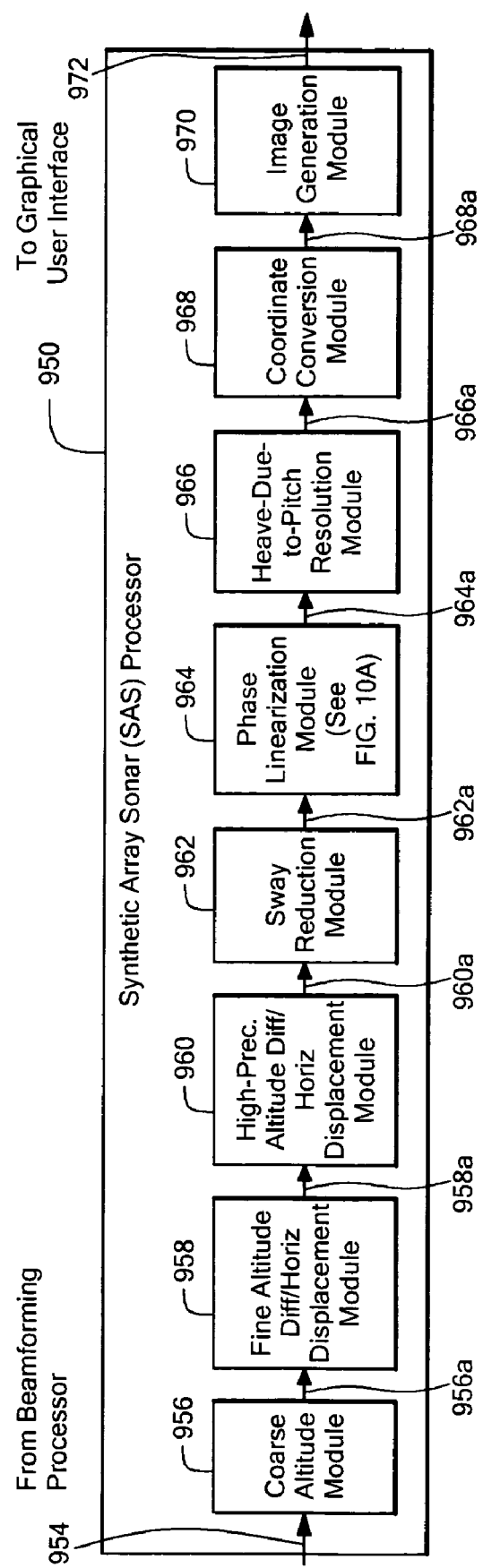
FIG. 12 is a block diagram of a synthetic aperture sonar processor that forms a part of the synthetic aperture sonar (SAS) system of FIG. 1.

Referring now to FIG. 12, a synthetic aperture sonar (SAS) processor 950 includes a coarse altitude module 956 adapted to receive beamformed signals 954 and to provide coarse altitudes 956a associated with a moving receive array as it moves though a body of water. A fine altitude difference and fine horizontal displacement module 958 is adapted to provide fine altitude differences and fine horizontal displacements 958a associated with the receive array. A high-precision altitude difference and horizontal displacement module 960 is adapted to provide high-precision altitude differences and high-precision horizontal displacements 960a associated with the receive array. A sway reduction module 962 is adapted to provide sway-reduced altitude differences and sway-reduce horizontal displacements 962a associated with the receive array. A Phase Linearization module 964 is adapted to receive the sway-reduced altitude differences and sway-reduce horizontal displacements 962a and to provide continuous (i.e., spatially unquantized) motion estimates 964a of the receive array in two or more degrees of freedom. A heave-due-to-pitch resolution module 966 is adapted to reduce pitch affect on at least one of the degrees of freedom computed by the Phase Linearization module 964. A coordinate conversion module 968 is adapted to receive the corrected two or more degrees of freedom and to generate a coordinate conversion to the motion estimates 964a from local coordinates to earth coordinates. An image generation module is adapted to use the motion estimates having coordinate conversion in synthetic aperture beamforming to generate an image 972 displayed on a graphical user interface.

It should be appreciated that some of the modules are optional. For example, in an alternate embodiment, the high-precision altitude difference and horizontal displacement module 960 could be eliminated. Also, in an alternate embodiment, the coordinate conversion module 968 could be eliminated if all of the motion estimates provided by the Phase Linearization module 964 were calculated in earth coordinates. In another alternate embodiment, the high-precision altitude difference and horizontal displacement module 960 and the sway reduction module 962 are eliminated. In yet another embodiment, the high-precision altitude difference and horizontal displacement module 960, and the sway reduction module 962 and the Phase Linearization module 964 are eliminated. Embodiments involving output to something other than a graphical user interface are possible, such as sending the SAS images directly to a computer aided detection/computer aided classification module. A fundamentally different embodiment would be to omit the image generation module and graphical user interface, and use the motion estimates for navigational purposes.

It will be appreciated that the above-described system and methods provide motion estimates that are accurate to a small fraction of a wavelength since Phase Linearization is based on coherent interference between signals. This is consistent with the SAS image formation requirement of sub-wavelength precision for constructive interference of highlights over a series of pings.

Forward displacement of the sonar between pings causes a small time delay in echoes from scatterers, which varies as a function of azimuth difference from the MRA. The large field of small scatterers is actually distributed over two dimensions, contrary to the simplified distribution along a hyperbola used in the derivation of Phase Linearization. If the forward motion is too large, then differences in time delay for scatterers on opposite sides of the hyperbola become large enough to cause destructive interference in the sum over scatterers. Correlation ceases to function.

If beamforming is done with a boxcar window over the physical aperture, then correlation of a spatially overlapping beam pair drops to zero when the forward displacement between pings equals half the physical receive array length. Therefore, correlation-based motion estimation only works when the forward speed is less than half the physical array length per ping. This result is comparable to the known property of SAS image formation, that the forward speed must be less than or equal to half the physical array length per ping in order to avoid grating lobes. Similar results can be obtained for windows other than a boxcar, such as Chebyshev or Taylor. Typically, the maximum forward speed at which motion estimation can be performed is slightly less than the maximum forward speed at which grating lobes can be avoided in SAS image formation.

It will also be apparent that the above system and methods that provide receive array position can be used in combination with the above described auto-focus techniques to further enhance resulting sonar images formed in synthetic aperture sonar system processing.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of synthetic aperture beamforming with a moving sonar array, the method comprising:
    generating a plurality of fine altitude differences and a plurality of fine horizontal displacements of the moving sonar array from correlations among a plurality of beamformed signals;
    improving an accuracy of the plurality of fine altitude differences and the plurality of fine horizontal displacements of the moving sonar array to provide a respective plurality of high-precision altitude differences and a respective plurality of high-precision horizontal displacements of the moving sonar array, wherein the improving the accuracy of the plurality of fine altitude differences and the plurality of fine horizontal displacements includes estimating a coarse axis of ambiguity associated with the correlations.

2. The method of claim 1, wherein the improving the accuracy of the plurality of fine altitude differences and the plurality of fine horizontal displacements further includes:
    interpolating the plurality of beamformed signals;
    converting selected ones of the plurality of beamformed signals to respective horizontal ranges at a higher spatial sampling rate than a sampling rate associated with the fine horizontal displacements by using a plurality of coarse altitudes to provide a plurality of coarse horizontal projections;
    converting selected ones of the plurality of interpolated beamformed signals to respective horizontal ranges at the higher spatial sampling rate by using a plurality of candidate altitude differences to provide a plurality of improved fine horizontal projections;
    generating one or more dot products associated with the plurality of improved fine horizontal projections and with the plurality of coarse horizontal projections to provide a mid-precision axis of ambiguity associated with the plurality of fine horizontal projections;
    generating a curve associated with the mid-precision axis of ambiguity;
    fitting a mathematical function to the generated curve; and
    finding a peak of the mathematical function to provide a high-precision altitude difference and high-precision horizontal displacement.

3. A method of synthetic aperture beamforming with a moving sonar array, the method comprising:
    reducing a sway component of a plurality of high-precision altitude differences and a plurality of high-precision horizontal displacements of the moving sonar array to provide a respective plurality of sway-reduced altitude differences and a respective plurality of sway-reduced horizontal displacements of the moving sonar array, wherein the reducing the sway component includes:
        identifying a plurality of maximums along a plurality of axes of ambiguity;
        identifying a heave axis associated with the plurality of axes of ambiguity; and
        adjusting the plurality of high-precision altitude differences and the plurality of high-precision horizontal displacements in accordance with the heave axis.

4. A method of synthetic aperture beamforming with a moving sonar array, the method comprising:
    estimating spatially-continuous positions and spatially-continuous orientations of the moving sonar array in a first coordinate system in accordance with at least one of a plurality of fine altitude differences and fine horizontal displacements, a plurality of high-precision altitude differences and high-precision horizontal displacements, or a plurality of sway-reduced altitude differences and the plurality of sway-reduced horizontal displacements, wherein the spatially-continuous positions and spatially-continuous orientations of the moving sonar array are estimated with six degrees of freedom.

5. The method of claim 4, wherein the estimating spatially-continuous positions and spatially-continuous orientations of the moving sonar array includes at least one of:
    selecting at least four beam pair signals from among a plurality of beamformed signals and applying a first mathematical relationship to the at least four beam pair signals to estimate a forward motion and a yaw of the moving sonar array;
    selecting at least two beam pair signals from among the plurality of beamformed signals and applying a second mathematical relationship to the at least two beam pair signals to estimate a roll rate and a sway of the moving sonar array;
    selecting another at least two beam pair signals from among the plurality of beamformed signals and applying a third mathematical relationship to the another at least two beam pair signals to estimate a change in pitch of the moving sonar array; and
    selecting at least one beam pair signals from among the plurality of beamformed signals and applying a fourth mathematical relationship to the at least one beam pair signal to estimate a heave of the moving sonar array.

6. A method of synthetic aperture beamforming with a moving sonar array, the method comprising:
    resolving a heave error due to pitch in estimated positions and orientations of the moving sonar array.

7. The method of claim 6, wherein the resolving a heave error due to pitch in estimated positions and orientations of the sonar array includes:
    identifying a pitch associated with one of a plurality of beamformed signals;
    adding the estimate of the change in pitch to the pitch associated with the one of the plurality of beamformed signals;
    associating the estimate of the change in pitch and the estimate of the forward motion to provide one or more heave increments;
    integrating the one or more heave increments;
    identifying a DC heave offset associated with the integrated one or more heave increments; and
    adding the DC heave offset to the integrated one or more heave increments to provide a plurality of final altitudes.

8. A method of synthetic aperture beamforming with a moving sonar array, the moving sonar array receiving a plurality of pings, the method comprising:

resolving a cycle ambiguity in a received waveform.

9. The method of claim 8, wherein the resolving a cycle ambiguity includes:

predicting a respective parameter value associated with each ping of the plurality of pings in accordance with a smoothness criterion in view of parameter values associated with others of the plurality of pings;

assigning to each ping of the plurality of pings a respective assigned parameter value corresponding to a candidate receive cycle to achieve the assigned parameter value closest to the predicted parameter value; and adding a common DC offset value to each assigned parameter value, the DC offset value associated with an integer number of receive cycles, the DC offset value selected to maximize a sum of correlation envelopes over all ping pairs from among the plurality of pings.

* * * * *

UNITED STATES PATENT AND TRADEMARK OFFICE
CERTIFICATE OF CORRECTION

PATENT NO. : 7,242,638 B2
APPLICATION NO. : 10/997281
DATED : July 10, 2007
INVENTOR(S) : Ian B. Kerfoot et al.

It is certified that error appears in the above-identified patent and that said Letters Patent is hereby corrected as shown below:

Title page, item [57] ABSTRACT, line 2 delete "in" and replace with --it--.

Column 2, line 41 delete "at a different" and replace with --at different--.

Column 4, line 5 delete "the yet another aspect of present" and replace with --yet another aspect of the present--.

Column 4, line 21 delete "the yet another aspect of present" and replace with --yet another aspect of the present--.

Column 5, line 32 delete "is a is a" and replace with --is a--.

Column 6, line 46 delete "though" and replace with --through--.

Column 7, line 26 delete "position" and replace with --positions--.

Column 8, line 67 delete "stated the" and replace with --stated, the--.

Column 10, line 19 delete "let is" and replace with --let it--.

Column 12, line 33 delete "than" and replace with --that--.

Column 13, line 30 delete "though" and replace with --through--.

Column 13, line 40 delete "though" and replace with --through--.

Column 16, line 3 delete "block 322 the" and replace with --block 322, the--.

Column 16, line 43 delete "embodiments other" and replace with --embodiments, other--.

Column 17, line 60 delete "block 506 a" and replace with --block 506, a--.

Column 20, line 42 delete " $\Phi_{p+1,u}$ " and replace with -- $\varphi_{p+1,u}$ --.

Column 20, line 45 delete " $\Phi_{p,u}$ " and replace with -- $\varphi_{p,u}$ --.

CERTIFICATE OF CORRECTION (continued) Page 2 of 3
U.S. Pat. No. 7,242,638 B2

Column 20, line 56 delete " $\zeta(\Phi)...\Phi...$ " and replace with -- $\zeta(\varphi)...\varphi...$ --.

Column 20, line 59 delete " $\Phi,$ " and replace with -- $\varphi,$ --.

Column 22, line 1 delete " $\bar{o}$ " and replace with -- $,\hat{},$ --.

Column 22, line 12 delete " $\Phi_- = -\Phi_+$ " and replace with -- $\varphi_- = -\varphi_+)$ --.

Column 22, line 42 delete " $\Phi_{stbd+} = \Phi_u$ " and replace with -- $\varphi_{stbd+} = \varphi_u$ --.

Column 22, line 56 delete " $\Phi_{port+} = \Phi_u$ " and replace with -- $\varphi_{port+} = \varphi_u$ --.

Column 23, line 50 delete " $\Phi_z$ " and replace with -- $\varphi_z$ --.

Column 23, line 50 delete " $\Phi_z = 0$ " and replace with -- $\varphi_z = 0$ --.

Column 23, line 53 delete " $\Delta\Phi_x,$ " and replace with -- $\Delta\varphi_x,$ --.

Column 23, line 62 delete " $\Delta\Phi_x = 0,$ " and replace with -- $\Delta\varphi_x = 0,$ --.

Column 23, line 66 delete " $\Delta\Phi_x$ " and replace with -- $\Delta\varphi_x$ --.

Column 24, line 26 delete " $\Delta\Phi_y$ " and replace with -- $\Delta\varphi_y$ --.

Column 24, line 27 delete " $\Delta\Phi_y = o$ " and replace with -- $\Delta\varphi_y = 0$ --.

Column 24, line 29 delete " $\Delta\Phi_y,$ " and replace with -- $\Delta\varphi_y,$ --.

Column 24, line 30 delete " $\Delta\Phi_y$ " and replace with -- $\Delta\varphi_y$ --.

Column 24, line 33 delete " $\Delta\Phi_y,$ " and replace with -- $\Delta\varphi_y,$ --.

Column 25, line 2 delete " $\Delta\Phi_y$ " and replace with -- $\Delta\varphi_y$ --.

Column 26, line 29 delete "is" and replace with --in--.

Column 26, line 43 delete "field)." and replace with --field.--.

CERTIFICATE OF CORRECTION (continued)
U.S. Pat. No. 7,242,638 B2

Column 27, line 64 delete " $,\Delta\Phi_x.$ " and replace with -- $,\Delta\varphi_x$ --.

Column 27, line 65 delete " $,\Delta\Phi_x,$ " and replace with -- $,\Delta\varphi_x,$ --.

Column 28, line 24 delete "position" and replace with --positions--.

Column 28, line 25 delete " $,\Delta\Phi_y,$ " and replace with -- $,\Delta\varphi_y$ --.

Column 28, line 26 delete "swath" and replace with --swaths--.

Column 29, line 3 delete "a" and replace with --at--.

Column 29, line 20 delete "four" and replace with --fourth--.

Column 30, line 43 delete " $\Phi$ " and replace with -- $\varphi$ --.

Column 32, line 13 delete "block 256 a" and replace with --block 256, a--.

Column 32, line 18 delete "block 257 an" and replace with --block 257, an--.

Column 33, line 53 delete "though" and replace with --through--.

Column 33, line 62 delete "sway-reduce" and replace with --sway-reduced--.

Column 33, line 65 delete "sway-reduce" and replace with --sway-reduced--.

Signed and Sealed this

Nineteenth Day of January, 2010

David J. Kappos
*Director of the United States Patent and Trademark Office*